United States Patent
Kamada et al.

[19]

[11] Patent Number: 5,816,950
[45] Date of Patent: Oct. 6, 1998

[54] AUTOMATIC TRANSMISSION CONTROL SYSTEM FOR AUTOMOBILES

[75] Inventors: Shinya Kamada; Mitsukazu Tasaka; Hajime Yamane; Kenji Sawa, all of Hiroshima, Japan

[73] Assignee: Mazda Motor Corporation, Hiroshima, Japan

[21] Appl. No.: 829,305

[22] Filed: Mar. 31, 1997

[30] Foreign Application Priority Data

Mar. 31, 1996 [JP] Japan .................................... 8-103870

[51] Int. Cl.⁶ .................................................. F16H 61/00
[52] U.S. Cl. .......................................................... 477/148
[58] Field of Search ..................................... 477/148, 149

[56] References Cited

U.S. PATENT DOCUMENTS

| | | | |
|---|---|---|---|
| 4,653,351 | 3/1987 | Downs et al. ........................... | 477/149 |
| 4,796,490 | 1/1989 | Butts et al. ............................. | 477/149 |
| 4,947,330 | 8/1990 | Hiramatsu . | |
| 5,012,699 | 5/1991 | Aoki et al. .............................. | 477/149 |
| 5,029,494 | 7/1991 | Lentz et al. ............................. | 477/149 |
| 5,113,343 | 5/1992 | Hunter et al. .......................... | 477/149 |
| 5,401,219 | 3/1995 | Kimura et al. ......................... | 477/149 |
| 5,435,796 | 7/1995 | Fujita et al. . | |
| 5,443,427 | 8/1995 | Ataka et al. . | |

FOREIGN PATENT DOCUMENTS

| | | |
|---|---|---|
| 0 354 493 A2 | 2/1990 | European Pat. Off. . |
| 0 645 561 A1 | 3/1995 | European Pat. Off. . |
| 0 740 089 A1 | 10/1996 | European Pat. Off. . |
| 62-261747 | 11/1987 | Japan . |

*Primary Examiner*—Dirk Wright
*Attorney, Agent, or Firm*—Sixbey, Friedman, Leedom & Ferguson, P.C.; Gerald J. Ferguson, Jr.

[57] ABSTRACT

An automatic transmission control system including a hydraulic pressure control circuit which supplied locking and unlocking pressure to selectively lock and unlock the selected friction coupling elements so as to change a torque transmission path in the transmission gear mechanism and thereby to provide desired gears, a specific one of which is achieved by locking and unlocking simultaneously specific friction coupling elements.

16 Claims, 41 Drawing Sheets

1

AUTOMATIC TRANSMISSION CONTROL SYSTEM FOR AUTOMOBILES

BACKGROUND OF THE INVENTION

1. Field of the Invention

This invention relates to an automatic transmission control system for an automobile.

2. Description of the Related Art

Automatic transmissions for automotive vehicles, which typically comprise a torque converter and a transmission gear mechanism, are automatically shifted into desired gears by selectively coupling or locking and uncoupling or unlocking a plurality of friction coupling elements such as clutches and brakes to switch the power transmission path of the transmission gear mechanism. With this type of automatic transmissions, a specific gear shift needs to unlock a specific friction coupling element simultaneously with locking another specific friction coupling element.

In cases where the specific gear shift is of a type of torque demand down shift accompanying an increase in engine throttle opening, while the specific friction coupling element is unlocked to a certain extent in advance to produce slippage, the unlocking hydraulic pressure for the specific friction coupling element is feedback controlled to bring the turbine speed of rotation to agreement with a target speed of rotation during the down shift. At the moment when the turbine attains approximately a rotational speed to be reached at the end of the down shift, while the other friction coupling element is locked, the specific friction coupling element is completely unlocked, accomplishing the down shift. Such an automatic transmissions is known from, for example, Japanese Unexamined Patent Publication No. 62-261747.

This type of automatic transmission is provided with a hydraulic pressure control system which suplies a working hydraulic pressure to and and discharges a working hydraulic pressure from a pressure chamber of each of the friction coupling elements. During the down shift, the hydraulic pressure control system generates an appropriate level of locking hydraulic pressure and supplies it to the pressure chamber of the friction coupling element to lock it. However, in cases where the working fluid has been drained away from a fluid path leading to the pressure chamber of the friction coupling element to be locked, for example, in advance of the gear shift, and hence is not in any way left in the fluid path, even though a locking hydraulic pressure is generated and supplied to the pressure chamber of the friction coupling element immediately after an appearance of a gear shift command, because there is no working fluid left in the fluid path at the beginning of the gear shift, an immediate increase in the locking hydraulic pressure does not develop in the pressure chamber of the friction coupling element, resulting in a problem that locking the friction coupling element is delayed.

It has been known as a method of eliminating a delay of locking the friction coupling element to put preliminarily the friction coupling element ready to be locked. This is done by accomplishing precharge control in which a control valve, such as a duty solenoid valve, to control the supply of the working fluid to the friction coupling element is left fully open for a certain time interval to fill the working fluid immediately in the fluid path leading to the pressure chamber of the friction coupling element when a gear shift command is given.

Even with this type of hydraulic pressure control system, in cases where the fluid path leading to a friction coupling element needs to be long or the viscosity of working fluid in the fluid path is high owing to low fluid temperatures, because a precharge interval necessary to fill the fluid path with the working fluid is long, the other specific friction coupling element is still in the precharge interval and is hard to be preliminarily put ready to be immediately locked even when the specific friction coupling element is completely unlocked accompanying an increase in the turbine speed of rotation closely to a turbine speed of rotation to be reached subsequently to a gear shift. This results in a problem that the other specific friction coupling element is unlocked before having locked the specific friction coupling element with the result of making the power transmission path of the transmission gear mechanism hang up in a neutral position, causing a sudden rise in engine speed which is always undesirable.

SUMMARY OF THE INVENTION

It is an objective of the present invention to provide an automatic transmission control system for an automotive vehicle which accomplishes a consistent and satisfactory gear shift which needs to unlock a specific one of a plurality of friction coupling elements while locking another specific friction coupling element.

The foreging object of the present invention is achieved by providing a control system for an automatic transmission, omprising a torque converter and a transmission gear mechanism which is equipped with a plurality of friction coupling elements including at least first and second friction coupling elements, which control ystem has a hydraulic pressure control system with a fluid source for supplying of working fluid pressure to and discharge of working fluid pressure from the pressure chambers of the friction coupling elements to selectively lock and unlocked the friction coupling elements so as to change a torque transmission path in the transmission gear mechanism and thereby to provide available gears. A specific one of the gears is achieved by locking the first friction coupling element and unlocking the second friction coupling element during a specific down shift to the specific gear. The control system includes first and second working fluid pressure control means, the first working fluid pressure control means being installed in a fluid path between the first friction coupling element and the fluid source to control supply of working fluid pressure to and discharge of working fluid pressure from the first friction coupling element, and the second working fluid pressure control means being installed in a fluid path between the second friction coupling element and the fluid pressure source to control supply of working pressure to and discharge of working pressure from the second friction coupling element. The control system provides a gear shift command signal indicating one of scheduled or programmed gear shifts which is selected according to a vehicle speed and a load acting on a driving torque generator such as an internal combustion engine and an electric motor, controls the first and second working fluid pressure control means according to the gear shift command signal, and makes a determination based on an input rotational speed to the automatic transmission and an output rotational speed from the drive torque generator as to whether an input rotational speed attained after a conclusion of the specific down shift becomes lower than the output rotational speed. The control system further controls supply and discharge operation of the first working pressure control means so as to make the output rotational speed during the specific down shift approach a rotational speed attained after a conclusion of the specific down shift when it is determined that the input rotational speed after a conclusion of the specific down shift becomes lower than the output rotational speed, and controls supply and discharge operation of the second working pressure control means so as to make the output rotational speed during the specific down shift approach a rotational speed attained after a conclusion of the specific down shift when it is determined that the input rotational speed after a conclusion of the specific down shift does not become lower than the output rotational speed.

According to the automativ transission control sysetm, when the gear shift command signal is provided for the specific down shift while the generator load takes a lower extreme value, the control system performs a correction of the output rotational speed having been attained before the specific down shift according to a time from when the generator load reaches the lower extreme value to an appearance of the gear shift command signal, and performs the determination based the corrected output rotational speed. In the case where an internal combustion engine is employed as the driving torque generator, when the gear shift command signal is provided for the specific down shift while an engine throttle is fully closed, the correction of output rotational speed of the internal combustion engine having been attained before the specific down shift is performed according to a time from when the engine throttle is made to fully close to an appearance of the gear shift command signal, and the determination is made based on the corrected output rotational speed of the internal combustion engine.

The control system may estimate an input rotational speed to the automatic transmission attained after a conclusion of the specific down shift, on the basis of which the determination is made, and alternatively, may estimate the output rotational speed from a generator load and a vehicle speed, on the basis of which the determination is made. The control system determines that the input speed of rotation after a conclusion of the specific down shift becomes smaller than the output rotational speed when the generator load is greater than a lower extreme value, or that the input rotational speed after a conclusion of the specific down shift becomes smaller than the output rotational speed when the generator load takes a lower extreme value and the vehicle speed is less than a specified value.

In a specific embodiment of the invention where a transmission gear mechanism is equipped with a plurality of friction coupling elements including at least first friction coupling element, which is provided with a locking pressure chamber and an unlocking pressure chamber divided by a piston and which is locked when only the locking pressure chamber is supplied with working fluid pressure and is unlocked when at least the unlocking pressure chamber is supplied with working fluid pressure and when neither the locking pressure chamber nor the unlocking pressure chamber is supplied with working fluid pressure, and a second friction coupling element which has a pressure chamber in communication with the unlocking pressure chamber of the first friction coupling element and is locked when the pressure chamber of the second friction coupling element is supplied with working fluid pressure. The specific down shift is achieved through a shift from a state where, while the locking pressure chamber of the first friction coupling element is supplied with working fluid pressure, neither the unlocking pressure chamber of the first friction coupling element nor the pressure chamber of the second friction coupling element is supplied with working fluid pressure to a state where the locking pressure chamber and unlocking pressure chamber of the first friction coupling element are supplied with working fluid pressure, and, during the specific down shift. In this embodiment, the control system performs the same control as described above. That is, it controls supply and discharge operation of the first working pressure control means so as to make the output rotational speed during the specific down shift approach a rotational speed attained after a conclusion of the specific down shift when it is determined that the input rotational speed after a conclusion of the specific down shift becomes lower than the output rotational speed, and controls supply and discharge operation of the second working pressure control means so as to make the output rotational speed during the specific down shift approach a rotational speed attained after a conclusion of the specific down shift when it is determined that the input rotational speed after a conclusion of the specific down shift does not become lower than the output rotational speed.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Mechanical Structure

Figure 1:
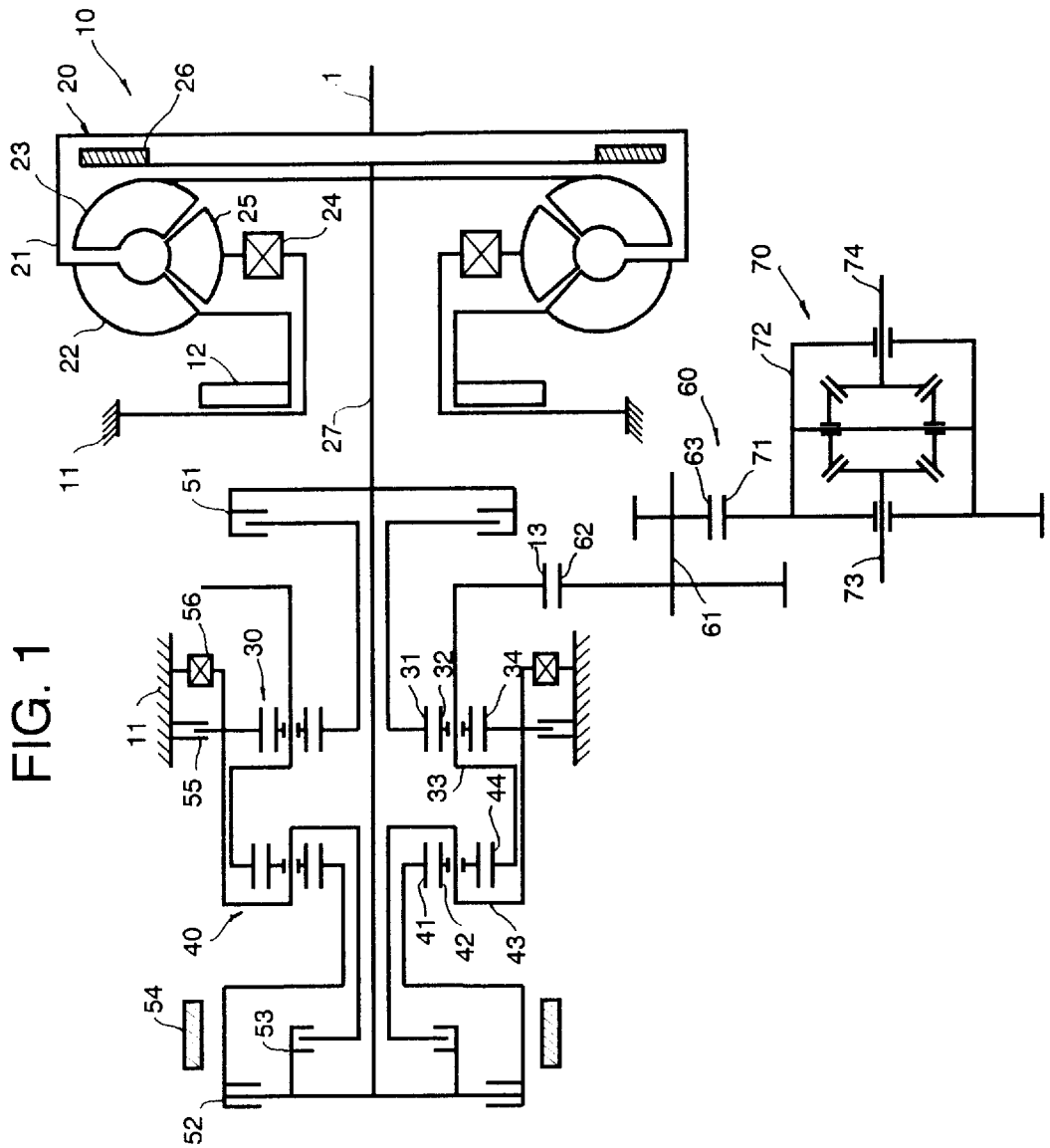
FIG. 1 is a schematic skeleton view showing a mechanical structure of an automatic transmission equipped with a control system of the present invention.

Referring to the drawings in detail, in particular, to FIG. 1 which is a skeleton diagram schematically showing the entire mechanical structure of an automatic transmission 10 in which an automatic transmission control system in accordance with an embodiment of the present invention is incorporated, the automatic transmission 10 has, as its main structural elements, a hydraulic torque converter 20 and front and rear planetary gear mechanisms 30 and 40 arranged contiguously to each other as a transmission gear mechanism which are driven by means of output torque of the torque converter 20. The automatic transmission 10 further has a plurality of friction coupling elements 51–55, such as clutches, brakes and so forth, and a one-way clutch 56 which are selectively locked and unlocked to switch the power transmission path of the front and rear planetary gear mechanism 30 and 40, placing the automatic transmission 10 into desired gears, namely first (1st) to fourth (4th) gears in a drive (D) range, first (1st) to third (3rd) gears in a second (S) range, first (1st) and second (2nd) gears in a low (L) range, and a reverse (RV) gear in a reverse (R) range.

The hydraulic torque converter 20 is comprised of a pump 22 located within a converter housing 21 which is fastened to an engine output shaft 1, a turbine 23 which is arranged to face to the pump 22 and driven by the pump 22 through a working fluid, and a stator 25 which is supported between the pump 22 and the turbine 23 by a transmission housing 11 through a one-way clutch 24 and does multiply engine output torque. The hydraulic torque converter 20 is provided with a lockup clutch 26 between the converter housing 21 and the turbine 23 to mechanically lock the engine output shaft 1 (pump 22) and the turbine 23 together when the lockup clutch 26 is activated. Transmission of engine torque is made from the turbine 23 to the front and rear planetary gear mechanisms 30 and 40 through a turbine shaft 27 fastened to the turbine 23. An oil pump 12, which is driven by the engine output shaft 1 through the converter housing 21 of the hydraulic torque converter 20, is arranged on one side of the hydraulic torque converter 20 opposite to the engine.

Each of the front and rear planetary gear mechanisms 30 and 40 is comprised of a sun gear 31, 41, and a plurality of pinions 32, 42 in mesh with the sun gear 31, 41, a pinion carrier 33, 43 which supports these pinions 32, 42, and a ring gear 34, 44 in mesh with the pinions 32, 42. There are provided in the transmission gear mechanism a forward clutch (FWCL) 51 between the turbine shaft 27 and the sun gear 31 of the front planetary gear mechanism 30, a reverse clutch (RVCL) 52 between the turbine shaft 27 and the sun gear 41 of the rear planetary gear mechanism 40, a 3rd–4th clutch (3–4CL) 53 between the turbine shaft 27 and the pinion carrier 43 of the rear planetary gear mechanism 40, and a 2nd–4th (2–4) brake (2–4BR) 54 which locks the sun gear 41 of the rear planetary gear mechanism 40. Between these front and rear planetary gear mechanisms 30 and 40, the pinion carrier 33 and the ring gear 34 of the front planetary gear mechanism 30 are linked with the ring gear 44 and the pinion carrier 43 of the rear planetary gear mechanism 40, respectively. A low-reverse brake (LRBR) 55 and the one-way clutch (OWCL) 56 are arranged in parallel with respect to these pinion carrier 33 and ring gear 44 and interposed between these pinion carrier 33 and ring gear 44 and the transmission housing 11. Further, there is provided in the transmission gear mechanism an output gear 13 in mesh with the pinion carrier 33.

An intermediate transmission mechanism 60 includes a front intermediate gear 62 fastened to an idle shaft 61 and being in mesh with the output gear 13 and a second intermediate gear 63 fastened to the idle shaft 61 and being in mesh with an input gear 71 of a differential gear 70. Out put torque from the automatic transmission 10 is transmitted to the differential case 72 from the output gear 13 through these front and rear intermediate gears 61 and 63 to drive right and left axles 73 and 74.

Operation of the friction coupling elements (brakes and clutches) 51–55 and one-way clutch (OWCL) 56 in regard to the specified transmission gears is described in Table I.

Figure 2:
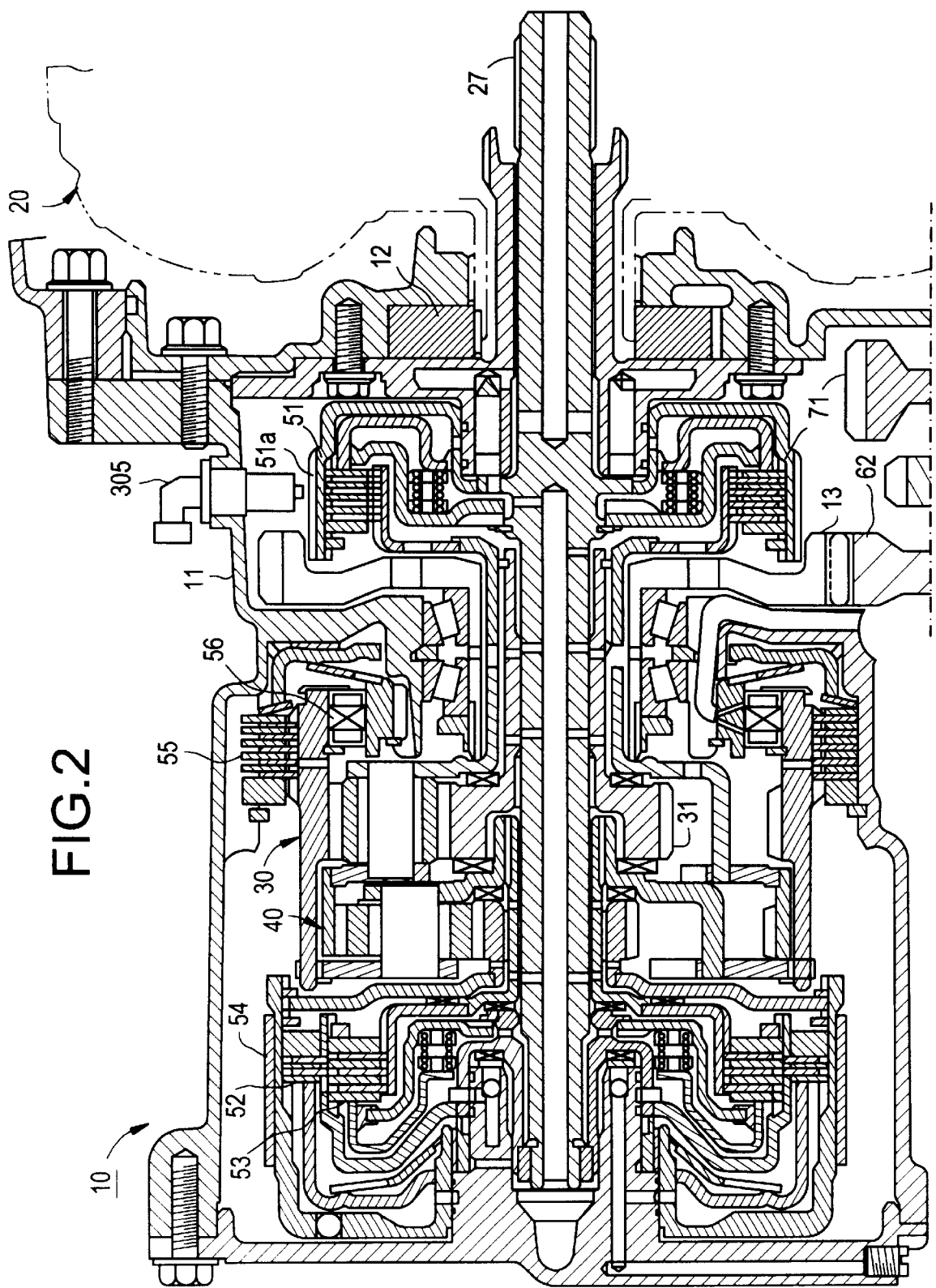
FIG. 2 is a cross-sectional view of a transmission gear mechanism of the automatic transmission shown in FIG. 1.

The transmission gear mechanism of the automatic transmission 10 shown in the skeleton diagram in FIG. 1 is practically constructed as shown in FIG. 2. As shown in FIG. 2, the automatic transmission 10 is provided with a turbine speed sensor 305 installed in the transmission housing 11 which is used in control as will be described later. Specifically, this turbine speed sensor 305 at its head is installed in order to be opposite to the periphery of a drum 51a of the forward clutch (FWCL) 51 which rotates together with the turbine shaft 27 in one united body and so as to detect the rotational speed of the turbine shaft 27 based on a periodic change of the magnetic field which is generated by splines formed on the periphery of the drum 51a. In Table I, the low-reverse clutch (LRBR) 55 is locked only for the 1st gear.

TABLE I

| Gear | FWCL (51) | 2-4BR (54) | 3-4CL (53) | LRBR (55) | RVCL (52) | OWCL (56) |
|---|---|---|---|---|---|---|
| 1ST | ○ | | | (○) | | ○ |
| 2ND | ○ | ○ | | | | |

TABLE I-continued

| Gear | FWCL (51) | 2-4BR (54) | 3-4CL (53) | LRBR (55) | RVCL (52) | OWCL (56) |
|---|---|---|---|---|---|---|
| 3RD | ○ | | ○ | | | |
| 4TH | | ○ | ○ | | | |
| RV | | | | ○ | ○ | |

Hydraulic Pressure Control Circuit

Figure 3:
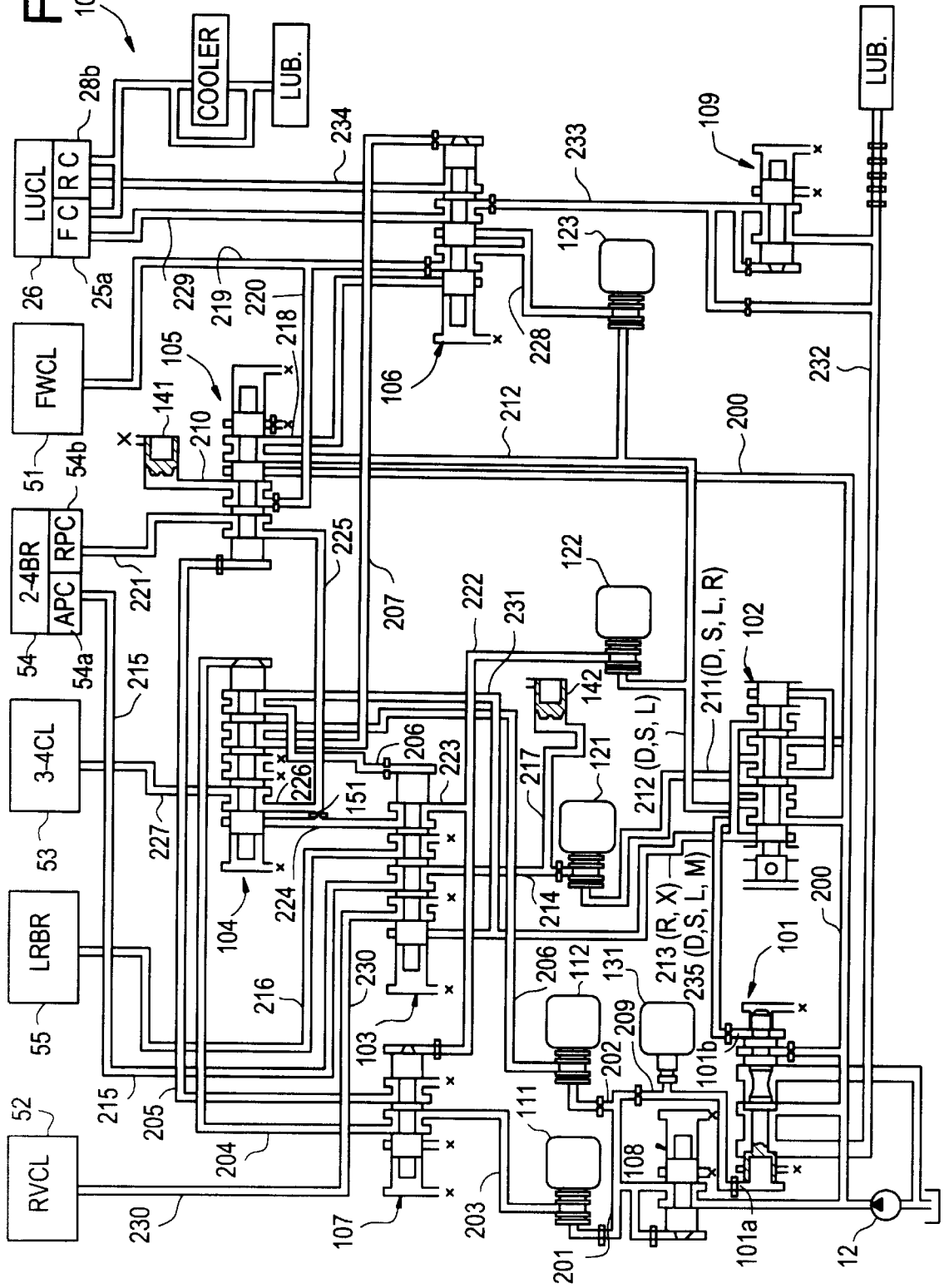
FIG. 3 is a hydraulic control circuit of an automatic transmission control system in accordance with an embodiment of the present invention.

FIG. 3 is a circuit diagram showing a hydraulic pressure control system for supplying the working hydraulic pressure to and releasing the working hydraulic pressure from the pressure chambers of the friction coupling elements 51–55 shown in FIGS. 1 and 2. It is to be noted that among the friction coupling elements, the 2–4 brake (2–4BR) 54, which is comprised of a band brake, has a servo apply pressure chamber 54a and a servo release pressure chamber 54b into which the working hydraulic pressure is supplied. Specifically, when the working hydraulic pressure is supplied into only the servo apply pressure chamber 54a, the 2–4 brake (2–4BR) 54 is activated, and when the working hydraulic pressure is supplied into only the servo release pressure chamber 54b, or when the working hydraulic pressure is not supplied into the servo apply pressure chamber 54a nor into the servo release pressure chamber 54b, as well as when the working hydraulic pressure is supplied into both servo apply pressure chamber 54a and servo release pressure chamber 54b, the 2–4 brake (2–4BR) 54 is released. Each of the remaining friction coupling elements 51–53 and 55 has a single pressure chamber, and is locked when the working hydraulic pressure is supplied into the pressure chamber thereof.

As shown in FIG. 3 in detail, the hydraulic control system 100 is provided with, as the essential constructional elements, a regulator valve 101 for generating a specified level of line hydraulic pressure by regulating discharge hydraulic pressure of the oil pump 12, a manual shift valve 102 which is manually operated to switch the ranges, and various switching valves, including a low-reverse valve 103, a bypass valve 104, a 3–4 shift valve 105 and a lockup control valve 106, for switching the fluid paths leading to the friction coupling elements 51–55, respectively, which are activated during gear shifts. The hydraulic control system 100 is further provided with first and second ON-OFF solenoid valves (which are hereafter referred to simply as first and second solenoid valves or SVs) 111 and 112 in order to operate these switching valves 103–106, a solenoid relay valve (which is hereafter referred to simply as a relay valve or SRV) 107 which switches the destination of the supply of working hydraulic pressure from the first solenoid valve 111, and first, second and third duty solenoid valves 121, 122 and 123 (which are hereafter referred to as first, second and third duty valves or DSVs) which perform controlled generation, regulation and discharge of the working hydraulic pressure to be supplied into the pressure chambers of the friction coupling elements 51–55.

The first and second solenoid valves (SVs) 111 and 112 and the first, second, and third duty solenoid valves (DSV) 121, 122 and 123 are of a three-way type which provides communication of the fluid path between upstream and downstream therefrom and drains the working fluid from the fluid path downstream therefrom. During draining, because the fluid path upstream from each valve is shut off, the oil pump 12 does not discharge the working fluid uselessly from the fluid path upstream the valve, reducing drive loss.

When each of the first and second solenoid valves (SVs) 111 and 112 is activated or turned ON, it brings the fluid paths on upstream and downstream sides therefrom into communication. Further, when each of the first, second and third duty solenoid valves (DSVs) 121, 122 and 123 is turned OFF, in other words, when the duty solenoid valve (DSV) 121, 122, 123 operates at a duty rate of 0% (a rate of an ON duration of time in one ON-OFF cycle), it fully opens to bring the fluid paths on upstream and downstream sides thereof into complete communication; when turned ON, in other words, when operates at a duty rate of 100%, it drains the working fluid from the fluid path downstream therefrom by shutting off the fluid path upstream thereof; and when operates at an intermediate duty rate, it generates a hydraulic pressure in the fluid path downstream therefrom regulated according to the duty rate by using a hydraulic pressure in the fluid path upstream therefrom as a source hydraulic pressure.

The line hydraulic pressure regulated through the regulator valve 101 is supplied to the manual shift valve 102 through a main hydraulic pressure line 200 as well as to a solenoid reducing valve 108 (which is hereafter referred to simply as a reducing valve) and the 3–4 shift valve 105. The line hydraulic pressure supplied to the reducing valve 108 is reduced to a fixed level and then supplied to the first and second solenoid valves (SVs) 111 and 112 through hydraulic pressure lines 201 and 202, respectively. While the fixed level line hydraulic pressure is supplied to the solenoid relay valve (SRV) 107 through a hydraulic pressure line 203 when the first solenoid valve (SV) 111 is ON, it is further supplied to a control port of the bypass valve 104 as a pilot hydraulic pressure through a hydraulic pressure line 204 when the spool of the solenoid relay valve (SRV) 107 is placed in its right-end position as viewed in FIG. 3 to force the spool of the bypass valve 104 toward the left-end position. On the other hand, when the solenoid relay valve (SRV) 107 places its spool in the left-end position, the fixed level line hydraulic pressure is supplied to a control port of the 3–4 shift valve 105 as a pilot hydraulic pressure through a hydraulic pressure line 205 to force the spool of the 3–4 shift valve 105 toward the right-end position.

The fixed level line hydraulic pressure provided from the reducing valve 108 is further supplied to the bypass valve 104 through a hydraulic pressure line 206 when the second solenoid valve (SV) 112 is ON; supplied as the pilot hydraulic pressure to a control port of the lockup control valve 106 through a hydraulic pressure line 207 when the spool of the bypass valve 104 is placed in its right-end position to force the spool of the lockup control valve 106 toward the left-end position; and supplied to a control port of the low-reverse valve 103 through a hydraulic pressure line 208 when the spool of the bypass valve 104 is placed its left-end positioned to force the spool of the low-reverse valve 103 toward the left-end position. Additionally, the fixed level line hydraulic pressure from the reducing valve 108 is supplied to a control port 101a of the regulator valve 101 through a hydraulic pressure line 209. In this event, the fixed level line hydraulic pressure is adjusted according to, for example, opening of an engine throttle by way of a linear solenoid valve 131 in the hydraulic pressure line 209 and accordingly, the line hydraulic pressure is adjusted according to throttle opening by way of the regulator valve 101.

The main hydraulic pressure line 200 leading to the 3–4 shift valve 105 is brought into communication with a first accumulator 141 through a hydraulic pressure line 210 when the 3–4 shift valve 105 has placed its spool in the right-end position to introduce the line hydraulic pressure into the accumulator 141. On the other hand, the line hydraulic pressure supplied to the manual shift valve 102 from the main hydraulic pressure line 200 is introduced into a first output hydraulic pressure line 211 and a second output hydraulic pressure line 212 for forward ranges, i.e. the drive (D) range, the second speed (S) range and the low speed (L) range; into the first output hydraulic pressure line 211 and a third output hydraulic pressure line 213 for the reverse (R) range; and into the third output hydraulic pressure line 213 for the neutral (N) range.

The first output hydraulic pressure line 211 leads to the first duty solenoid valve (DSV) 121 to supply the line hydraulic pressure as a control source hydraulic pressure to the first duty solenoid valve (DSV) 121. The first duty solenoid (DSV) 121 at its downstream side leads to the low-reverse valve 103 through a hydraulic pressure line 214; leads to the servo apply pressure chamber 54a of the 2–4 brake (2–4BR) 54 through a servo apply hydraulic pressure line 215 when the low-reverse valve 103 has placed the spool in the right-end position; and further leads to the pressure chamber of the low-reverse brake (LRBR) 55 through a low-reverse brake hydraulic pressure line 216 when the low-reverse valve 103 has placed the spool in the left-end position. A hydraulic pressure line 217 branches off from the hydraulic pressure line 214 and leads to a second accumulator 142. The second output hydraulic pressure line 212 leads to both second duty solenoid valve (DSV) 122 and third duty solenoid valve (DSV) 123 to supply the line hydraulic pressure as a control source hydraulic pressure to these duty solenoid valves (DSVs) 122 and 123. The second output hydraulic pressure line 212 also leads to the 3–4 shift valve 105. The second output hydraulic pressure line 212 leading to the 3–4 shift valve 105 is brought into communication with the lock-up control valve 106 through a hydraulic pressure line 218 when the 3–4 shift valve 105 has placed the spool in the right-end position; and brought into communication with the pressure chamber of the forward clutch (FWCL) 51 through a forward clutch hydraulic pressure line 219 when the lockup control valve 106 has placed the spool in the left-end position. A hydraulic pressure line 220 branching off from the forward clutch hydraulic pressure line 219 leads to the 3–4 shift valve 105. This hydraulic pressure line 220 is brought into communication with the first accumulator 141 through the hydraulic pressure line 210 when the 3–4 shift valve 105 has placed the spool in the left-end position, and on the other hand, is brought into communication with the servo release pressure chamber 54b of the 2–4 brake (2–4BR) 54 through a servo release hydraulic pressure line 221 when the 3–4 shift valve 105 has placed the spool in the right-end position.

The second duty solenoid valve (DSV) 122 at its downstream side to which a control source hydraulic pressure is supplied through the second output hydraulic pressure line 212 leads to a control port of the solenoid relay valve (SRV) 107 through a hydraulic pressure line 222 and supplies a pilot hydraulic pressure to the port to force the solenoid relay valve (SRV) 107 to shift its spool toward the left-end position. A hydraulic pressure line 223 branching off from the hydraulic pressure line 222 leads to the low-reverse valve 103, and is further brought into communication with a hydraulic pressure line 224 when the low-reverse valve 103 has placed the spool in the right-end position. A hydraulic pressure line 225 branching off from the hydraulic pressure line 224 through an orifice 151 leads to the 3–4 shift valve 105 and is brought into communication with the servo release pressure chamber 54b of the 2–4 brake (2–4BR) 54 through the servo release hydraulic pressure line 221 when the 3–4 shift valve 105 has placed the spool in the left-end position. A hydraulic pressure line 226 branching off from the hydraulic pressure line 225 leads to the bypass valve 104, and is further brought into communication with the pressure chamber of the 3–4 clutch (3–4CL) 53 through a 3–4 clutch hydraulic pressure line 227 when the bypass valve 104 has placed the spool in the right-end position. Further, the hydraulic pressure line 224 leads directly to the bypass valve 104, and is brought into communication with the hydraulic pressure line 225 through the hydraulic pressure line 226 when the bypass valve 104 has placed the spool in the left-end position. In other words, the hydraulic pressure lines 224 and 225 are intercommunicated with each other by bypassing the orifice 151.

The third duty solenoid valve (DSV) 123 at the downstream side to which a control source hydraulic pressure is supplied from the second output hydraulic pressure-line 212 leads the lock-up control valve 106 through a hydraulic pressure line 228, and is brought into communication with the forward clutch hydraulic pressure line 219 when the lock-up control valve 106 has placed the spool in the right-end position. On the other hand, the third duty solenoid valve (DSV) 123 is brought into communication with the front pressure chamber 26a of the lock-up clutch 26 through a hydraulic pressure line 229 when the lock-up control valve 106 has placed the spool in the left-end position.

The third output hydraulic pressure line 213 extending from the manual shift valve 102 leads to the low-reverse valve 103 to supply the line hydraulic pressure to the low-reverse valve 103. The low-reverse valve 103 directs the line hydraulic pressure to the pressure chamber of the reverse clutch (RVCL) 52 through a reverse clutch hydraulic pressure line 230. A hydraulic pressure line 231 branching off from the third output hydraulic pressure line 213 leads to the bypass valve 104, and supplies the line hydraulic pressure as a pilot hydraulic pressure to the control port of the low-reverse valve 103 through the hydraulic pressure line 208 when the bypass valve 104 has placed the spool in the right-end position, forcing the low-reverse valve 103 to shift the spool toward the left-end position.

The hydraulic control circuit 100 is provided with a converter relief valve 109 to adjust the working hydraulic pressure supplied from the regulator 101 through a hydraulic pressure line 232 to a fixed level, and then directs the fixed level of hydraulic pressure to the lock-up control valve 106 through a hydraulic pressure line 233. The fixed level hydraulic pressure is supplied to the front pressure chamber 26a of the lock-up clutch 26 through the hydraulic pressure line 229 when the lock-up control valve 106 has placed the spool in the right-end position, and is supplied to the rear pressure chamber 26b through a hydraulic pressure line 234 when the lock-up control valve 106 has placed the spool in the left-end position. This lock-up clutch 26 is released when the fixed level hydraulic pressure is supplied to the front pressure chamber 26a, and is, however, controlled to allow slippage according to the level of the working hydraulic pressure supplied to the front pressure chamber 26a from the third duty solenoid valve (DSV) 123 when the lock-up control valve 106 has placed the spool in the left-end position.

A hydraulic pressure line 235, which is brought into communication with the main hydraulic pressure line 200 through the manual valve 102 in each of the drive (D) range, the second (S) range, the low speed (L) range and the neutral (N) range; leads to a reduction port 101b of the regulator valve 101 to introduce the line hydraulic pressure to the reduction port 101b in the respective range, so that the line hydraulic pressure is adjusted to be lower in level in these ranges than in the remaining range, i.e. the reverse (R) range.

Figure 4:
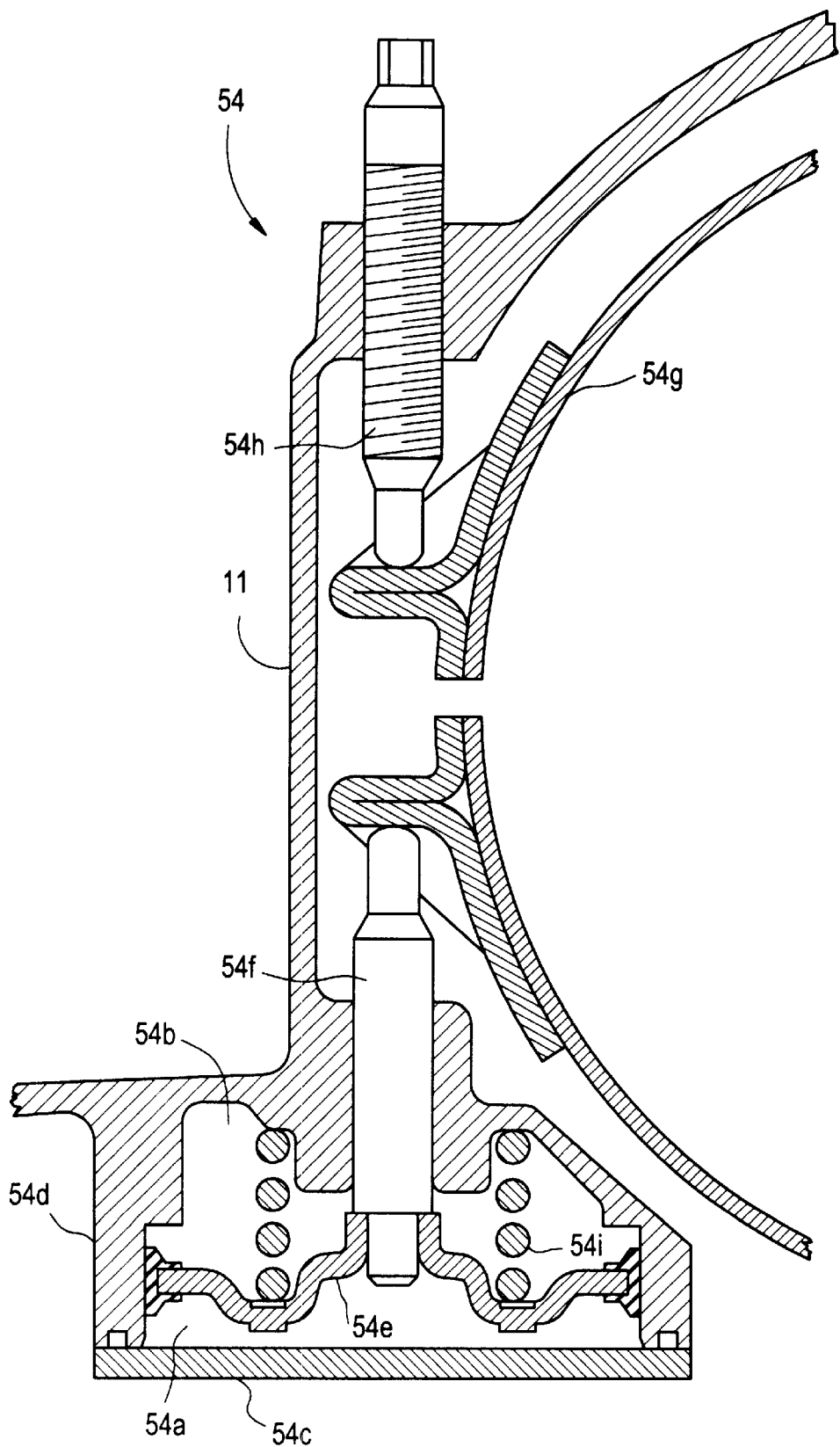
FIG. 4 is a cross-sectional view of a hydraulic actuator for a 2–4 brake.

FIG. 4 shows the structure of a hydraulic actuator of the 2–4 brake (2–4BR) 54 in detail. As shown in FIG. 4, the hydraulic actuator has a servo cylinder 54d and a piston 54e which is received in the servo cylinder 54d and provided with a stem 54f secured thereto. The servo cylinder 54b is comprised of part of the transmission housing 11 and a cover member 54c fixed to the transmission housing 11 to form therein a cylinder chamber which is divided into two subchambers by the piston 54e, i.e. the servo apply pressure chamber 54a and the servo release pressure chamber 54b. A brake band 54g, which is wrapped around a brake-receiving member, such as a brake drum, (not shown), has one end against which the piston stem 54f is forced to abut and another end against which a fixed stem 54h fastened to the transmission housing 11 abuts. A spring 54i is installed within the interior of the servo release pressure chamber 54b to force the piston 54e toward the servo apply pressure chamber 54a so as usually to loosen the brake band 54g. The working hydraulic pressure is supplied to both or one of the servo apply pressure chamber 54a and the servo release pressure chamber 54b from the hydraulic control circuit 100 to tighten or loosen the brake band 54g, locking or unlocking the 2–4 brake (2–4BR) 54. In this hydraulic actuator, especially, the piston 54e has nearly equal hydraulic pressure receiving areas at the side of the servo apply pressure chamber 54a and the side of the servo release pressure chamber 54b and, therefore, when, for example, both pressure chambers 54a and 54b are supplied with an equal working hydraulic pressure, the piston 54e is activated only by the expanding force of the spring 54i to move toward the servo apply pressure chamber 54a, so as to loosen the band brake 54g.

Figure 5:
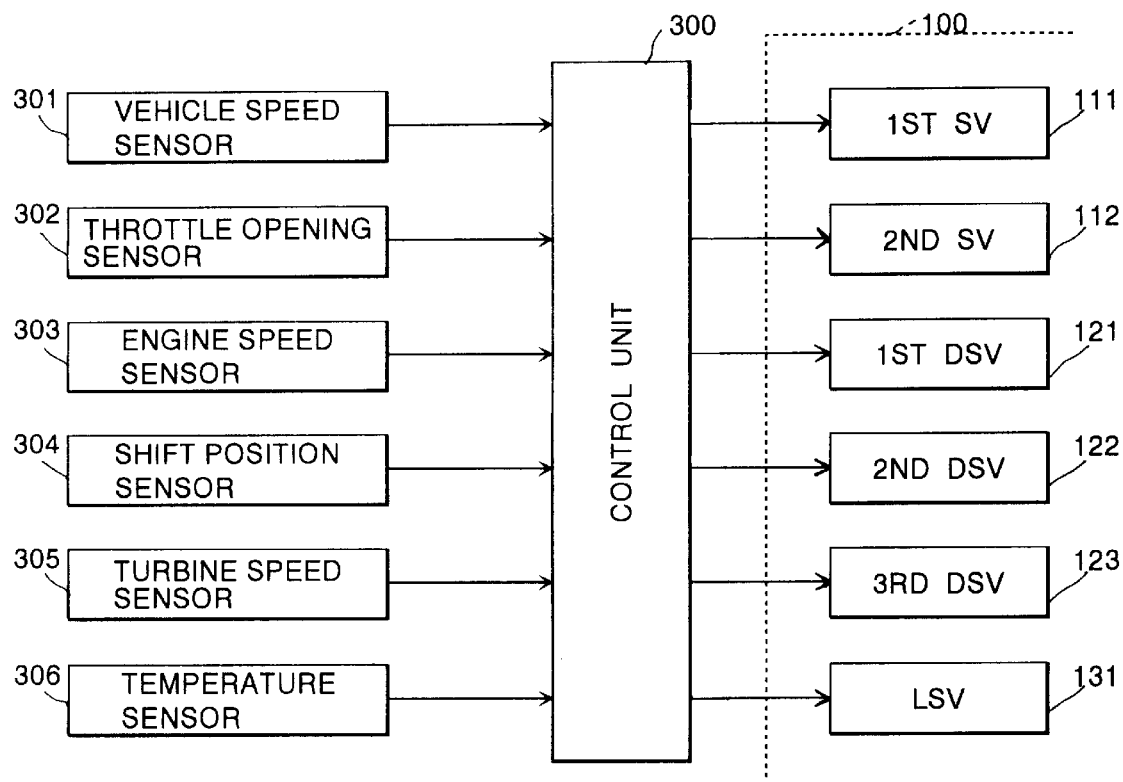
FIG. 5 is a block diagram illustrating a control system of various solenoid valves installed in the hydraulic control circuit.

FIG. 5 shows a control unit 300 provided in the automatic transmission 10 which controls the first and second solenoid valves (SVs) 111 and 112 and the first through third duty solenoid valves (DSVs) 121 through 123 as well as the linear solenoid valve 131. The control unit 300 receives various signals such as a vehicle speed signal from a speed sensor 301, a throttle opening signal from a throttle opening sensor 302, an engine speed signal from an engine speed sensor 303, a transmission position signal from a shift position sensor 304, a turbine speed signal from a turbine speed sensor 305, and a temperature signal from a fluid temperature sensor 306. With these signals, the control unit 300 controls operation of each of these valves 111, 112, 121–123 and 131 according to driving conditions of the vehicle or operating conditions of the engine. Various types of these sensors are well known in the art, and any well known type may be taken. As was previously described, in particular, the turbine speed sensor 305 may be installed as shown in FIG. 2.

The relationship between operation of these first and second solenoid valves (SVs) 111 and 112 and the first to third duty solenoid valves (DSVs) 121 to 123 and supply of the working hydraulic pressure to each of the friction coupling elements 51 to 55 is described in each of the possible gears in Table II. In Table II, a mark "○" (circle) in parentheses indicates an ON state in regard to the first and second solenoid valves (SVs) 111 and 112 and, however, an OFF state in regard to the first to third duty solenoid valves (DSVs) 121 to 123, in each state, the valve bringing fluid paths upstream and downstream from the valve into communication to permit a source hydraulic pressure to directly flow from the upstream path to the downstream path. Also, a mark "X" in parentheses indicates an OFF state in regard to the first and second solenoid valves (SVs) 111 and 112 and an ON state in regard to the first to third solenoid valves (DSVs) 121 to 123, in each both state, the valve draining the working fluid from the upstream path while shutting off the upstream path.

TABLE II

| RANGE | DRIVE (SECOND) | | | | LOW | REV. |
|---|---|---|---|---|---|---|
| GEAR | 1ST | 2ND | 3RD | 4TH | 1ST | REV. |
| 1ST SV (111) | X | X | X | O | O | O |
| 2ND SV (112) | X | X | X | X | O | O |
| 1ST DSV (121) | X | O | O | O | O | O |
| 2ND DSV (122) | X | X | O | O | X | O |
| 3RD DSV (123) | O | O | O | X | O | O |

Figure 6:
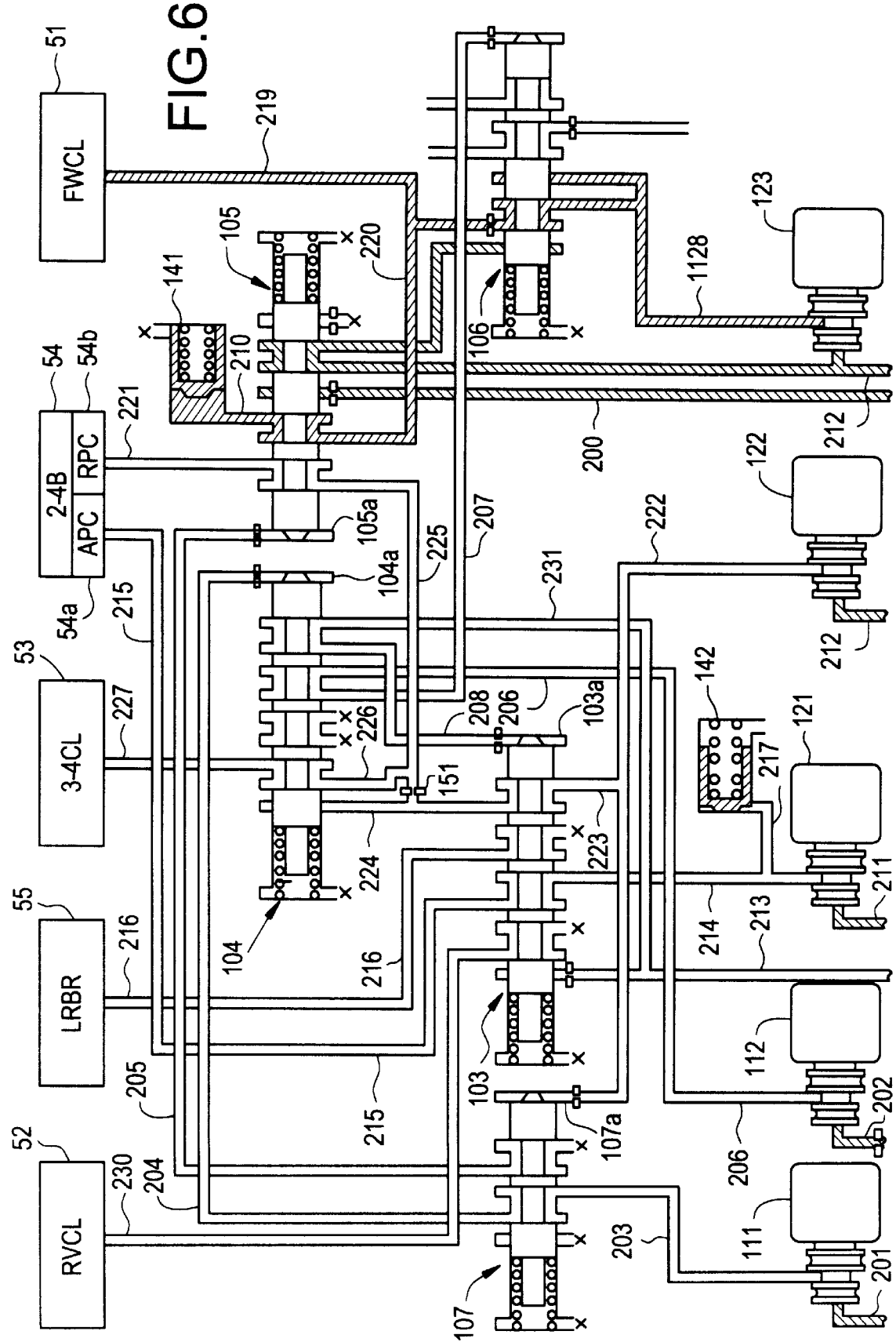
FIG. 6 is an enlarged view of an essential part of the hydraulic control circuit of FIG. 3 which is in a state for a first gear.

As shown in FIG. 6 and indicated in Table II, for the first (1ST) gear in the forward ranges excepting the low-speed (L) range, only the third duty solenoid valve (DSV) 123 operates to generate a working hydraulic pressure from the line hydraulic pressure as a source hydraulic pressure from the second output hydraulic pressure line 212. This working hydraulic pressure is supplied to the lock-up control valve 106 through the hydraulic pressure line 228. Because, at this time, the lock-up control valve 106 has placed the spool in the right-end position, the working hydraulic pressure is directed to the pressure chamber of the forward clutch (FWCL) 51 as a forward clutch hydraulic pressure through the forward clutch hydraulic pressure line 219, locking the forward clutch (FWCL) 51. In this instance, because the hydraulic pressure line 220 branching off from the forward clutch hydraulic pressure line 219 has been brought into communication with the first accumulator 141 through the hydraulic pressure line 210 via the 3–4 shift valve 105, the forward clutch hydraulic pressure is supplied smoothly.

Figure 7:
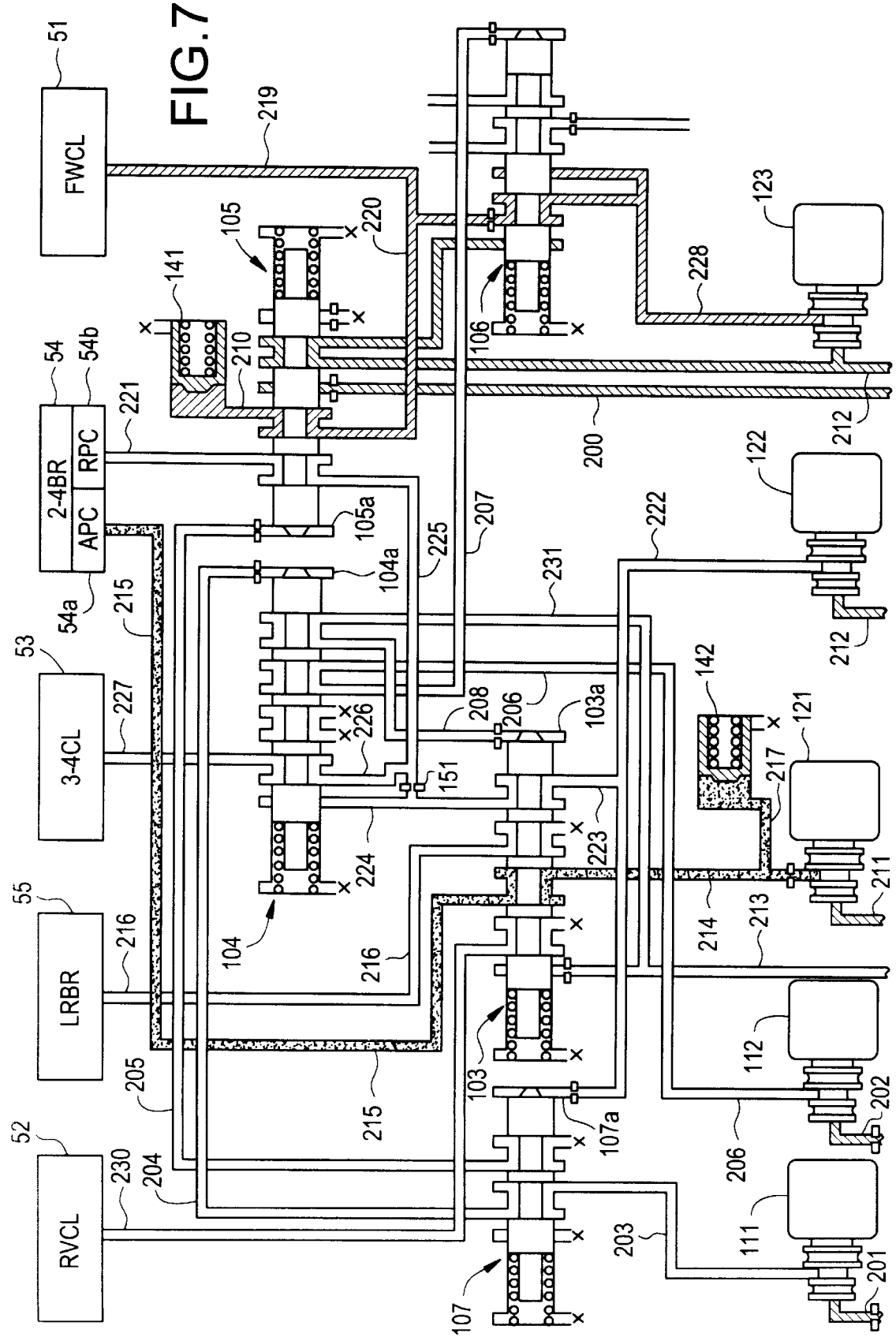
FIG. 7 is an enlarged view of an essential part of the hydraulic control circuit of FIG. 3 which is in a state for a second gear.

For the second (2ND) gear, as shown FIG. 7 and indicated in Table II, in addition to the third duty solenoid valve (DSV) 123 locked in the first (1ST) gear, the first duty solenoid valve (DSV) 121 operates to generate a working hydraulic pressure from the line hydraulic pressure as a source hydraulic pressure from the first output hydraulic pressure line 211. This working hydraulic pressure is supplied to the low-reverse valve 103, and at this time, because the low-reverse valve 103 has placed the spool in the right-end position, the working hydraulic pressure is directed into the servo apply hydraulic pressure line 215, and then supplied to the servo apply pressure chamber 54a of the 2–4 brake (2–4BR) 54 and locking the 2–4 brake (2–4BR) 54, while the forward clutch (FWCL) 51 is locked. In this instance, because the hydraulic pressure line 214 leads to the second accumulator 142 through the hydraulic pressure line 217, it is gentle to supply the servo apply hydraulic pressure line 215, and hence to lock the 2–4 brake (2–4BR) 54. The working fluid accumulated in the accumulator 142 is precharged to the pressure chamber of the low-reverse brake (LRBR) 55 through the low-reverse brake hydraulic pressure line 216 when the low-reverse valve 103 shifts the spool toward the left-end position during a gear shift to the first (1ST) gear in the low-speed (L) range, as will be described later.

Figure 8:
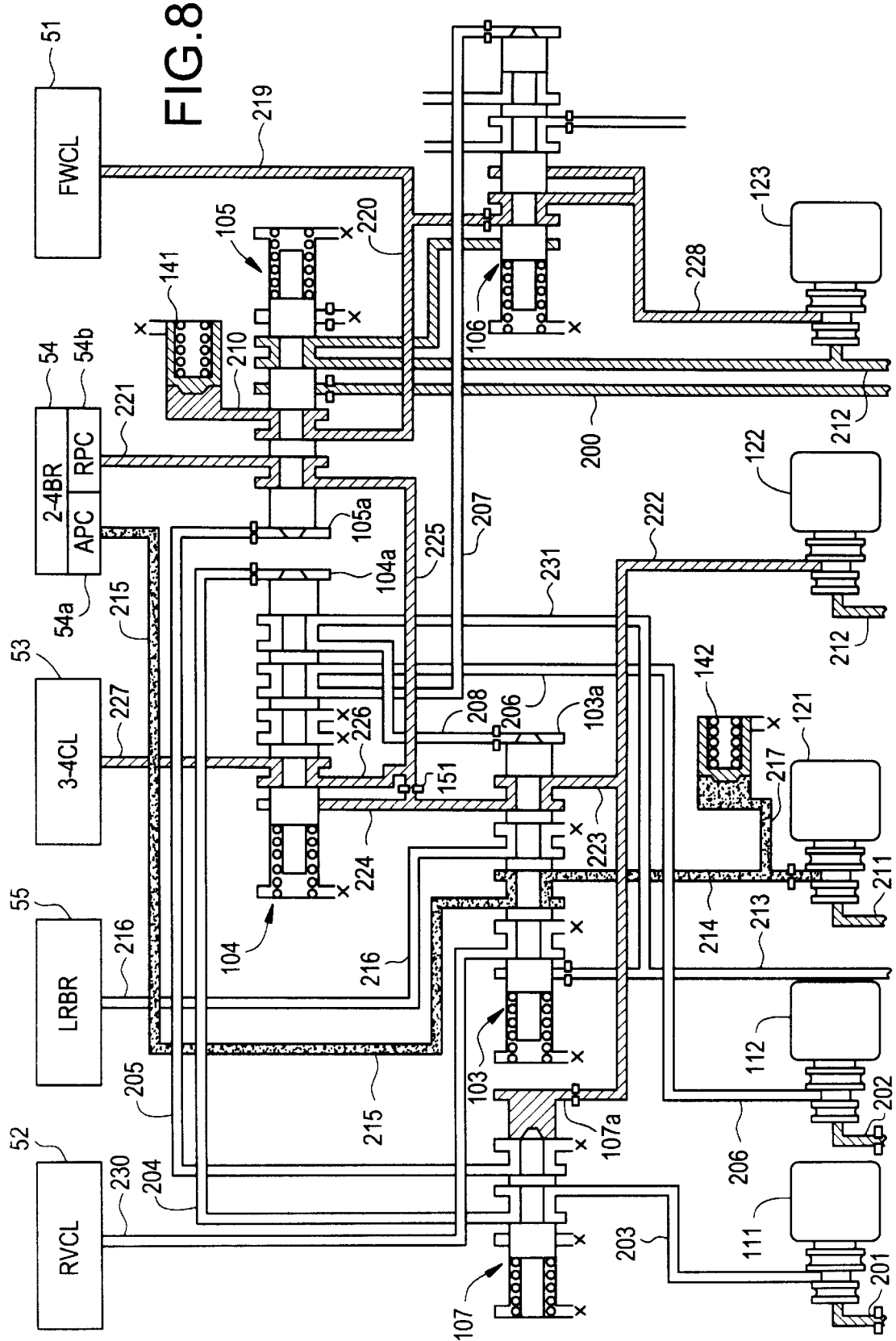
FIG. 8 is an enlarged view of an essential part of the hydraulic control circuit of FIG. 3 which is in a state for a third gear.

For the third (3RD) gear, as shown FIG. 8 and indicated in Table II, while the first and second solenoid valves (SVs) 111 and 112 and the first and third duty solenoid valves (DSVs) 121 and 123 remains in the state of the second (2ND) gear, the second duty solenoid valve (DSV) 122 operates to generate a working hydraulic pressure from the line hydraulic pressure as a source hydraulic pressure supplied from the second output hydraulic pressure line 212. This working hydraulic pressure is supplied to the low-reverse valve 103 through the hydraulic pressure lines 222 and 223, and then, because the low-reverse valve 103 still remains the spool in the right-end position, directed to the hydraulic pressure line 224. As a result, the working hydraulic pressure is introduced into the hydraulic pressure line 225 through the orifice 151 from the hydraulic pressure line 224, and then to the 3–4 shift valve 105. At this time, because the 3–4 shift valve 105 has placed the spool in the left-end position, the working hydraulic pressure is further directed as a servo release hydraulic pressure to the servo release pressure chamber 54b of the 2–4 brake (2–4BR) 54 through the servo release hydraulic pressure line 221. Consequently, the 2–4 brake (2–4BR) 54 is unlocked or released. On the other hand, the working hydraulic pressure is directed to the bypass valve 104 through the hydraulic pressure line 226 branching off from the hydraulic pressure line 225 after the orifice 151. At this time, because the bypass valve 104 has been placed the spool in the right-end position, the working hydraulic pressure is also supplied as a 3–4 clutch hydraulic pressure to the pressure chamber of the 3–4 clutch (3–4CL) 53 through the 3–4 clutch hydraulic pressure line 227. In this way, while the 2–4 brake (2–4BR) 54 is unlocked, both forward clutch (FWCL) 51 and 3–4 clutch (3–4CL) 53 are locked. In this instance, in the sate of operation of the valves for the third (3RD) gear, the second duty solenoid valve (DSV) 122 generates the working hydraulic pressure, as was previously described, and supplies it to the relay valve 107 at the control port 107a through the hydraulic pressure line 222 to force the relay valve 107 to shift the spool to the left-end position.

Figure 9:
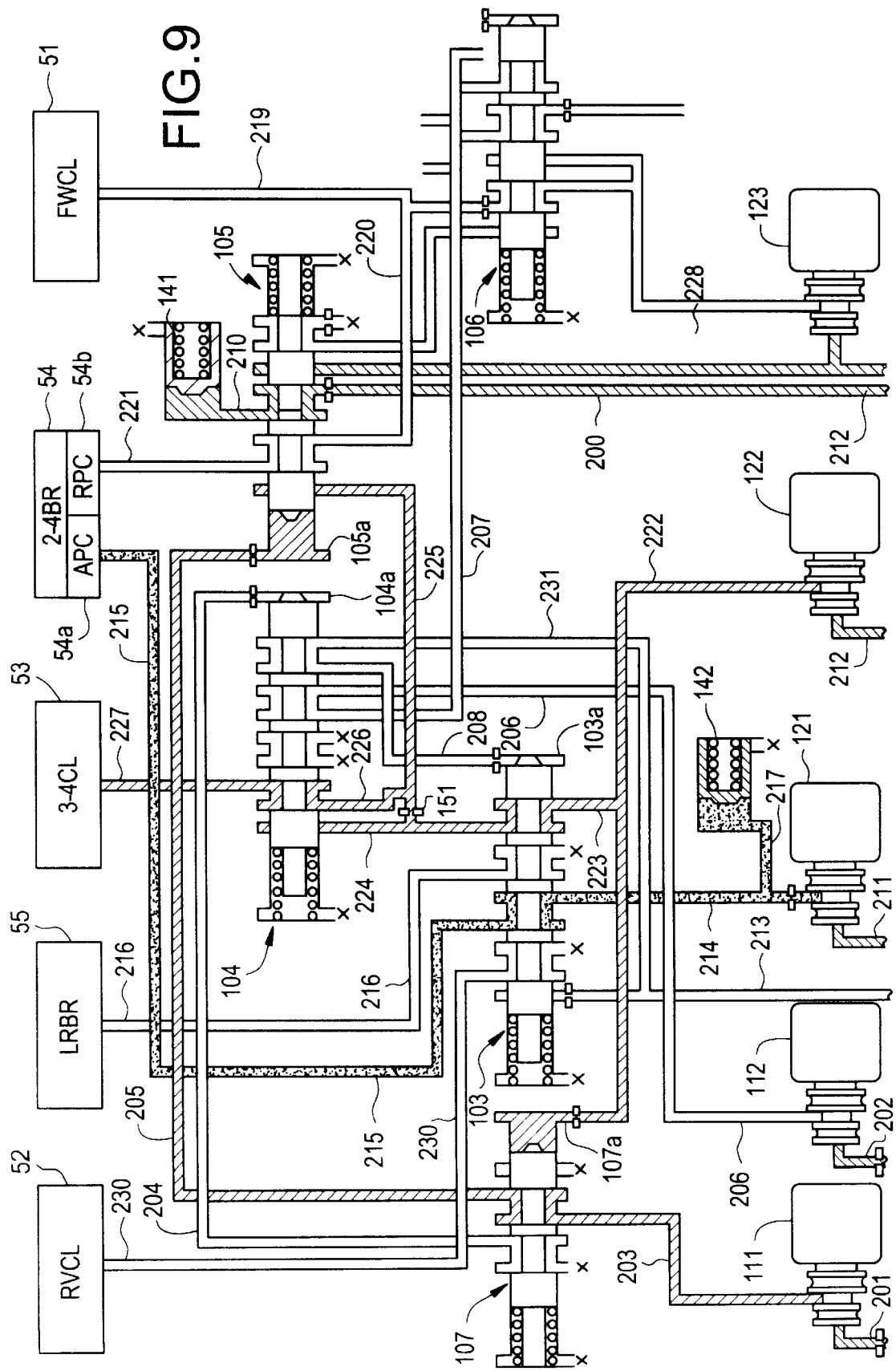
FIG. 9 is an enlarged view of an essential part of the hydraulic control circuit of FIG. 3 which is in a state for a forth gear.

For the forth (4TH) gear, as shown in FIG. 9 and indicated in Table II, while the valves 112, 121 and 122 remain in the same state of operation as for the third (3RD) gear, the third duty solenoid valve (DSV) 123 stops the generation of working hydraulic pressure, and, on the other hand, the first solenoid valve (SV) 111 operates. Consequently, the first solenoid valve (SV) 111 supplies the fixed level hydraulic pressure to the relay valve 107 from the hydraulic pressure line 201 through the hydraulic pressure line 203. At this time, because the relay valve 107 has placed the spool in the left-end position for the third (3RD) gear, it directs the fixed level hydraulic pressure to the 3–4 shift valve 105 at the control port 105a through the hydraulic pressure line 205, forcing the 3–4 shift valve 105 to shift the spool to the right-end position, so that the servo release hydraulic pressure line 221 is brought into communication with the hydraulic pressure line 220 branching off from the forward clutch hydraulic pressure line 219 to put the releasing chamber 54b of the 2–4 brake (2–4BR) 54 and the pressure chamber of the forward clutch (FWCL) 51 intercommunicated with each other.

By means of putting the third duty solenoid valve (DSV) 123 inoperative to stop the generation of working hydraulic pressure and drain the working fluid from the downstream path from the third duty solenoid valve (DSV) 123, while the servo release hydraulic pressure is drained from the releasing chamber 54b of the 2–4 brake (2–4BR) 54 through the hydraulic pressure line 228 via the lock-up control valve 106, to lock the 2–4 brake (2–4BR) 54 again, and the forward clutch hydraulic pressure is drained from the pressure chamber of the forward clutch (FWCL) 51 through the hydraulic pressure line 228 via the lock-up control valve 106 to unlock the forward clutch (FWCL) 51.

Figure 10:
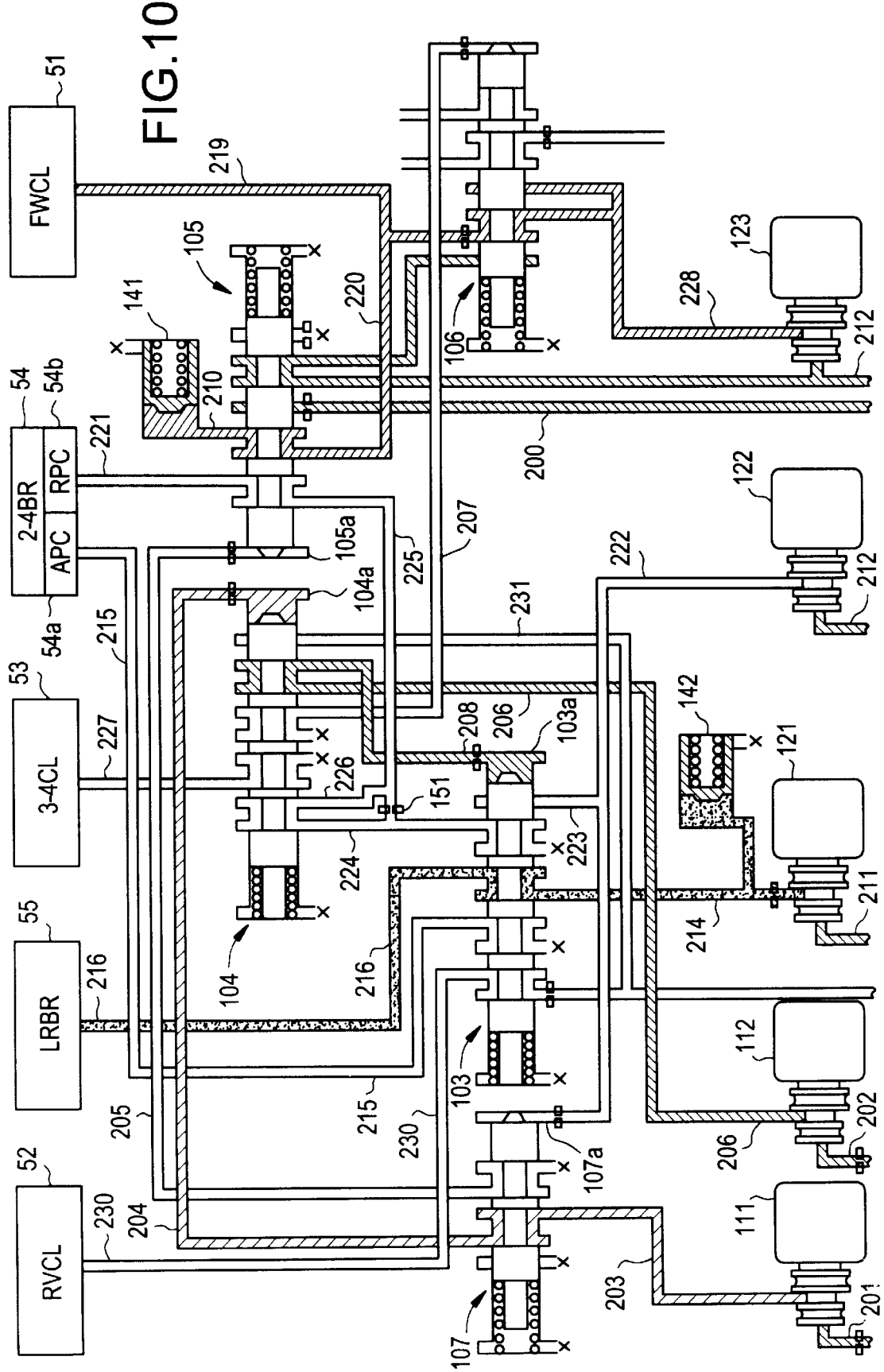
FIG. 10 is an enlarged view of an essential part of the hydraulic control circuit of FIG. 3 which is in a state for the forth gear in a low-speed (L) range.

For the first (1ST) gear in the low-speed (L) range, as shown in FIG. 10 and indicated in Table II, the first and second solenoid valves (SVs) 111 and 112, and the first and third duty solenoid valves (DSVs) 121 and 123 operate to supply the working hydraulic pressure generated by way of the third duty solenoid valve (DSV) 123 as a forward clutch hydraulic pressure to the pressure chamber of the forward clutch (FWCL) 51 through the hydraulic pressure line 228 and forward clutch hydraulic pressure line 219 via the lock-up control valve 106 in a similar way for the first (1ST) gear, for example, in the drive (D) range. In this manner, the forward clutch (FWCL) 51 is applied with the working hydraulic pressure to lock. At this time, due to accumulation of the working hydraulic pressure in the first accumulator 141 through the hydraulic pressure lines 210 and 220 via the 3–4 shift valve, the forward clutch (FWCL) 51 is locked smoothly.

By means of the operation of the first solenoid valve (SV) 111, the bypass valve 104 at the control port 104a is supplied with a pilot hydraulic pressure through the hydraulic pressure lines 203 and 204 via the relay valve 107 to shift the spool to the left-end position, which is followed by introduction of the working hydraulic pressure into the hydraulic pressure line 208 through the hydraulic pressure line 206 via the bypass valve 104, forcing the low reverse valve 103 to shift the spool to the left-end position. Consequently, the working hydraulic pressure at the first duty solenoid valve (DSV) 121 is supplied as a low-reverse brake hydraulic pressure to the pressure chamber of the low-reverse brake (LRBR) 55 through the low-reverse brake hydraulic pressure line 216 the low-reverse valve 103, by which, while the forward clutch (FWCL) 51 is locked, the low-reverse brake (LRBR) 55 is locked, providing the first (1ST) gear where engine brake is available.

Figure 11:
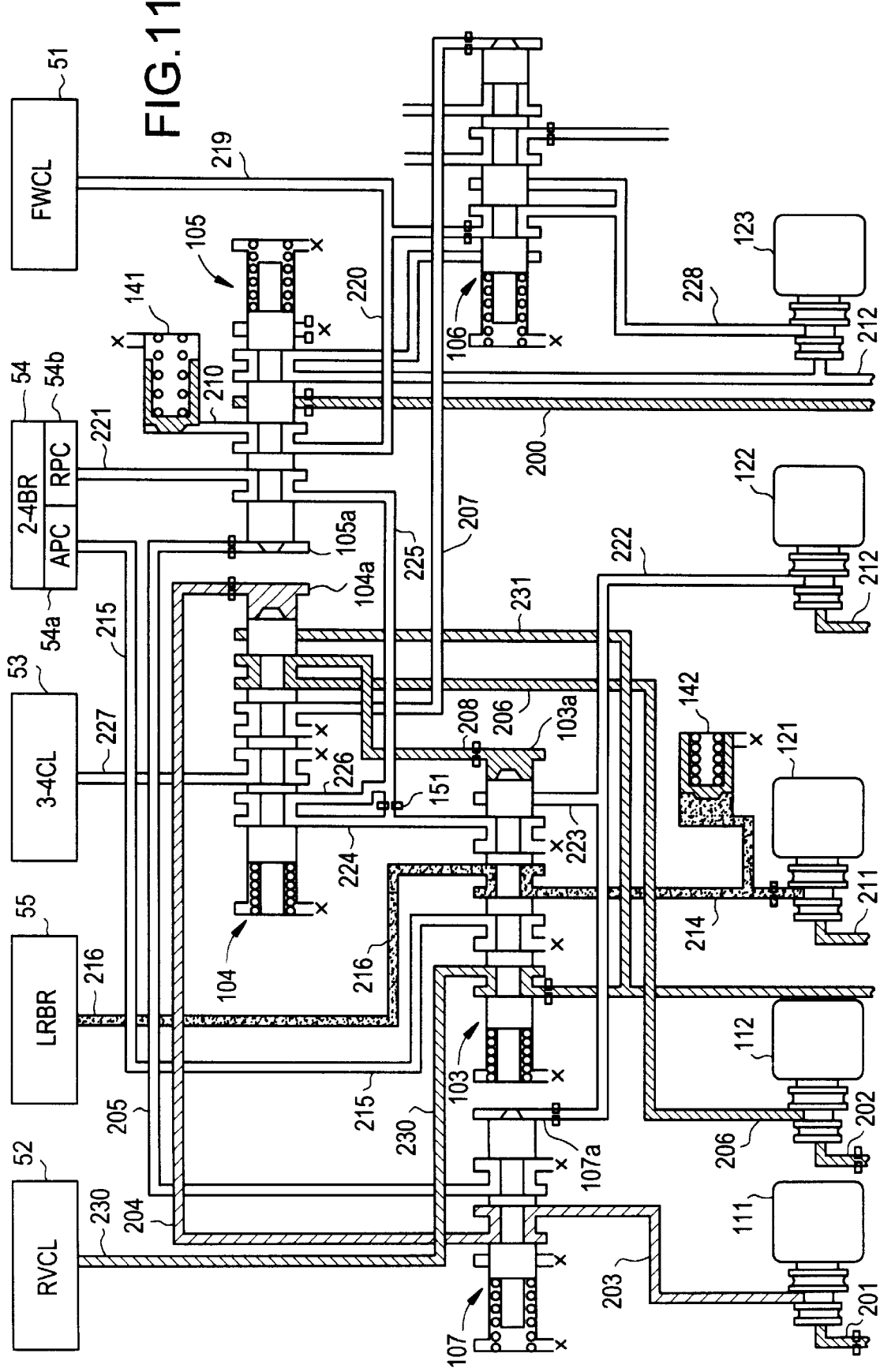
FIG. 11 is an enlarged view of an essential part of the hydraulic control circuit of FIG. 3 which is in a state for a reverse gear

In the reverse (R) range, as shown in FIG. 11 and indicated in Table II, all of the valves 111 and 112, and 121 to 123 operate. In this state, the second and the third duty solenoid valves (DSVs) 122 and 123 do not generate any working hydraulic pressure due to interruption of supply of the source hydraulic pressure thereto from the second output hydraulic pressure line 212. As was described, because the first and second solenoid valves (SVs) 111 and 112 operate, the bypass valve 104 shifts the spool to the left-end position similarly for the first (1ST) gear in the low-speed (L) range, which is followed by forcing the low reverse valve 103 to shift the spool to the left-end position. Under this circumstance, the working hydraulic pressure generated at the first duty solenoid valve (DSV) 121 is supplied as the low-reverse brake hydraulic pressure to the pressure chamber of the low-reverse brake (LRBR) 55. In the reverse (R) range, the line hydraulic pressure is introduced into the third output hydraulic pressure line 213 from the manual shift valve 102, and is directed as a reverse clutch hydraulic pressure to the pressure chamber of the reverse clutch (RVCL) 53 through the reverse clutch hydraulic pressure line 230 via the low-reverse valve 103 with the spool shifted to the left-end position. Consequently, the reverse clutch (RVCL) 52 and the low reverse brake (LRBR) 55 are locked. In this instance, the line hydraulic pressure is introduced into the third output hydraulic pressure line 213 from the manual valve 102 even in the neutral (N) range, locking the reverse clutch (RVCL) 52 in the neutral (N) range when the low reverse valve 103 has placed the spool to the left-end position.

Control Operation

The following description is directed to gear shifts, such as down shifts, where two specific friction coupling elements are simultaneously locked and unlocked.

Generally, down shifts are classified into two groups, namely torque demand down shifts which accompany an increase in throttle opening and, in contrast with this, regular down shifts performed with the engine throttle fully closed which include manual down shifts and coast down shifts which accompany a reduction in vehicle speed. These groups of down shifts require shift control in different ways.

(A) Torque Demand Down Shift

Figure 12:
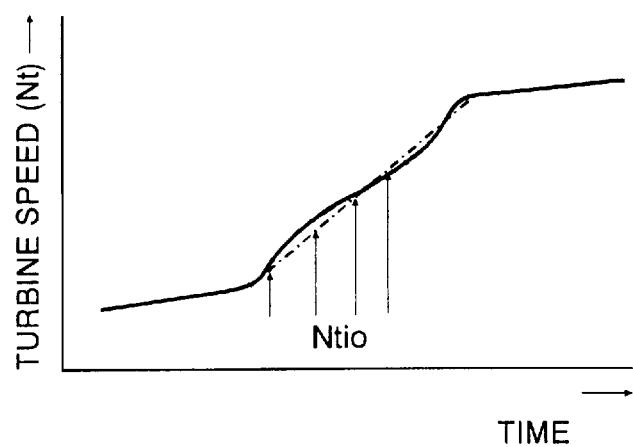
FIG. 12 is an explanatory diagram for feedback control of the turbine speed during a down shift.

For the torque demand down shift, one of the two specific friction coupling elements is started to unlock prior to locking another specific friction coupling element to allow slippage of the friction coupling element to increase the speed of turbine (Nt) with an increase in engine speed. When the turbine speed reaches closely a turbine speed immediately after gear shift (which is hereafter referred to as an after shift-end speed $Nti_0$) which has been previously calculated, while the other friction coupling element is locked, the friction coupling element is completely unlocked to conclude a down shift to a desired gear. In this event, the increasing turbine speed is feedback controlled by controlling the unlocking working hydraulic pressure acting on the friction coupling element, i.e. slippage of the friction coupling element. As shown in FIG. 12, while the turbine speed (Nt) is matched to a target turbine speed $Nti_0$ (shown by a dotted broken line) during every control cycle, it is increased to an after shift-end target speed $Nti_0$ as quickly as possible to devise the improved responsiveness of gear shift. The overall shift control of a torque demand down shift will be explained in regard to a gear shift from fourth gear to third gear (4-3 gear shift) as an example.

(A-1) 4-3 Gear Shift Control

As is apparent from the previously description in connection with Table II and FIGS. 8 and 9, upon a 4-3 gear shift, a change is cased from an operation pattern where the first solenoid valve (SV) 111 and the first and second duty solenoid valves (DSVs) 121 and 122 are ON to place the 3–4 clutch (3–4CL) 53 and 2–4 brake (2–4BR) 54 locked to an operation pattern where the first solenoid valve (SV) 111 goes OFF and the third Duty solenoid valve (DSV) 123 goes ON in stead to place the 3–4 clutch (3–4CL) and forward clutch (FWCL) 51 locked. In other words, during the 4-3 gear shift, replacement of locked and unlocked friction coupling elements causes between the 2–4 brake (2–4BR) 54 and the forward clutch (FWCL) 51. With the present embodiment, the first solenoid valve (SV) 111 remains ON during the 4-3 gear shift, holding the 3–4 shift valve 105 with the spool placed in the right-end position to maintain the servo release hydraulic pressure line 221 and forward clutch hydraulic pressure line 219 in communication with each other. In this state, the third duty solenoid valve (DSV) 123 supplies the servo release hydraulic pressure and the forward clutch hydraulic pressure to the 2–4 brake (2–4BR) 54 and the forward clutch (FWCL) 51, causing the replacement of locked and unlocked friction coupling elements between the 2–4 brake (2–4BR) 54 and the forward clutch (FWCL) 51.

On the other hand, before the replacement of locked and unlocked friction coupling elements, the feedback control of the turbine speed is performed by means of the first duty solenoid valve (DSV) 121. Specifically, the first duty solenoid valve (DSV) 121 is operated at a lowered duty rate to lower the servo apply hydraulic pressure in level so as to allow the 2–4 brake (2–4BR) 54 to cause a specified amount of slippage. While this amount of slippage of the 2–4 brake (2–4BR) 54 is controlled to make the turbine speed match a specified target turbine speed, the turbine speed is increased until reaching nearly an after shift-end target speed. At the moment that the after shift-end target speed is attained, the replacement of locked and unlocked friction coupling elements is performed to achieve the 4-3 gear shift. In this instance, as was previously described, each of the duty solenoid valves (DSVs) 121 to 123 is in a draining state where no working hydraulic pressure is generated when operating at a duty rate of 100%; is in a completely open state where the working hydraulic pressure is equal to the source hydraulic pressure when operating at a duty rate of 0%; and performs control of the working hydraulic pressure when operating at intermediate duty rates between 0 and 100%.

The first solenoid valve (SV) 111 turns OFF in the end of the gear shift, causing the 3–4 shift valve 105 to shift the spool to the right-end position, and hence, disconnecting the communication between the servo release hydraulic pressure line 221 and the forward clutch 219. The forward clutch (FWCL) 51 is still supplied with the forward clutch locking hydraulic pressure by way of the third duty solenoid valve (DSV) 123. The duty rate of the first duty solenoid valve (DSV) 121 returns to 0% lastly at the completion of the 4-3 gear shift. As a result, the servo apply hydraulic pressure, which is lowered once during the turbine speed feedback control, raises again, and then it is supplied to the servo release pressure chamber 54b of the 2–4 brake (2–4BR) 54. At this time, because the 2–4 brake (2–4BR) 54 has, however, been filled with the servo release hydraulic pressure in the servo release pressure chamber 54b, the 2–4 brake (2–4BR) 54 is resultingly unlocked. This re-supply of servo apply hydraulic pressure takes effect in order to remain the 2–4 brake (2–4BR) 54 filled with the servo apply hydraulic pressure in the servo release pressure chamber 54b in consideration that the 2–4 brake (2–4BR) 54 is expected to be locked again during a 3-2 gear shift or a 3–4 gear shift which has a great potential to occur succeedingly to the 4-3 gear shift.

(A-1)-I Control of First Duty Solenoid Valve

Figure 13:
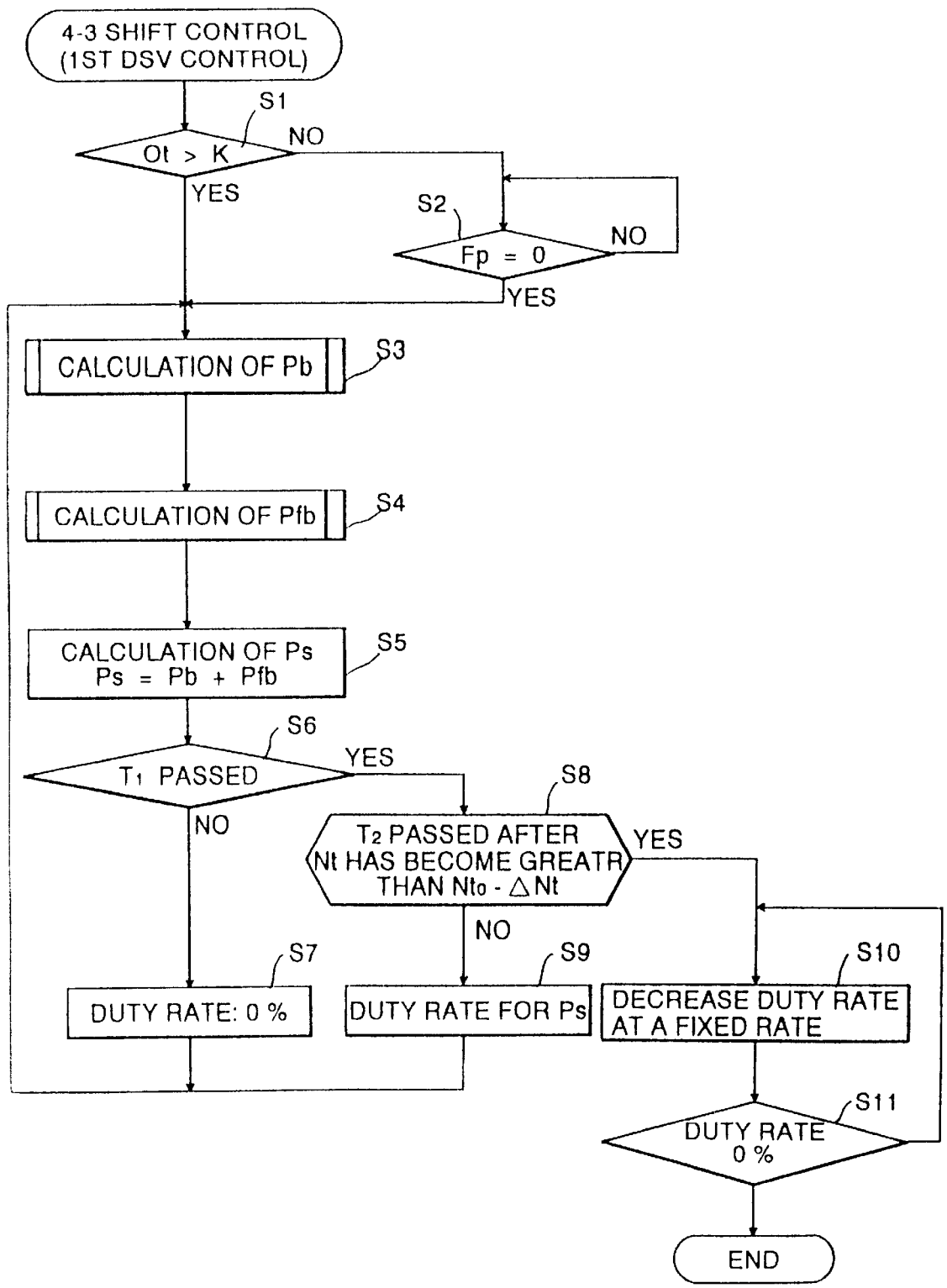
FIG. 13 is a flowchart illustrating the main routine of the first duty solenoid control during a 4-3 torque demand down shift.

The control of servo apply hydraulic pressure by way of the first duty solenoid valve (DSV) 121 is performed to feedback control the turbine speed in a programmed sequence routine shown in FIG. 13. Explaining this programmed sequence routine with reference to a time chart shown in FIG. 14, when a 4-3 gear shift command is given, it is determined at step S1 whether or not the temperature of working fluid Tf is higher than a specified temperature Tk. This temperature Tk is established to be extremely low such as minus 30° C. If the fluid temperature Tf is extremely low closely to the specified temperature Tk, then, it is determined based on the present state of a precharge flag Fp at step S2 whether or not it is now in the precharge interval control of servo release hydraulic pressure or forward clutch hydraulic pressure which is performed during the presence of the gear shift command.

This precharge interval control, as will be described later in a paragraph (A-1)-VI, is performed in order to avoid the delay of locking the forward clutch (FWCL) 51 or unlocking the 2–4 brake (2–4BR) 54 by previously quickly filling the working fluid beforehand into the fluid paths leading to the servo release pressure chamber 54b of the 2–4 brake (2–4BR) 54 and the pressure chamber of the forward clutch (FWCL) 51, respectively, immediately before commencement of the gear shift. When it is determined to be still in the precharge interval, then, the precharge flag Fp is set to a state of "1," and, on the other hand, when it is determined that the precharge interval has been over, the precharge flag Fp is reset to a state of "0". The determination made at step S2 is repeated until the flag Fp is reset to the state of "0." Consequently, the substantial control of the first duty solenoid valve (DSV) 121 does not start immediately after the appearance of a gear shift command and take effect with a delay of time. The significance of this delayed start of the control of the first duty solenoid valve (DSV) 121 will be explained in paragraph (A-1)-VII, and the following description is directed to when the fluid temperature is not so low but at normal temperatures.

When it is determined at step S1 that the fluid temperature is normal, then, a calculated hydraulic pressure Ps is derived by adding a base hydraulic pressure Pb and a feedback hydraulic pressure Pfb at step S5 subsequently to calculations of the base hydraulic pressure Pb and the feedback hydraulic pressure Pfb made at steps S3 and S4, respectively. The calculation of these base hydraulic pressure Pb and feedback hydraulic pressure Pfb will be described in connection with hydraulic pressure calculation subroutines shown in FIGS. 15 and 18, respectively.

At step S6, it is determined whether or not a specified time T1 has passed immediately after the appearance of the gear shift command. Until the specified time T1 passes, the first duty solenoid valve (DSV) 121 is held to operate at a duty rate of 0% at step S7 so as to sustain the 2–4 brake (2–4BR) 54 still locked. This is because, the control of the working hydraulic pressure for the 2–4 brake (2–4BR) 54 is performed after the stability of a line hydraulic pressure for the reason that the line hydraulic pressure rises suddenly together with an increase in throttle opening during a torque demand gear shift. When the specified time T1 has passed, it is determined at step S8 whether or not a specified time T2 has additionally passed subsequently to a rise in turbine speed Nt to a speed which is to be attained immediately before the conclusion of the gear shift and is regarded to be smaller than an after shift-end speed $Nt_0$ by a specific speed $\Delta Nt$. This speed is hereafter referred to as a before shift-end speed.

Until a lapse of the specified time T2, a signal indicating a duty rate corresponding to the calculated hydraulic hydraulic pressure Ps which has been derived at step S5 is provided for the first duty solenoid valve (DSV) 121 to control the servo apply hydraulic pressure at step S9. On the other hand, after a lapse of the specified time T2, the duty rate is reduced at a fixed rate at steps S10 and returned once again to 0% through steps S10 and S11 in order to raise the servo apply hydraulic pressure. In this instance, the reason that the servo apply hydraulic pressure control, i.e. the turbine speed feedback control, is continuously performed until the lapse of the specified time T2 subsequent to the rise of turbine speed Nt to the before shift-end speed $(Nti_0-\Delta Nt)$ is that, because, as will be described in detail in paragraph (A-1)-IV later, the working hydraulic pressure, i.e. the forward clutch hydraulic pressure, and hence the servo release hydraulic pressure, is supplied in advance through the control of the third duty solenoid valve (DSV) 123 when the turbine speed Nt reaches the before shift-end speed $(Nti_0-\Delta Nt)$, it is necessary to interrupt re-supply of the servo apply hydraulic pressure to the release pressure chamber 54b of the 2–4 brake (2–4BR) 54, in other words, to prevent the 2–4 brake (2–4BR) 54 from being locked, until the forward clutch (FWCL) 51 is completely locked by the advanced supply of the forward clutch locking hydraulic pressure and the 2–4 brake (2–4BR) 54 at the release pressure chamber 54b is fully filled with the servo release hydraulic pressure.

(A-1)-II Calculation of the Base Hydraulic pressure Pb.

Figure 15:
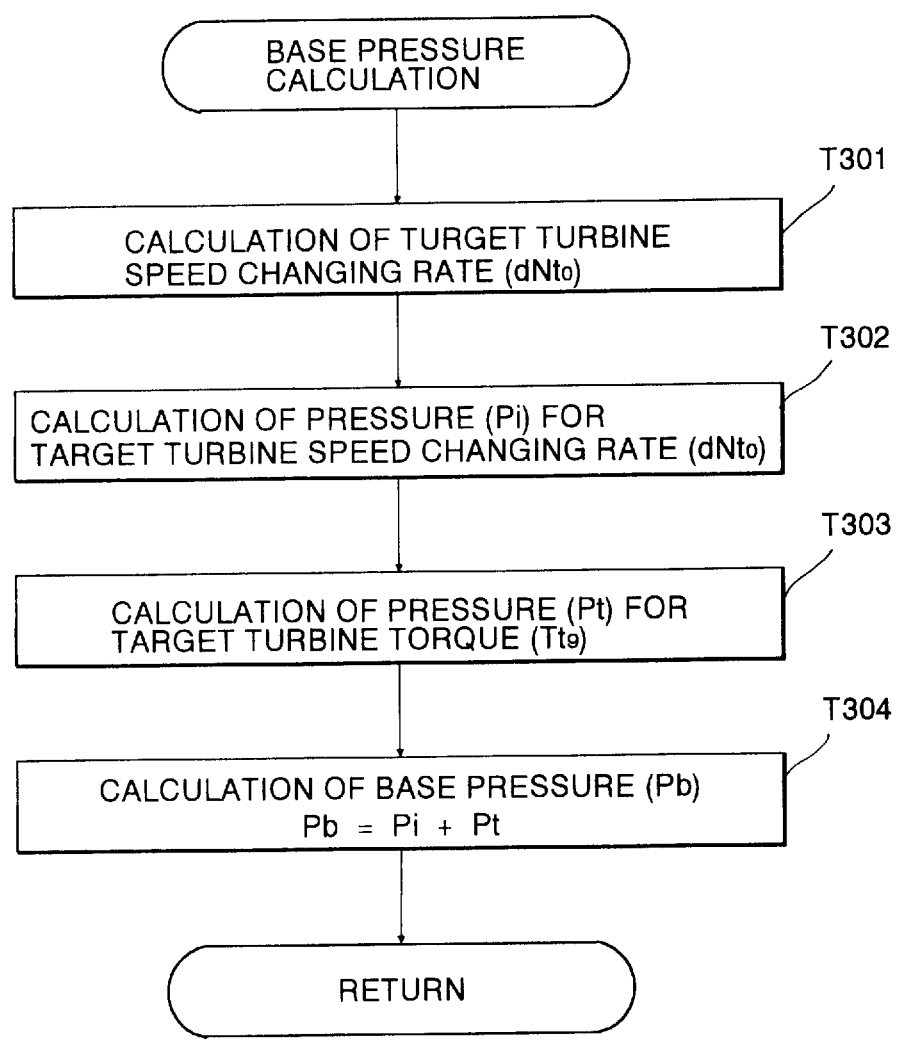
FIG. 15 is a flowchart illustrating the sequence routine of base hydraulic pressure calculation performed during the 4-3 torque demand down shift.

The calculation of the base hydraulic pressure Pb which occurs at step S3 of the main routine shown in FIG. 13 is accomplished following the flowchart illustrating the base hydraulic pressure calculation sequence routine shown in FIG. 15.

Figure 16:
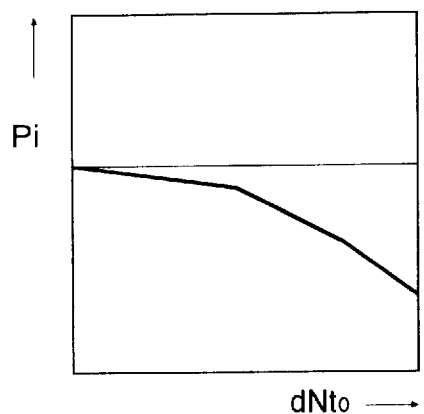
FIG. 16 is a map of hydraulic pressure with respect to target turbine speed change rate used in the base hydraulic pressure calculation.
Figure 17:
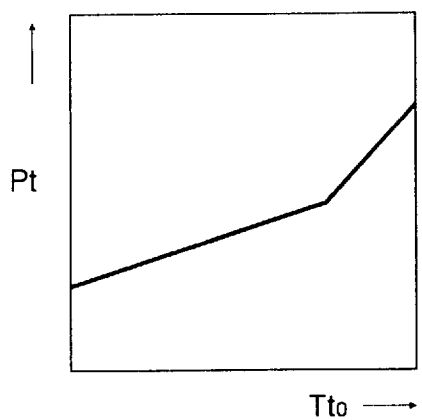
FIG. 17 is a map of hydraulic pressure with respect to target turbine torque used in the base hydraulic pressure calculation.

At step T301, a target turbine speed change rate $dNt_0$ during the gear shift is calculated, and then, at step T302, a hydraulic pressure Pi for the target turbine speed change rate $dNt_0$ is calculated based on a hydraulic pressure map such as shown in FIG. 16 in which the hydraulic pressure Pi is set to become lower as the target turbine speed change ratio $dNt_0$ becomes greater. Subsequently, at step T303, a hydraulic pressure Pt corresponding to the target turbine torque $Tt_0$ during the gear shift is calculated based on a hydraulic pressure map such as shown in FIG. 17 in which the hydraulic pressure Pi is set to become higher as the target turbine torque $Tt_0$ becomes greater. Finally, at step T304, the base hydraulic pressure Pb is found by adding these hydraulic pressures Pi and Pt. This base hydraulic pressure Pb is used as the fixed level hydraulic pressure during the servo apply hydraulic pressure control as indicated by a symbol "A" in FIG. 14.

(A-1)-III Calculation of the Feedback Hydraulic pressure Pfb

Figure 18:
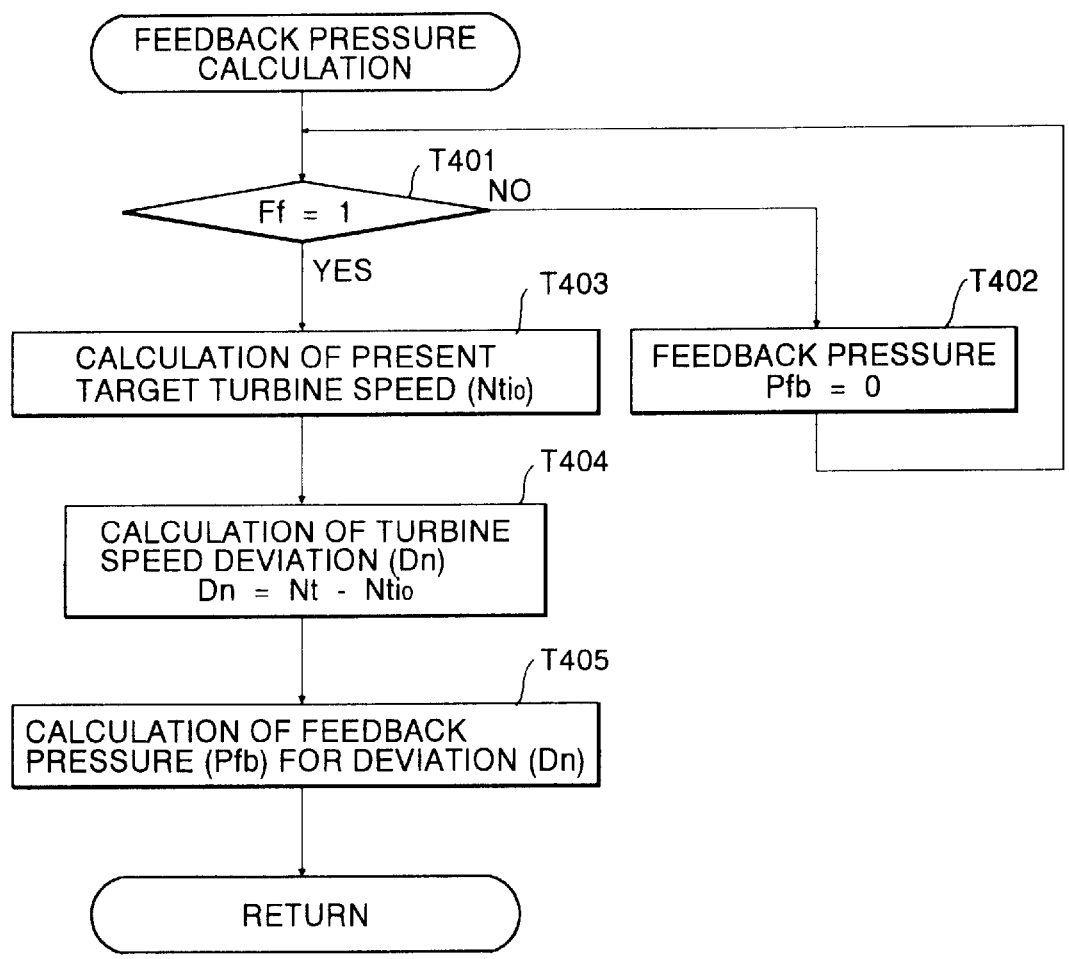
FIG. 18 is a flowchart illustrating the sequence routine of feedback hydraulic pressure calculation during the 4-3 torque demand down shift.

The calculation of the feedback hydraulic pressure Pfb made at step S4 of the main routine shown in FIG. 13 is accomplished following the flowchart illustrating the feedback hydraulic pressure calculation sequential routine shown in FIG. 18.

Figure 19:
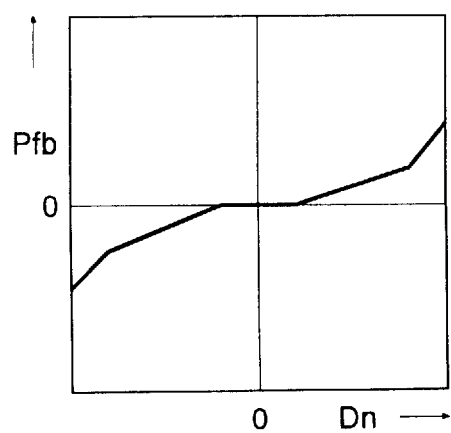
FIG. 19 is a map of feedback hydraulic pressure used in the feedback hydraulic pressure calculation.

The flowchart logic commences and control passes directly to a function block T401 where a determination is made as to the state of a feedback control flag Ff which indicates whether or not a specified feedback control commencement condition described in paragraph (A-1)-V below has been satisfied. The feedback hydraulic pressure Pfb is maintained at a level of 0 at step T402 until the feedback control commencement condition has been established, that is, the feedback control flag Ff has been set to the state of "1". When the feedback control flag Ff is set to the state of "1" as a result of attainment of the feedback control commencement condition, a calculation is made based on the basis of the difference between turbine speeds before and after the gear shift and an optimum shift time specified beforehand to find a current target turbine speed $Nti_0$ in each control cycle at step T403. Subsequently to a calculation of a deviation Dn (i.e. $Nt-Nti_0$) of an actual turbine speed Nt from the target turbine speed $Nti_0$ at step T404, the feedback hydraulic pressure Pfb for the speed deviation Dn is derived from a hydraulic pressure map such as shown in FIG. 19 at step T405. In this hydraulic pressure map, the feedback hydraulic pressure Pfb is set as a positive hydraulic pressure for a positive speed deviation Dn and as a negative hydraulic pressure for a negative deviation Dn. The level of the feedback hydraulic pressure is set to become higher as the absolute value of the deviation Dn become greater.

Figure 14:
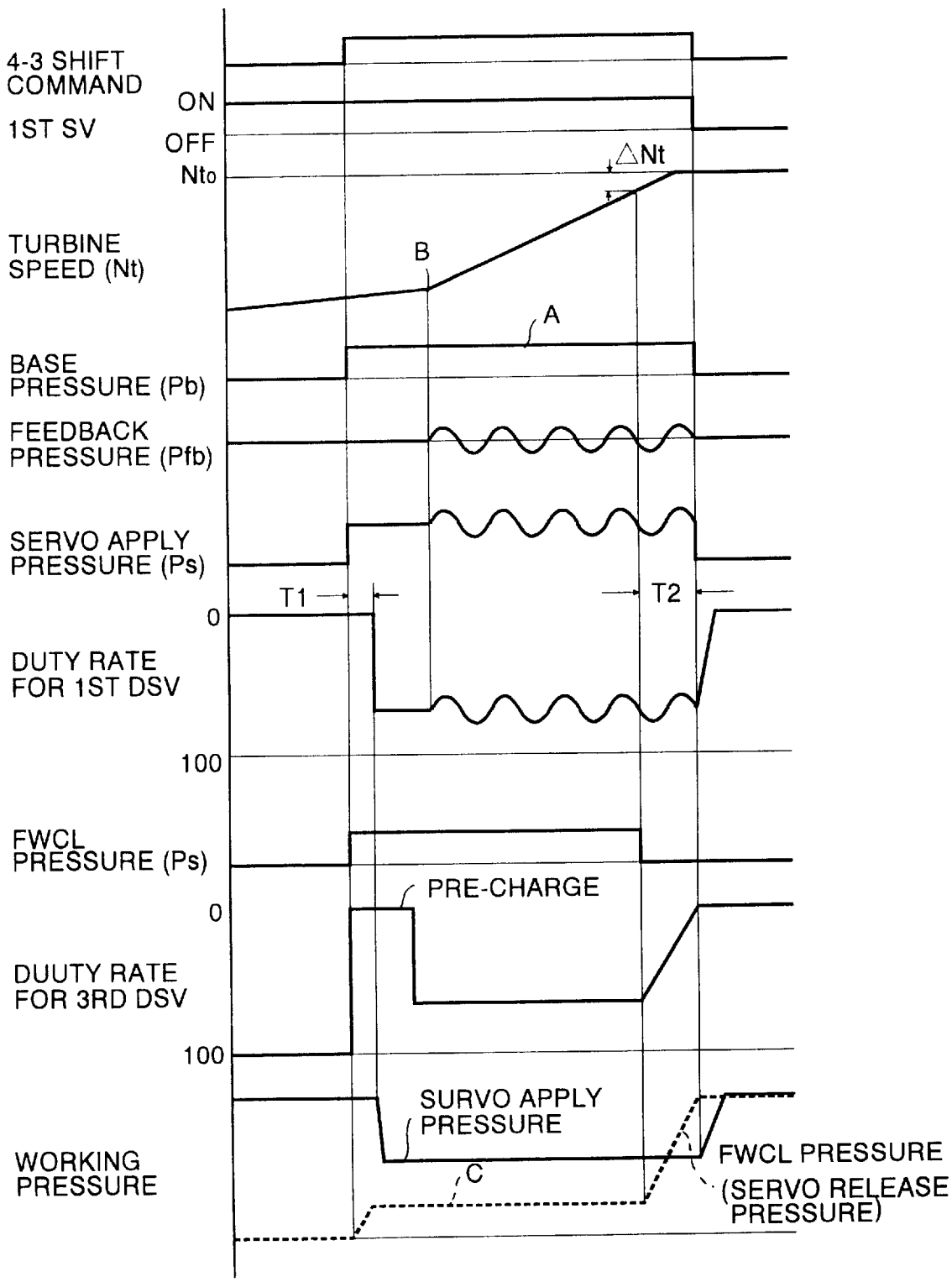
FIG. 14 is a time chart illustrating behaviors of controlling and controlled elements caused during the 4-3 torque demand down shift.

Based on the result of calculations of the base hydraulic pressure Pb and the feedback hydraulic pressure Pfb, the first duty solenoid valve (DSV) 121 switches to operation at a fixed duty rate responsive to the base hydraulic pressure Pb from operation at a duty ratio of 0% at the moment that the specified time T1 passes after the appearance of the gear shift command as shown in FIG. 14. This cause a drop in the servo apply hydraulic pressure for the 2–4 brake (2–4BR) 54 with the effect of allowing the 2–4 brake (2–4BR) 54 to slip. As a result, as indicated by a symbol "B" in FIG. 14, the hydraulic pressure control shifts to the feedback control from the point of time at which the turbine speed Nt starts to rise. At the point of time at which the specified time T2 has passed after the turbine speed Nt has risen to the before shift-end speed ($Nti_0-\Delta Nt$), the first duty solenoid valve (DSV) 121 switches to operate at a duty rate of 0% again, causing the servo apply hydraulic pressure to rise to the specified level.

(A-1)-IV Control of the Third Duty Solenoid Valve

Figure 20:
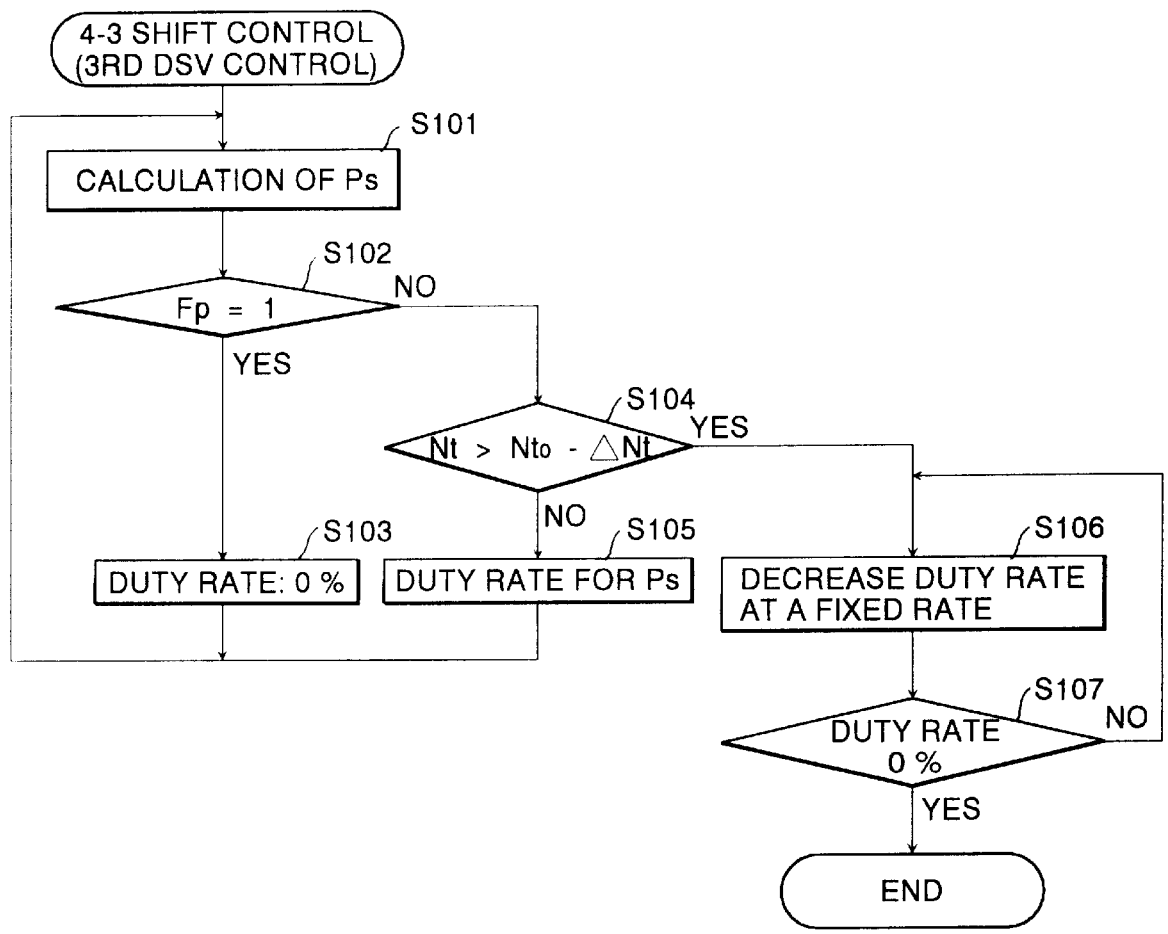
FIG. 20 is a flowchart illustrating the sequence routine of third duty solenoid control during the 4-3 torque demand down shift.

Control of the working hydraulic pressure, i.e. the forward clutch hydraulic pressure, and hence the servo release hydraulic pressure, by the third duty solenoid valve (DSV) 123 is accomplished following the flowchart illustrating the third duty solenoid valve control sequence routine shown in FIG. 20. The flowchart logic commences and control passes directly to a function block S101 where a computed hydraulic pressure Ps is obtained at the appearance of the gear shift command at step S101. This clearly means that substantial control of the third duty solenoid valve (DSV) 123 is always accomplished immediately after the appearance of the gear shift command without making a determination of the fluid temperature unlike the control of the first duty solenoid valve (DSV) 121. The significance of this control routine will be explained along with paragraph (A-1)-VII below.

An step S102, a determination is made as to whether or not a precharge flag Fp has been up or set to a state of "1." When the precharge flag Fp is up, that is to say when it is still in a precharge interval, the third duty solenoid valve (DSV) 123 is operated at a duty rate of 0% to rapidly fill the fluid paths leading to the pressure chamber of the forward clutch (FWCL) 51 and the servo release pressure chamber 54b of the 2–4 brake (2–4BR) 54 with the working fluid at step S103. On the other hand, when the precharge flag Fp has been down or reset to a state of "0," that is to say when it is out of the precharge interval, another determination is made at step S104 as to whether or not the turbine speed Nt has risen as far as the before shift-end speed ($Nti_0-\Delta Nt$). During an interval until the before shift-end speed ($Nti_0-\Delta Nt$) is attained, the third duty solenoid valve (DSV) 123 is operated at a duty rate corresponding to the calculated hydraulic pressure Ps at step S105. In this instance, when the calculated hydraulic pressure Ps, which is equivalent to the spring force of the forward clutch (FWCL) 51, is supplied to the hydraulic pressure chamber of the forward clutch (FWCL) 51, while the piston of the forward clutch (FWCL) 51 is maintained in a condition of immediately before locking, the 2–4 brake (2–4BR) 54 is kept ready for an imitate rise in the hydraulic pressure in the servo release pressure chamber 54b.

When the turbine speed Nt has risen as far as the before shift-end speed ($Nti_0-\Delta Nt$), the duty rate is reduced at a fixed rate through steps S106 and S107 until returning to 0% once again. Through this reduction in duty rate, the working hydraulic pressure, i.e. the forward clutch hydraulic pressure, and hence the servo release hydraulic pressure, is held at an even level to put, on one hand, the forward clutch (FWCL) 51 in a condition of immediately before locking and, on the other hand, the 2–4 brake in a condition of immediately before unlocking, as indicated by a symbol "C" in FIG. 14. Further, the working hydraulic pressure is raised to a specified level at the point of time at which the turbine speed Nt has risen closely to the after shift-end speed $Nt_0$ through slippage of the 2–4 brake (2–4BR) 54 caused by the servo apply hydraulic pressure control to lock the forward clutch (FWCL) 51 and completely unlock the 2–4 brake 54. In this instance, because the working hydraulic pressure has risen in advance nearly to a level necessary for the forward clutch (FWCL) 51 to be locked or for the 2–4 brake (2–4BR) 54 to be unlocked, these forward clutch (FWCL) 51 and 2–4 brake (2–4BR) 54 are locked and unlocked swiftly without accompanied by a delay of time in response to accomplish the replacement of locked and unlocked friction coupling elements.

(A-1)-V Determination of Commencement of the Turbine Speed Feedback Control

As was previously described, the feedback control of turbine speed Nt is performed starting at the point of time at which the 2–4 brake (2–4BR) 54 begins to slip due to a drop in the servo apply hydraulic pressure thereto, and as a result, an increase in the turbine speed Nt starts. The determination in order to begin the turbine speed feedback control is generally accomplished by detecting the point of time at which a specified change rate in the turbine speed dNt detected by the turbine speed sensor 305 has attained as far as a specified rate. It is, however, concerned that, with only this type of determination, it is impossible to determine whether or not the turbine speed Nt has actually started to rise owing to slippage of the 2–4 brake (2–4BR) 54 and consequently to commence the turbine speed feedback control at a correct time, which will always throw the gear shift control into confusion.

Figure 21:
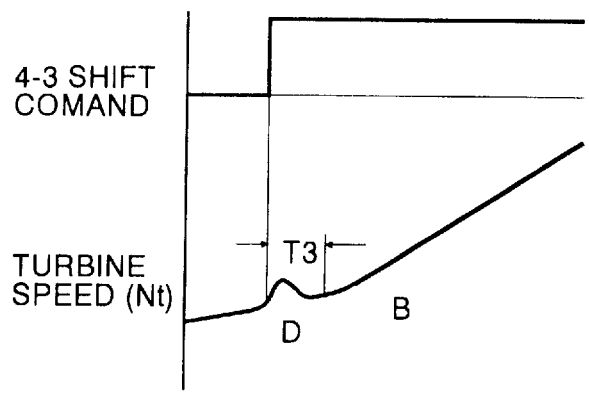
FIG. 21 is an explanatory diagram relating to the problem encountered in the determination of commencement of turbine speed feedback control during the 4-3 torque demand down shift.

Specifically saying, because the turbine speed sensor 305 is attached to the transmission housing 11 as shown in FIG. 2, in cases where the engine throttle experiences a sharp increase in its opening and, as a result, the engine and the automatic transmission cause rolling, the turbine speed sensor 305 undergoes relative rotations in a direction opposite to the rotational direction of the turbine shaft 27. Accordingly, the turbine speed Nt that the speed sensor 305 detects is shown as the sum of the relative rotational speed and the actual turbine speed of the turbine shaft 27. As a result, the turbine speed Nt shows an apparent increase accompanied by a momentary increase in turbine speed change rate dNt, as indicated by a symbol "D" in FIG. 21. Because this irregular change in turbine speed occurs immediately after the appearance of a gear shift command, detection of the commencement of an increase in the turbine speed Nt is erroneously made earlier than an occurrence of an actual increase in the turbine speed following slippage of the 2–4 brake (2–4BR) 54. For this reason, in this embodiment, the control routine is programmed to accurately determine the commencement of the turbine speed feedback control by avoiding the problem in particular.

Figure 22:
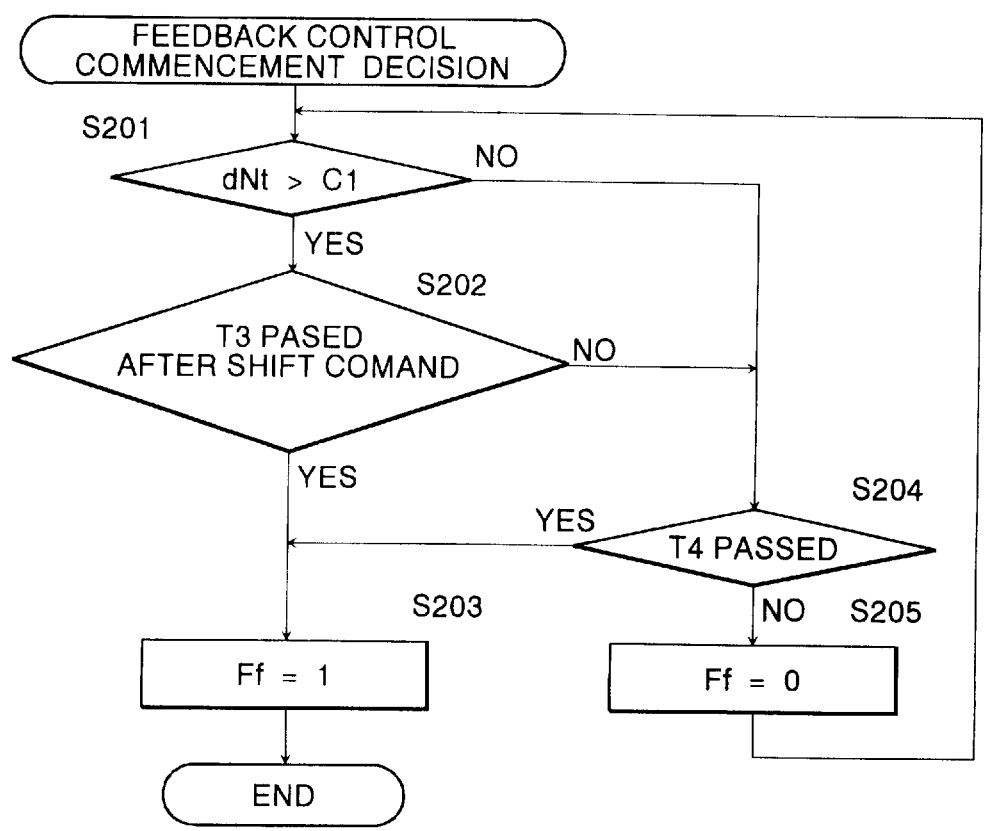
FIG. 22 is a flowchart illustrating the sequence routine of the determination of commencement of turbine speed feedback control during the 4-3 torque demand down shift.

The determination of commencement of the turbine speed feedback control is accomplished following the flowchart illustrating the feedback control commencement determination sequence routine shown in FIG. 22. The flowchart logic commences and control passes directly to a function block S201 where a determination is made as to whether or not the turbine speed change rate dNt has exceeded a specified rate C1. This determination is used to find the point of time indicated by a symbol "B" in FIG. 21 at which the turbine speed Nt commences to increase. Because there is, however, the fear that, with only this type of determination, an the apparent increase in the turbine speed Nt indicated by the symbol "D" will be erroneously detected as the start time of the turbine speed increase caused following slippage of the 2–4 brake. For correct detection, when the turbine speed change rate dNt is determined to have exceeded the specified rate C1, then, another determination is made at step S202 as to whether or not a specified time T3 has passed after the appearance of the gear shift command.

It is regarded as an increase in the turbine speed Nt caused following slippage of the 2–4 brake (2–4BR) 54 only when that increase in the turbine speed Nt is detected after the specified time T3 has passed from the appearance of the gear shift command. Then, at step S203, a feedback flag Ff is set to a state of "1", this indicates the satisfaction of conditions for commencing the feedback control. The feedback flag Ff set to the state of "1" permits the calculation of the feedback hydraulic pressure Pfb for a deviation Dn of an actual turbine speed Nt from a target turbine speed $Nti_0$ at S205 of the sequential subroutine shown in FIG. 18, commencing the feedback control in which the increasing turbine speed Nt is adapted to agree with a target turbine speed $Nti_0$. In this instance, the specified time T3 is set to a longer time than the specified time T1 after which the servo apply hydraulic pressure control begins as shown in FIG. 14. Having provided these conditions avoids an erroneous determination in which an apparent increase in the turbine speed Nt accompanying rolling of the transmission and the engine generated immediately after an appearance of a gear shift command is regarded as an indication that the condition for the commencement of the turbine speed feedback control has been satisfied is avoided, so that the turbine speed feedback control commences at a correct time.

When either one or both of the conditions relating to the turbine speed change rate dNt and the specified time T3 examined at steps S201 and S202, respectively, have not been satisfied, another determination is made at step S204 as to whether or not a specified time T4 set forth for a backup timer at the appearance of the gear shift command has passed. When the backup time T4 has passed, the feedback flag Ff is set to the state of "1" at step S203. In other words, in events during the 4-3 gear shift, for example, where, because of a high base hydraulic pressure Pb for the servo apply hydraulic pressure which is supplied at the moment of a lapse of the specified time T1 after the appearance of the gear shift command, the 2–4 brake (2–4BR) 54 is unlocked too gradually, it may be possibly caused that the turbine speed change rate dNt does not exceed the specified rate C1. Consequently, in this kind of case, the turbine speed feedback control is activated immediately after the lapse of the backup time T4.

On the other hand, when at least one out of the conditions of step S201 and step S202 and the condition of step S204 are not satisfied, the feedback flag Ff is reset to the state of "0" at step S205. Resetting the feedback flag Ff to the state of "0" permits the feedback hydraulic pressure Pfb to be kept at a level of 0 at step T402 in the sequential routine shown in FIG. 18.

(A-1)-VI Setting of Precharge Control Interval

Setting the precharge flag Fp whose state is determined at step S2 of the main routine shown in FIG. 13 and step S102 of the sequential routine shown in FIG. 20 will be described below.

In this type of automatic transmission, in the event where the friction coupling elements are selectively locked and unlocked by supplying the working hydraulic pressure generated in the hydraulic pressure control circuit during a gear shift to their pressure chamber and servo apply pressure chamber and/or servo release pressure chamber, even if the working hydraulic pressure is generated and supplied to the pressure chamber of the friction coupling element immediately after an appearance of a gear shift command, because no working fluid initially exists in the fluid path to the pressure chamber of the friction coupling element from the hydraulic hydraulic pressure control circuit, the working hydraulic pressure does not rise promptly in the pressure chamber of the friction coupling element, creating the problem that locking or unlocking the friction coupling element is delayed.

For that reason, upon an appearance of a gear shift command, there is an operation of performing control to swiftly fill the fluid path leading to the pressure chamber of the friction coupling element with working fluid by maintaining a fluid hydraulic pressure control valve, such as a duty solenoid valve and the like, completely opened for a specified time interval. This control is called precharge interval control. By performing this kind of precharge interval control, the response delay in gear shift action is eliminated.

Figure 23:
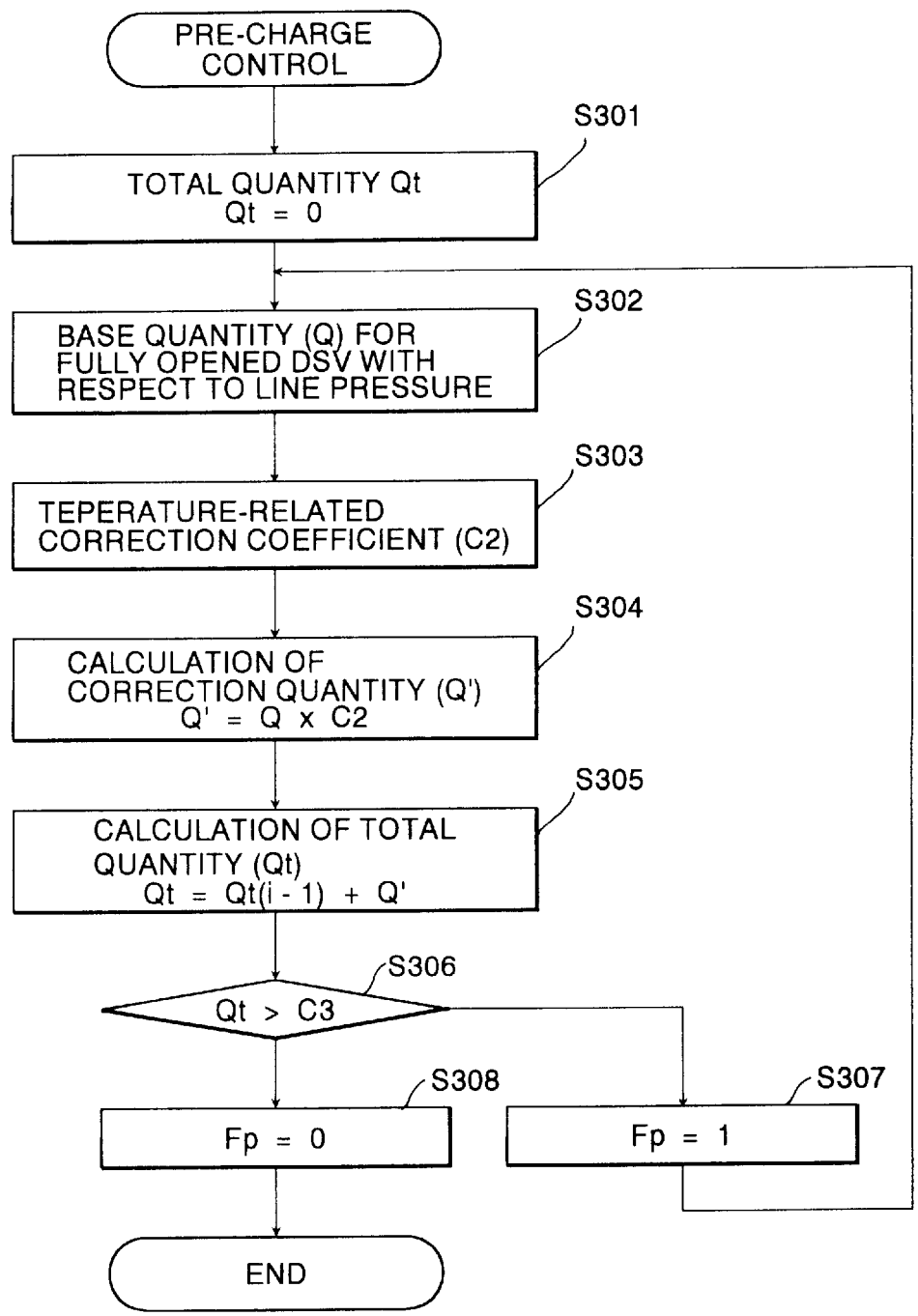
FIG. 23 is a flowchart illustrating the sequence routine of precharge interval control during the 4-3 torque demand down shift.
Figure 24:
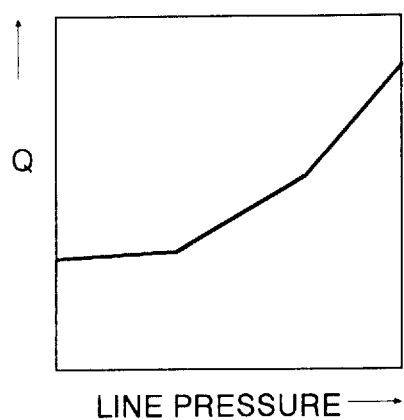
FIG. 24 is a map of total flowing quantity with respective to line hydraulic pressure used in the precharge interval control.

In the hydraulic pressure control circuit 100, setting of the precharge interval is performed by the control unit 300 following the flowchart illustrating precharge interval setting sequence routine shown in FIG. 23. This flowchart logic is executed in parallel with the control of the third duty solenoid valve (DSV) 123 shown in FIG. 20 and so forth when a gear shift command is given. After resetting the total flowing quantity Qt of a working fluid to 0 (zero) at step S301, a base flowing quantity Q at which the working fluid flows through the third duty solenoid valve (DSV) 123 operating at a duty rate of 0% (i.e. operating with a full opening) is found for a current level of line hydraulic pressure from a flowing quantity map established as shown in FIG. 24 at step S302. In this instance, the flowing quantity map defines the base flowing quantity Q to become higher with an increase in the line hydraulic pressure. This is because even if the third duty solenoid valve (DSV) 123 is completely open, the flowing quantity Q of the working fluid which passes through the third duty solenoid valve (DSV) 123 varies depending upon the line hydraulic pressure at that time, and the higher the flowing quantity Q is, the higher the line hydraulic pressure is.

Figure 25:
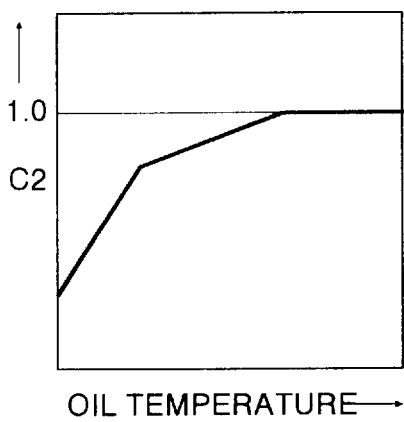
FIG. 25 is a map of flowing quantity correction coefficient C2 with respect to fluid temperature used in the precharge interval control.

At step S303, a flowing quantity correction coefficient C2 on the temperature of working fluid is read from a fluid quantity correction coefficient map such as shown in FIG. 25. This fluid quantity correction coefficient map defines the correction coefficient C2 to become smaller than 1 (one) as the fluid temperature lowers. Subsequently, at step S304, a corrected flowing quantity Q' is calculated by multiplying the base flowing quantity Q by the flowing quantity correction coefficient C2. By means of the flowing quantity correction, in the event where the flowing quantity at which the working fluid passes through the valve decreases from that under standard environmental conditions even for the same level of line hydraulic pressure due to low fluid temperatures, and hence low fluid viscosity, the flowing quantity calculated suitably to actual circumstances conditions also decreases, so that the base flowing quantity Q (the corrected flowing quantity Q') is always calculated suitably to the actual flowing quantity.

Thereafter, at step S305, the corrected flowing quantity Q' is added in accordance with the following equation (1) to calculate the total flowing quantity Qt from the start of control to the present time.

$$Qt = Qt(i-1) + Q' \quad \ldots (1)$$

At step S306, a determination is made as to whether or not the total flowing quantity Qt exceeds a specified quantity C3. Until the specified quantity C3 is exceeded, the precharge flag Fp is set to the state of "1" at step S307. On the other hand, when the specified quantity C3 is exceeded, the precharge flag Fp is reset to the state of "0" at step S308. In this instance, the specified quantity C3 is adapted to be equivalent or correspond to the volume of the fluid path from the specific valve to the pressure chamber of the specific friction coupling element (for example, for the 4-3 gear shift, the fluid path is defined by the hydraulic pressure line 228 from the third duty solenoid valve 123 to the pressure chamber of the forward clutch 51 via the lockup control valve 106 and the hydraulic pressure lines 220 and 221 to the servo release hydraulic pressure chamber 54b of the 2–4 brake 54 via the 3–4 shift valve 105) in the hydraulic hydraulic pressure control circuit 100. Accordingly, the fluid path is filled with the working fluid at the moment that the base flowing quantity Q exceeds the specified quantity C3, and at this time, the precharge flag Fp is reset to the state of "0" in order to conclude the precharge control.

While the precharge flag Fp remains up, that is, during the precharge interval, the control is performed to alter the duty rate for the third duty solenoid valve (DSV) 123 to 0% at step S103 in the sequential routine shown in FIG. 20, so as to rapidly fill the fluid path to the pressure chamber of the above-described forward clutch (FWCL) 51 and the fluid path to the servo release pressure chamber 54b of the 2–4 brake (2–4BR) 54 with the working fluid. Here, because the base flowing quantity Q which is the foundation of the computation of the precharge interval is set on the basis of the current line hydraulic pressure as was previously described, in any event where, for example, a fixed volume of working fluid is supplied in a relatively short time because the line hydraulic pressure is high or where, to the contrary, the time needed for a fixed volume of working fluid to be supplied is longer because the line hydraulic pressure is low, the precharge interval is always terminated at the moment that the fluid path is actually filled with the working fluid. Further, even in the event, because the fluid temperature is low, a long time is spent in filling the working fluid in comparison to when the working fluid is at room temperature, the precharge interval is corrected to fluid temperatures and consequently, the precharge control terminates precisely corresponding to the moment at which the fluid path is actually filled with the working fluid.

(A-1)-VII Delay of Commencement of Control of First Duty Solenoid Valve at Low Fluid Temperature As was described above, in the control of the precharge interval shown in FIG. 23, the correction coefficient C2 (read at step S303) takes a value which becomes smaller than 1 (one) as the fluid temperature becomes lower, and the total flowing quantity Qt is calculated each control cycle by adding the corrected flowing quantity Q' (step S305) which is given by multiplying the base flowing quantity Q by the correction coefficient C2 (step S304). Consequently, because, even if the same time has passed from an appearance of a gear shift command, the total flowing quantity Qt is computed to be less during the fluid temperature remains low, the interval until the precharge flag Fp is set to the state of "1" (step S307), that is to say the precharge interval, becomes longer. Because of this, even in cases where the time expended in supplying the working fluid is longer due to a low fluidity of the working fluid caused when the working fluid is at a low temperature, and hence has a high viscosity in comparison to when it is at a room temperature, the result is obtained that the working fluid fills with certainty the fluid path between the third duty solenoid valve 123 and the pressure chamber of the forward clutch 51 and the fluid path between the servo release pressure chamber 54b of the 2–4 brake 54.

On the other hand, in the control of the third duty solenoid valve 123 shown in FIG. 20, the forward clutch hydraulic pressure and the servo apply hydraulic pressure are maintained at a hydraulic pressure level equivalent to a spring force of the forward clutch 51 once after the termination of the precharge interval to hold the forward clutch 51 in a state immediately prior to locking and the 2–4 brake 54 in a state immediately prior to unlocking. Thereafter, the hydraulic pressures rise to a specified level by the point of time at which the turbine speed Nt rises as far as the immediate shift-end speed to completely lock and unlock the forward clutch 51 and the 2–4 brake 54, respectively. Accordingly, in cases, for example, where, because the temperature of the working fluid is extremely low and, as a result, the precharge interval is too long, the precharge interval still continues even at the end of the specified time T2 after the turbine speed Nt has risen as far as the immediate shift-end speed as shown in FIG. 14, the duty ratio of the first duty solenoid valve (DSV) 121 is first returned to 0% to restore the 2–4 brake (2–4BR) 54 to the locked state again, producing a shift shock.

In order to cope with these problems, the control unit 300 performs the control of the first duty solenoid valve (DSV) 121 shown in FIG. 13 in which, the control of servo apply hydraulic pressure is performed (steps S3 through S11) directly following the detection of a standard room temperature (step S1) after an appearance of a 4-3 gear shift command, because the precharge interval is not so long, and, however, commenced after the termination of the precharge interval (step S2) when the fluid temperature is extremely low. In contrast to the control of the first duty solenoid valve (DSV) 121, in the third duty solenoid valve control shown in FIG. 20, the precharge control is always commenced immediately after an appearance of a 4-3 gear shift command regardless of fluid temperature.

Figure 26:
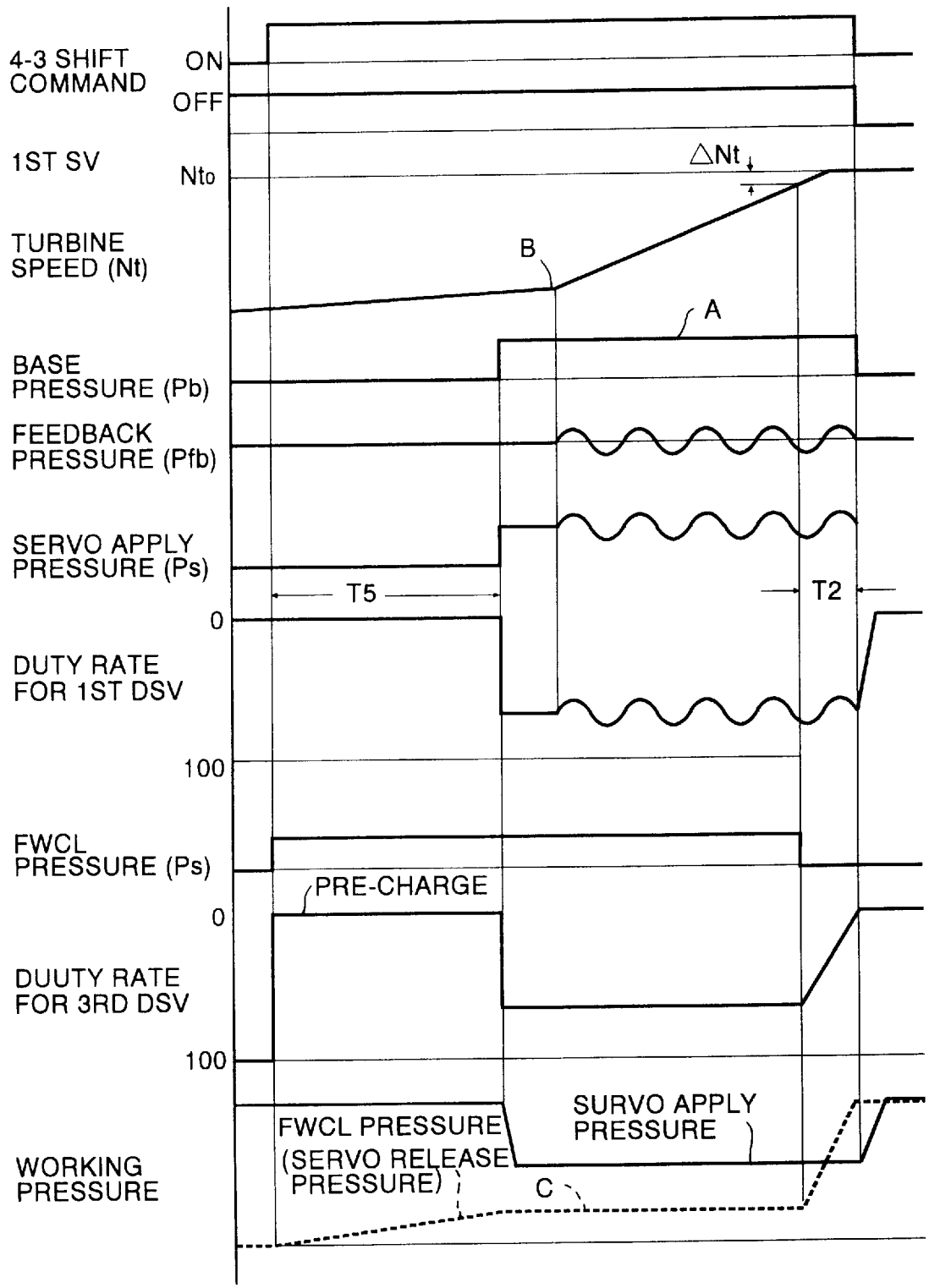
FIG. 26 is a time chart illustrating behaviors of controlling and controlled elements caused during the 4-3 torque demand down shift.

Consequently, as shown in FIG. 26, in cases where the precharge interval is remarkably long due to slow rising of the forward clutch locking hydraulic pressure or the servo releasing hydraulic pressure which is caused by low fluid temperatures, the control of the first duty solenoid valve (DSV) 121 is delayed during the precharge interval by a specified time T5, and is commenced at the end of the precharge interval. That is, the control of the first duty solenoid valve (DSV) 121 is commenced when the path between the pressure chamber of the forward clutch (FWCL) 51 and the fluid path between the servo release pressure chamber 54b of the 2–4 brake (2–4BR) 54 are actually filled with the working fluid with the result of putting the forward clutch (FWCL) 51 in a state immediately before locking and the 2–4 brake (2–4BR) 54 in a state immediately before unlocking, so that, when the turbine speed Nt has increased as far as the immediate shift-end speed through the control of the first duty solenoid valve (DSV) 121, the forward clutch (FWCL) 51 is always put in the state immediately before locking while the 2–4 brake (2–4BR) 54 is always put in the state immediately before unlocking. Consequently, the forward clutch (FWCL) 51 and the 2–4 brake (2–4BR) 54 are locked and unlocked, respectively, in advance of the rising of the servo apply hydraulic pressure to the servo apply pressure chamber a of the 2–4 brake (2–4BR) 54, so the shift to the third (3RD) gear is accomplished smoothly. In this instance, as was described above, in consideration of operation during a 3-2 gear shift or operation during a 3–4 gear shift which has a high possibility of occurrence in succession with the 4-3 gear shift, the duty rate of the first duty solenoid valve (DSV) 121 is ultimately returned to 0% to leave the servo apply hydraulic pressure supplied into the servo release pressure chamber 54b of the 2–4 brake (2–4BR) 54. Consequently, the 2–4 brake (2–4BR) 54 is unlocked first and, as a result, causes a shift shock when the precharge interval is so long due to low fluid temperatures. However, for the purpose of simply achieving the 4-3 gear shift, the first duty solenoid valve (DSV) 121 may be ultimately operated at a duty rate of 100% to drain the servo apply hydraulic pressure. In this case, when the precharge interval becomes so long at low fluid temperatures, unlocking the 2–4 brake (2–4BR) 54 takes place in advance of locking the forward clutch (FWCL) 51, causing a sudden boost in engine speed. The control of first duty solenoid valve (DSV) 121 is delayed to commence with an effect of avoiding a sudden boost in engine speed.

Furthermore, in this embodiment, although the whole control of the first duty solenoid valve (DSV) 121 is made to be delayed time-wise when the fluid temperature is low, while commencing control of the first duty solenoid valve (DSV) 121 promptly after an appearance of a gear shift command regardless of fluid temperatures as well as the third duty solenoid valve (DSV) 123, the control gain of the first duty solenoid valve (DSV) 121 may be altered in accordance with fluid temperatures to cause a gradual increase in the turbine speed Nt when the fluid temperature is low. Similarly, while the control of the first duty solenoid valve (DSV) 121 is commenced promptly after an appearance of a gear shift command regardless of fluid temperatures, the precharge flag Fp may be examined when the turbine speed Nt has risen as far as the after shift-end speed $Nt_0$ or the before shift-end speed. In such a case, when the precharge flag Fp has been up, the turbine speed Nt is kept either at the after shift-end speed $Nt_0$ or at the before shift-end speed until the precharge flag is reset to the state of "0" and, either after the precharge flag Fp has been reset to 0, or after the specified time T2 has passed, the servo apply hydraulic pressure is supplied or drained.

(A-1)-VIII Correction of Base Hydraulic pressure Pb at Feedback Control Commencement For the 4-3 gear shift, the servo apply hydraulic pressure is controlled through the first duty solenoid valve (DSV) 121 during the gear shift to perform the feedback control so as to make the turbine speed Nt attain and match the specified target turbine speed $Nti_0$. However, if an initial value as a target for the calculated hydraulic pressure Ps is not set appropriately at the commencement of the feedback control, the feedback control is possibly not accomplished appropriately. That is to say, as described above, the first duty solenoid valve (DSV) 121 is operated at a duty rate controlled to realize the calculated hydraulic pressure Ps which is given as the sum of the base hydraulic pressure Pb and the feedback hydraulic pressure Pfb. In this case, because the feedback hydraulic pressure Pfb is kept at a level of 0 until the commencement of feedback control, the calculated hydraulic pressure Ps is at a fixed level and equal to the base hydraulic pressure Pb and, as a result, the 2–4 brake (2–4BR) 54 is commenced to unlock. Because turbine torque taken into consideration in the calculation of the base hydraulic pressure Pb is accompanied by sharp fluctuations, the base hydraulic pressure Pb is apt to include setting errors which is usually canceled during the feedback control of turbine speed Nt and can, however, possibly be too significant to be ignored.

As a result, as verified paragraph (A-1)-V, in the event of the 4-3 gear shift, if the feedback control is started when, for example, the base hydraulic pressure Pb, which is equivalent to the hydraulic pressure Ps calculated at the end of the specified time T1 after an appearance of a gear shift command, is too high, unlocking the 2–4 brake (2–4BR) 54 takes place gradually due to a delay in the operation of the first duty solenoid valve 121 in order to lower the calculated hydraulic pressure Ps at the beginning of the feedback control, making the interval of inertia phase longer, so as to produce aggravation of a gear shift feeling.

In view of the above drawbacks, in this embodiment, it is detected as early as possible and, in particular, at the point of time at which the turbine speed has started to rise through the feedback control whether or not the current actual hydraulic pressure agrees with the specified target hydraulic pressure, i.e. the base hydraulic pressure Pb in this event. If these do not agree with each other, the base hydraulic pressure Pb is corrected once at the initial stage depending on the difference between the hydraulic pressures, and thus the feedback control after that is satisfactorily accomplished.

Figure 27:
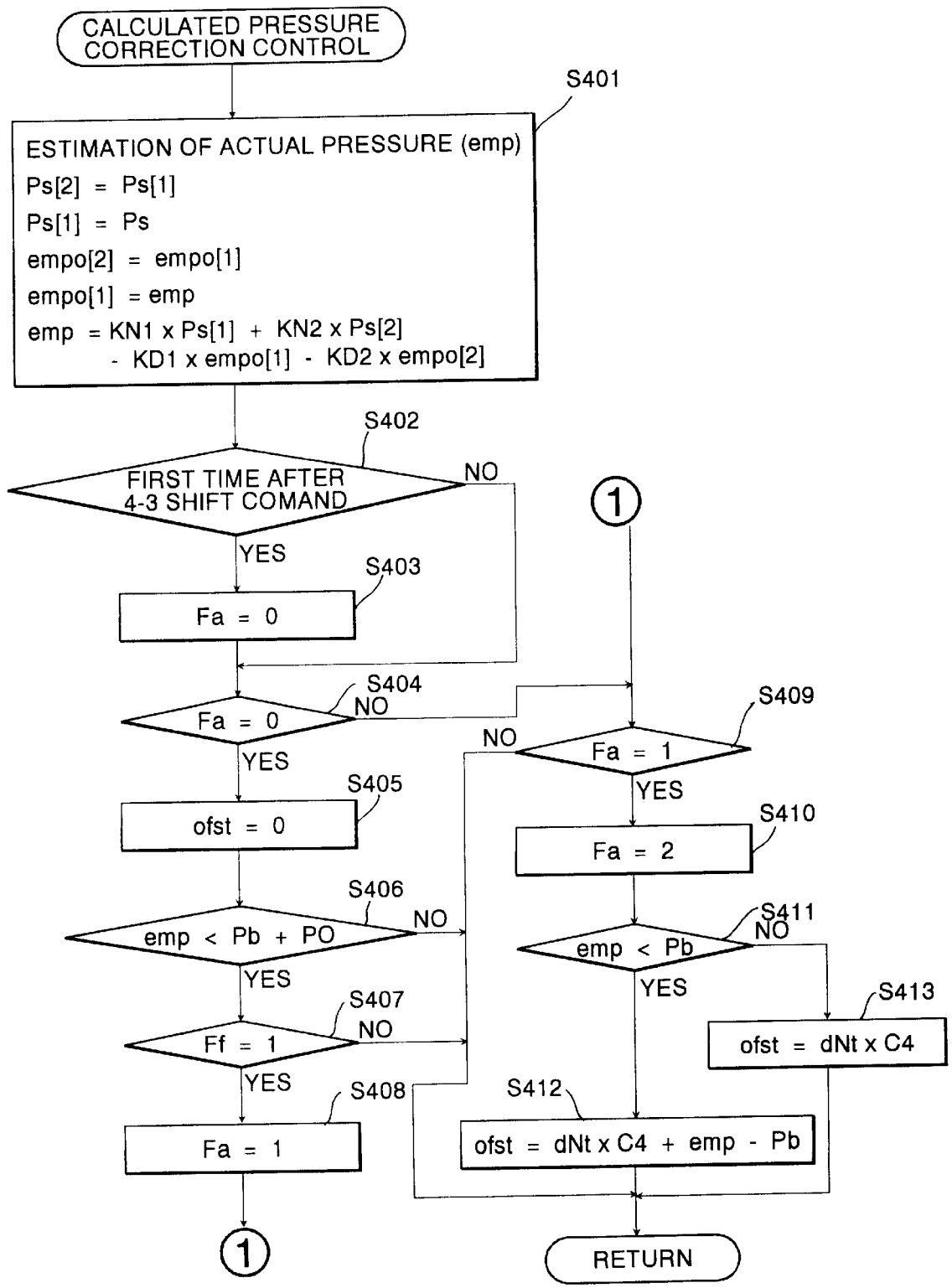
FIG. 27 is a flowchart illustrating the sequence routine of calculated hydraulic pressure correction control during the 4-3 torque demand down shift.

The correction of the calculated hydraulic pressure Ps at the beginning of the feedback control is accomplished following the flowchart illustrating the calculated hydraulic pressure correction sequence routine shown in FIG. 27. The flowchart logic is executed in parallel with the substantial control of the first duty solenoid valve control routine (DSV) 121 shown in FIG. 13 which is commenced in response to an appearance of a 4-3 gear shift command, and properly performs correction of the base hydraulic pressure Pb calculated at step S3 of the first duty solenoid valve control shown in FIG. 3 by addition of an offset hydraulic pressure Pofst. Through this correction, the calculated hydraulic pressure Ps, which is obtained by adding the feedback hydraulic pressure Pfb to the base hydraulic pressure Pb, is corrected to an appropriate hydraulic pressure.

Specifically, the sequence logic commences and control passes directly to a function block at step S401 where estimation is made to find the servo apply hydraulic pressure Pemp actually acting on the 2–4 brake (2–4BR) 54 without detecting directly the hydraulic pressure, for example, by use of a hydraulic pressure sensor. Practically, the actual servo apply hydraulic pressure Pemp which is actually supplied at the present time is estimated with high accuracy from the calculated hydraulic pressures Ps[2] and Ps[1] having been found in the second and first previous cycles of the control routine shown in FIG. 13 and the estimated servo apply hydraulic pressures Pempo[2] and Pempo[1] found in the second and first previous cycles in the correction routine shown in FIG. 27.

The estimation of the actual servo apply hydraulic pressure updates each of the last two calculated hydraulic pressures Ps[2] and Ps[1] and the last two estimated servo apply hydraulic pressures Pempo[1] and Pempo[2] by use of the following equations (2) through (5) in sequence, and finds the present servo apply hydraulic pressure Pemp from these updated hydraulic pressure values by use of the following equation (4).

$$Ps[2]=Ps[1] \quad \ldots (2)$$

$$Ps[1]=Ps \quad \ldots (3)$$

$$Pempo[2]=Pempo[1] \quad \ldots (4)$$

$$Pempo[1]=Pempo \quad \ldots (5)$$

$$Pemp=KN1 \cdot Ps[1]+KN2 \cdot Ps[2]-KD1 \cdot Pempo[1]-KD2 \cdot Pempo[2] \quad \ldots (6)$$

In this instance, these coefficients KN1, KN2, KD1 and KD2 in equation (6) are determined from the results of model experiments performed by sensing the actual hydraulic pressure so that the estimated hydraulic pressure Pemp precisely agrees with the actual hydraulic pressure.

After the estimation of the actual hydraulic pressure Pemp, a determination is made at step S402 as to whether or not it is the first estimation after an appearance of a 4-3 gear shift command. When it is the first estimation, a correction status flag Fa, which indicates the progress status of correction in the calculated hydraulic pressure correction routine, is set to a state of "0" at step S403. In this connection, if it is indeed the first estimation after the appearance of the 4-3 gear shift command, the estimated hydraulic pressure Pemp having been found at step S71 must be the value of KN1·Ps.

Subsequently, a determination is made at step S404 as to whether or not the correction status flag Fa has been reset to a state of "0." When the correction status flag Fa is in the state of "0," then, after having initialized or reset the offset hydraulic pressure Pofst to a value of 0 (zero) at step S405, the routine proceeds to step S406 where a determination is made as to whether or not the estimated hydraulic pressure Pemp found at step S401 is smaller than the value of the base hydraulic pressure Pb added by a specified dead-band hydraulic pressure PO. In addition, at step S407, a determination is made as to whether or not the feedback flag Ff has been set to the state of "1," in other words whether or not the turbine speed Nt has started to rise. When both answers to these determinations are YES, then, the correction status flag Fa is set to a state of "1" at step S408. On the other hand, when either one of these determinations made at steps S406 and 407 is No, then, the routine returns. That is to say, when the estimated hydraulic pressure Pemp is higher than the base hydraulic pressure Pb by the dead-band hydraulic pressure PO or more, or when the turbine speed Nt has not yet started to rise, the correction status flag Fa remains in the state of "0" to maintain the offset hydraulic pressure Pofst is maintained 0 (zero). After the estimated hydraulic pressure Pemp has dropped and approached closely to the base hydraulic pressure Pb within the range of the dead-band hydraulic pressure PO and after the turbine speed Nt has started to rise, a determination is made at step S409 as to whether or not the correction status flag Fa has been set to the state of "1". When the correction status flag Fa is in the state of "1," then, after setting the correction status flag Fa to a state of "2" at step S410, a determination is made at step S411 as to whether or not the estimated hydraulic pressure Pemp is smaller than the base hydraulic pressure Pb. In accordance with the result of the determination made at step S411, the offset hydraulic pressure Pofst is calculated either at step S412 or at step S413.

Since the offset hydraulic pressure Pofst has been calculated, the correction status flag Fa is not altered but remains set to the state of "2". Consequently, after the correction control enters another cycle of the control routine, the sequence logic skips step S402 and control takes steps S404 through S409. In other words, the offset hydraulic pressure Pofst is provided only once since the turbine speed Nt has started to rise with the actual hydraulic pressure Pemp in the state of having dropped near the base hydraulic pressure Pb, i.e. immediately after the commencement of the feedback control. As a result, the base hydraulic pressure Pb calculated at step S3 of the first duty solenoid valve control routine shown in FIG. 13 is corrected by this offset hydraulic pressure Pofst to properly correct the calculated hydraulic pressure Ps obtained at step S5 of the first duty solenoid valve control routine shown in FIG. 13.

When it is determined at step S411 that the estimated hydraulic pressure Pemp is smaller than the base hydraulic pressure Pb, the control proceeds directly to step S412 to calculate the offset hydraulic pressure Pofst from equation (7) given below.

$$Pofst=dNt \cdot C4+Pemp-Pb \quad \ldots (7)$$

In this event, because the 2–4 brake (2–4BR) 54 has started to slip with the actual servo release hydraulic pressure Pemp lower than the base hydraulic pressure Pb calculated at step S3 of the first duty solenoid valve control routine shown in FIG. 13, or in other words, because the base hydraulic pressure Pb has been set to a high hydraulic pressure level, the offset hydraulic pressure Pofst is lowered by the hydraulic pressure difference (Pemp–Pb).

In addition, what the term dNt·C4 in the above equation (7) implies is as follows. Because the base hydraulic pressure Pb is set as the hydraulic pressure at which the 2–4 brake (2–4BR) 54 is initially allowed to slip, it is reasonable for the examination of whether or not the base hydraulic pressure Pb has been appropriately established to compare the base hydraulic pressure Pb with the actual servo release hydraulic pressure at the point of time at which the 2–4 brake (2–4BR) 54 has started to slip, i.e. at the point of time at which the turbine speed Nt has started to rise. However, a practical problem is that, while the actual hydraulic pressure can be detected only since the turbine speed Nt has risen, it has already dropped before the detection of the rising of the turbine speed Nt. Accordingly, correcting the offset hydraulic pressure Pofst only by the hydraulic pressure difference (Pemp−Pb) leaving the hydraulic pressure drop out of consideration does not reflect the practical circumstances, resulting in an correction of the base hydraulic pressure Pb made excessively low.

For that reason, in this embodiment, a drop in the hydraulic pressure caused until the detection is calculated on the basis of an initial change rate dNt at which the turbine speed Nt starts to rise, and is added to the base hydraulic pressure Pb. Through this correction, the base hydraulic pressure Pb is given more correctly, enabling the feedback control to be accomplished since then. In equation (VII), the coefficient C4 is a conversion coefficient to the conversion of turbine torque corresponding to the turbine speed change rate dNt to an equivalent hydraulic pressure.

On the other hand, when it is determined st step S411 that the estimated hydraulic pressure Pemp is not smaller than the base hydraulic pressure Pb, in other words when these two hydraulic pressure levels are equal or when the estimated hydraulic pressure Pemp is larger than the base hydraulic pressure Pb, then, the sequence logic proceeds to a function block at step S413 where the offset hydraulic pressure Pofst is made to be equal to the hydraulic pressure drop dNt·C4 caused due to the delay in detection. That is to say, because there is a time lag until the detection of a rise in the turbine speed Nt as described above even when the estimated hydraulic pressure Pemp and the base hydraulic pressure Pb are equal, the base hydraulic pressure Pb is corrected by the hydraulic pressure drop dNt·C4.

When the base hydraulic pressure Pb has been set to a low level and consequently the estimated hydraulic pressure Pemp is larger than the base hydraulic pressure Pb, the offset hydraulic pressure Pofst is made simply equal to the hydraulic pressure drop dNt·C4 and the hydraulic pressure difference (Pemp−Pb) is disregarded. This is because, if the hydraulic pressure difference (Pemp−Pb) is further added to the base hydraulic pressure Pb in spite of the unexpectedly high actual hydraulic pressure Pemp, the 2–4 brake (2–4BR) 54 is unlocked too swiftly to avoid a shift shock.

Figure 28:
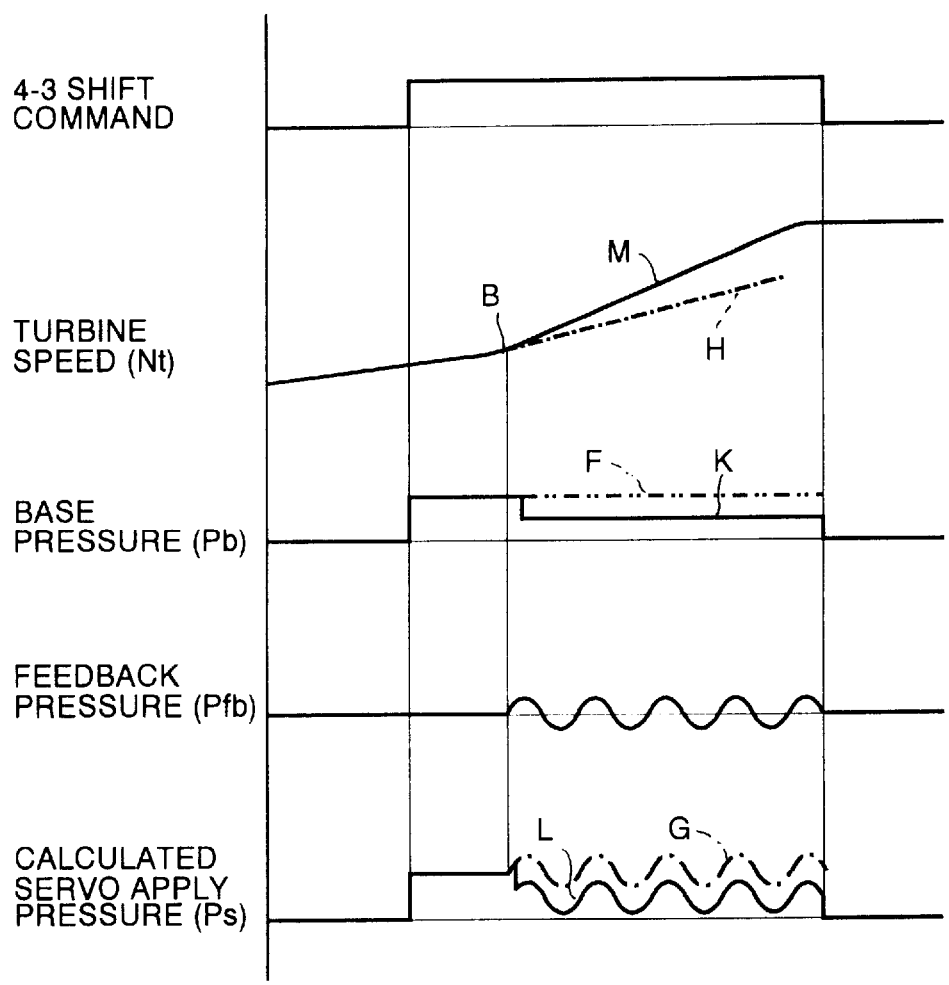
FIG. 28 is a time chart illustrating operation of the calculated hydraulic pressure correction control.

Through this kind of control for correction, as indicated, for example, by a symbol "F" in FIG. 28, if the base hydraulic pressure Pb is initially at a high level and stays at the same level, the calculated servo apply hydraulic pressure Ps is at a high level as indicated by a symbol "G" in FIG. 28. As a result, in events where a satisfactory gear shift feeling is hardly attainable due to a gradual rise in the turbine speed Nt as indicated by a symbol "H," because the base hydraulic pressure Pb is correctly altered to be low as indicated by a symbol "K" immediately after the point of time indicated by a symbol "B" at which the turbine speed Nt has started to rise, the calculated hydraulic pressure Ps is also at a low level as indicated by a symbol "L", so as to cause the rise in the turbine speed Nt earlier as indicated by a symbol "M" with an effect of providing a satisfactory gear shift feeling.

(A-2) Re-Shift Prevention Control

In this type of automatic transmission, it possibly occurs that immediately after an appearance of a gear shift command, another gear shift command is provided resulting from, for instance, a rapid change in engine throttle opening. If, while a gear shift on the first gear shift command is in progress, another gear shift is suddenly brought about due to the appearance of the second gear shift command, a severe shift shock is caused. For this reason, in order to avoid this kind of circumstance, control is accomplished following the flowchart illustrating the sequence routine shown in FIG. 29 for preventing the transmission from causing such a secondary gear shift under certain conditions.

Figure 29:
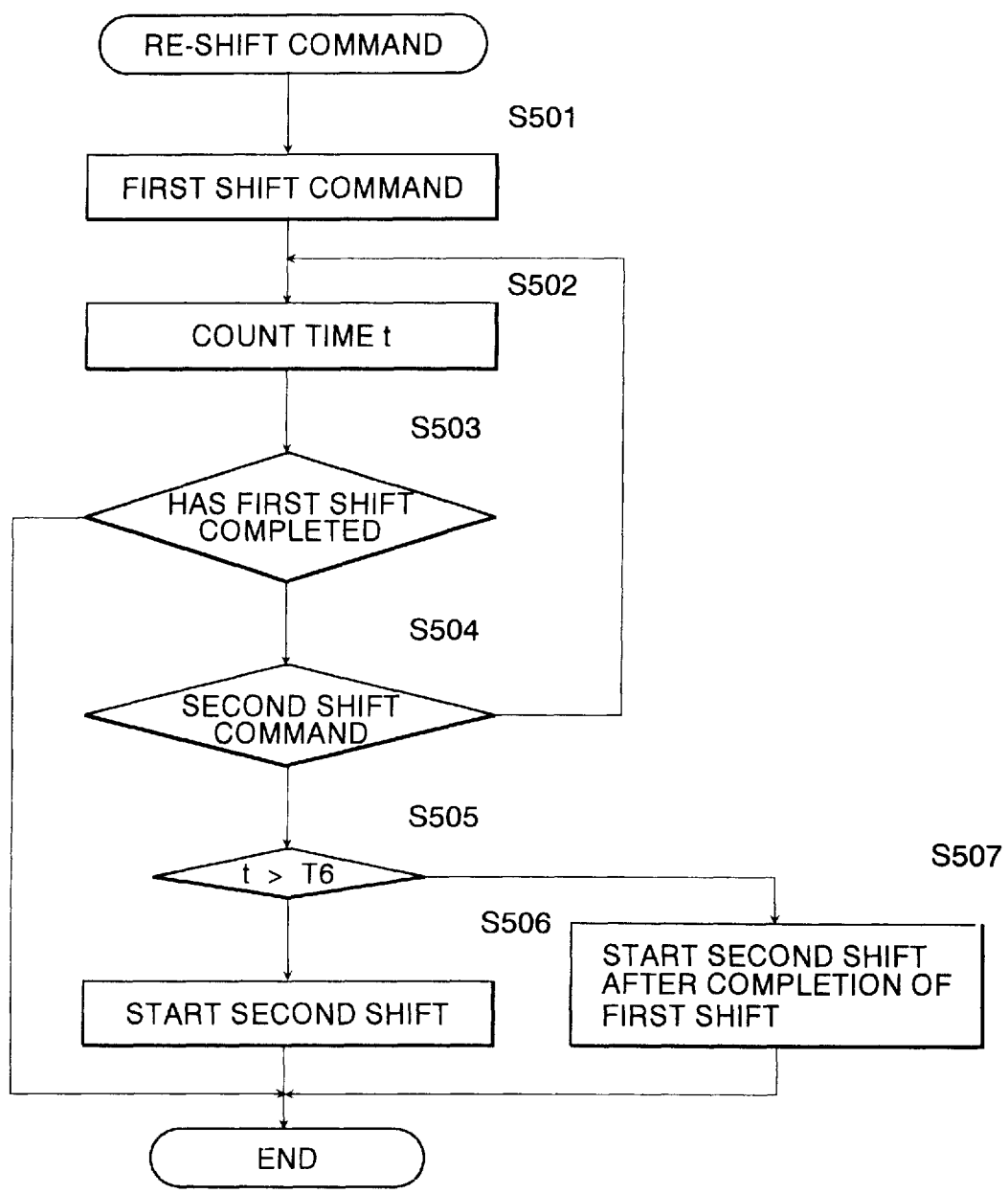
FIG. 29 is a flowchart illustrating the sequence routine of reshift prevention control.

Referring to FIG. 29, the flowchart logic commences and control passes directly to a function block at step S501 where a first gear shift command is detected and subsequently to a function block at step S502 where a duration of time t from the appearance of the first gear shift command is counted. At step S503, a determination is made as to whether or not a gear shift on the first gear shift command (which is hereafter referred to as a first gear shift) has been concluded. When the first gear shift has been concluded, the control is ended. On the other hand, before the first gear shift is concluded, a determination is made at step S504 as to whether or not a second gear shift command has been provided. Until an appearance of the second gear shift command, the sequential routine waits at step S503 for the conclusion of the first gear shift while continuing to count the duration of time t at step S502.

On the other hand, if a second gear shift command is provided before the conclusion of the first gear shift, another determination is made at step S505 as to whether or not the duration of time t has exceeded a specified time T6 before the appearance of the second gear shift command. When the specified time T6 is not exceeded, this is regarded that the first gear shift has not yet started, then, a gear shift on the second gear shift command (which is referred to as a secondary gear shift) is started immediately after an alteration of shift target to the gear designated by the second gear shift command at step S506, as indicated by a symbol "P" in FIG. 30. In this manner, the gear shift is performed in proper response to the gear shift command.

Figure 30:
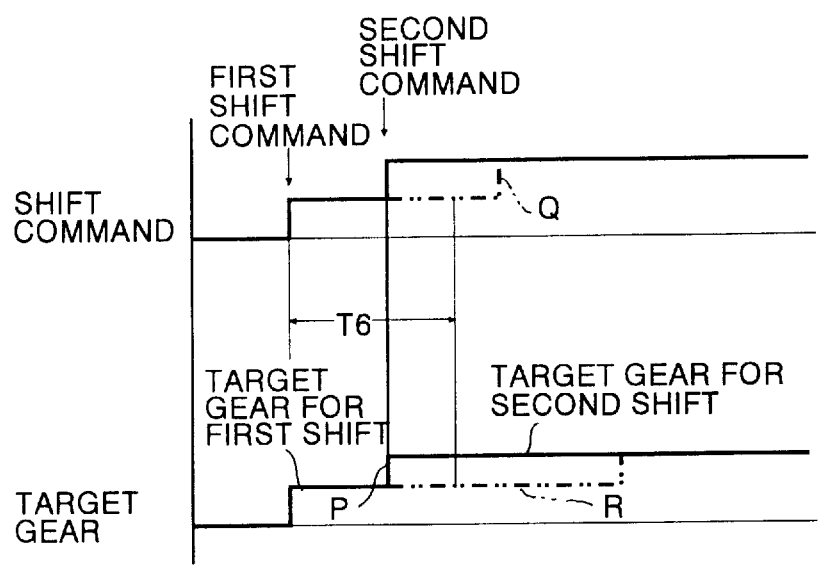
FIG. 30 is a time chart illustrating operation of the reshift prevention control.

In contrast to this, in the event where a second gear shift command is provided before the first gear-shift has concluded, if the specified time T6 has been exceeded by a duration of time t between the appearances of the first and second gear shift commands, as shown by a symbol "Q" in FIG. 30, this is regarded that the first gear shift has already started, then, at step S507, a secondary gear shift is started immediately after an alteration of shift target to the gear designated by the second gear shift command at step S506, as indicated by a symbol "R" in FIG. 30, following the conclusion of the first gear shift. In this manner, it is prevented to cause a severe shift shock due to a sudden shift in gear shift operation to the secondary gear shift while the first gear shift is in progress.

(A-3) Determination of Gear Shift Conclusion

As described above, when a second gear shift command is provided to shift the transmission to a gear after an appearance of a first gear shift command designating another gear, the shift to the secondary gear shift is caused after the conclusion of the first gear shift. Accordingly, it is essential to make a precise determination of the conclusion of the first gear shift.

Conventionally, the determination of a gear shift conclusion is made on the ground of approximate agreement of the turbine speed with the after shift-end speed. However, as was previously described in the case of a torque demand down shift which is accompanied by locking and unlocking specific two friction coupling elements, respectively, because locking one of the friction coupling elements has not always been concluded by the point of time at which the turbine speed attains the after shift-end speed resulting from unlocking another friction coupling elements, if the determination of the gear shift conclusion is made when the turbine speed attains the after shift-end speed, a shift is caused to the secondary gear shift while the first gear shift is in progress with an adverse effect of generating a shift shock.

Figure 31:
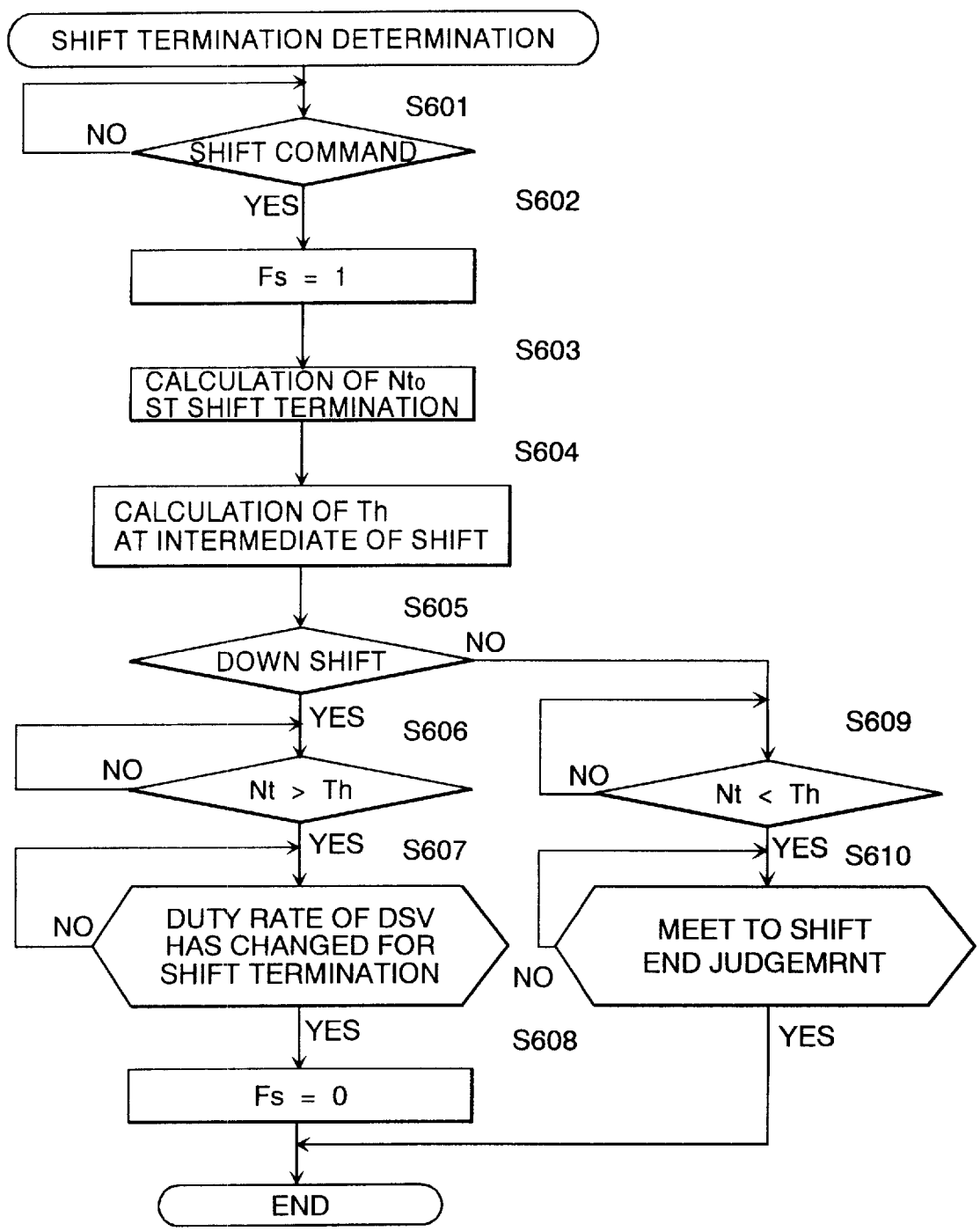
FIG. 31 is a flowchart illustrating the sequence routine of the determination of a conclusion of a gear shift.

In view of the above, in this embodiment, the determination of gear shift conclusion is accomplished following the flowchart illustrating the sequence routine shown in FIG. 31 which is designed to determine a gear shift conclusion with high precision particularly in the case of down shift.

Referring to FIG. 31, when the flowchart logic commences and control proceeds directly to a function block at step S601 where a determination is made as to whether or not a gear shift command has been provided. When an appearance of a gear shift command is determined, a shift flag Fs is set to a state of "1" at step S602 and, subsequently, an after shift-end speed $Nt_0$ is calculated at step S603. At step S604, an intermediate turbine speed Th is calculated on the basis of the after shift-end speed $Nt_0$. Specifically and concretely describing the calculation of the intermediate turbine speed Th, if a gear is shifted up or down by one step, such as, for example, a 4-3 down shift and a 3-2 down shift, or a 1-2 up shift and a 2-3 up shift, an intermediate turbine speed Th is calculated as a median between the turbine speed Nt and the after shift-end speed $Nt_0$ by the following equation (8):

$$Th = (Nt + Nt_0)/2 \qquad \cdots (8)$$

In the case of skip gear shifts such as, for example, a 4-1 down shift and the like, after finding a before shift-end speed $Nt_0'$ when the gear one step prior to the final gear (which is the second gear in the case of a 4-1 down shift) has been achieved, the intermediate turbine speed Th is calculated as a median between the before shift-end speed $Nt_0'$ and the after shift-end speed $Nt_0$ by the following equation (9):

$$Th = (Nt + Nt_0')/2 \qquad \cdots (9)$$

Subsequently, a determination is made at step S605 as to whether or not the shift type is a shift down. When it is a down shift and when it is determined at step S606 that the present turbine speed Nt exceeds the intermediate turbine speed Th, in other words when the gear shift is approaching a conclusion, the sequence logic proceeds to step S607 where a determination is made as to whether or not the duty ratio of the duty solenoid valve which primarily governs this gear shift, namely either one of the first through third duty solenoid valves (DSVs) 121, 122 and 123, has reached the state suitable for a conclusion of the gear shift. In the case of the 4-3 down shift, because the third duty solenoid valve (DSV) 123, which locks the forward clutch (FWCL) 51, primarily governs the 4-3 down shift, the determination is made in connection with the third duty solenoid valve (DSV) 123 as to whether the duty rate has been reduced to almost 0%. When the primary duty solenoid valve has attains its duty rate suitable for the conclude the gear shift, it is determined that the gear shift has been concluded, then, at step S608, the shift flag Fs is reset to the state of "0". That is to say, the determination of the conclusion of a gear shift is not made on the basis of a rise in the turbine speed Nt to an after shift-end speed which has been caused due to the unlocking of the friction coupling element, but on the basis of the fact that the locking of the friction coupling element has actually concluded. In this manner, the determination of gear shift conclusion is not erroneously made during a gear shift, so that a secondary gear shift is caused always after the conclusion of a first gear shift.

On the other hand, when it is determined at step S605 that the shift type is an up shift, then, at step S609, when it is determined that, in contrast with a down shift, the present turbine speed Nt has fallen lower than the intermediate turbine speed Th, in other words when the gear shift is approaching a conclusion, a determination is made at step S610 as to whether or not a determination criterion for up-shift is satisfied. When the up-shift determination criterion is satisfied, the shift flag Fs is reset to the state of "0" at step S608. The up-shift determination criterion may be achievement of any one of such events that the turbine speed change rate dNt has turned over from negative to positive, that the absolute value of the turbine speed change rate dNt has fallen lower than half a turbine speed change rate during the gear shift is in progress, and that the turbine speed Nt has fallen below the after shift-end speed calculated based on the turbine speed at the beginning of the gear shift. That is, because, on the contrary to a down-shift, an up-shift is, in general, achieved with a drop in the turbine speed to an after shift-end speed which is caused through locking control of the friction coupling element, it is enabled to make the determination of the locked state of the friction coupling element on the basis of the turbine speed itself or the change rate thereof.

In this connection, the primary duty solenoid valve which governs down-shifts is the third duty solenoid valve (DSV) 123 for a 4-2 down-shift and a 4-1 down-shift which takes a duty rate of approximately 0% at the conclusion of gear shift; the second duty solenoid valve (DSV) 122 for a 3-2 down-shift and a 3-1 down-shift which takes a duty rate of approximately 100% at the conclusion of gear shift; and the first duty solenoid valve (DSV) 121 for a 2-1 down-shift which takes a duty rate of approximately 100% at the conclusion of gear shift.

(A-4) 4-1 Gear Shift Control

A torque demand 4-1 gear shift is accomplished by unlocking two friction coupling elements, namely the 3–4 clutch (3–4CL) 53 and the 2–4 brake (2–4BR) 54 while locking one friction coupling element, namely the forward clutch (FWCL) 51. Accordingly, control to cause the 4-1 gear shift is performed on releasing the servo apply hydraulic pressure from the 2–4 brake (2–4BR) 54 by means of the first duty solenoid valve (DSV) 121, on releasing the locking pressure from the 3–4 clutch (3–4CL) 53 by means of the second duty solenoid valve (DSV) 122 in a state in which the 3–4 shift valve 105 has brought the servo release hydraulic pressure line 221 and the 3–4 clutch hydraulic pressure line 227 into communication with each other resulting from turning the first solenoid valve (SV) 111 off immediately after an appearance of a gear shift command, and on supplying the forward clutch hydraulic pressure to the forward clutch (FWCL) 51 by means of the third duty solenoid valve (DSV) 123. During this control, because the communication has been disconnected between the forward clutch hydraulic pressure line 219 and the servo release hydraulic pressure line 221, the servo release hydraulic pressure is not supplied to the 2–4 brake (2–4BR) 54 due to the control of the forward clutch hydraulic pressure. Furthermore, the torque demand 4-1 gear shift caused due to an increase in engine throttle opening is finished by operation of the one way clutch (OWCL) 56, and consequently the feedback control is not performed on any of these working hydraulic pressures.

Figure 32:
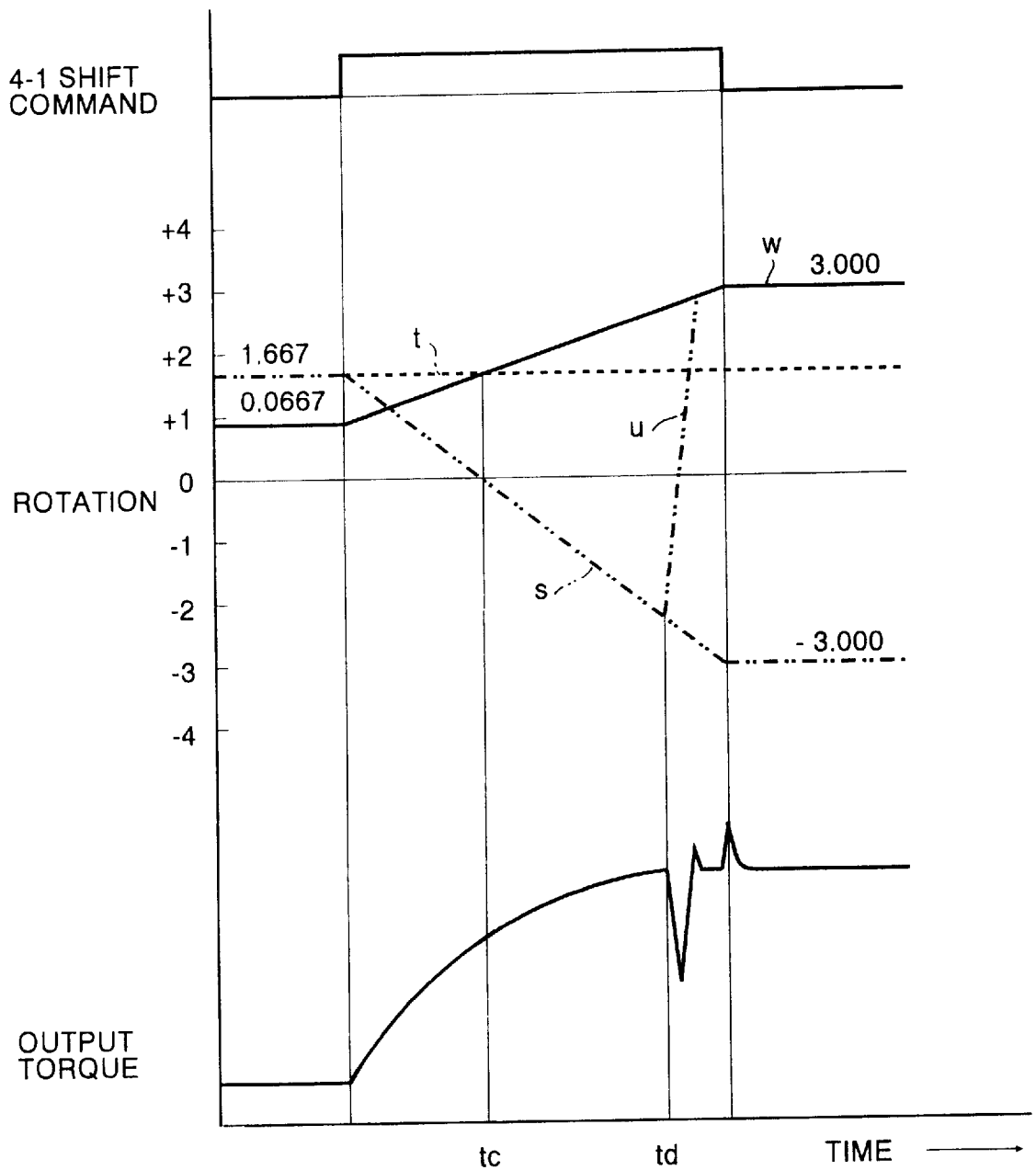
FIG. 32 is an explanatory time chart relating to the problem encountered during a 4-1 torque demand down shift.

Concerning the 4-1 gear shift which is achieved through unlocking the two friction coupling elements, i.e. the 3–4 clutch (3–4CL) 53 and the 2–4 brake (2–4BR) 54, the front and rear planetary gear mechanisms 30 and 40 operating as a transmission gear mechanism in this embodiment causes a trouble when the 2–4 brake (2–4BR) 54 is unlocked prior to the 3–4 clutch (3–4CL). As shown in FIG. 2, locking the forward clutch (FWCL) 51 which is essential to achieve the 4-1 gear shift is accomplished by bringing the drum 51a of the forward clutch (FWCL) 51 capable of rotating integrally with the turbine shaft 27 into engagement with the hub 51b of the forward clutch (FWCL) 51 capable of rotating integrally with the sun gear 31 of the front planetary gear mechanism 30 through a plurality of clutch plates. If the 2–4 brake (2–4BR) 54 is unlocked first with the 3–4 clutch (3–4CL) left locked, an angular acceleration acts on the drum 51a and the hub 51b in opposite directions. As a result, as shown in FIG. 32, although the hub 51b rotates at a speed "s" higher than a speed "W" of the drum 51a (i.e. the turbine) before the 4-1 gear shift starts, while the drum 51a increases its rotational speed "W" with the passage of time after the 2–4 brake (2–4BR) 54 has been once unlocked with the 3–4 clutch (3–4CL) left locked, the hub 51b slows down its speed "s" below the speed "w" of the drum 51a and, eventually, reverses the direction of rotation. For example, when bringing the drum 51a and hub 51b to engagement at a time td, the hub 51b suddenly increases its speed "s" as indicated by a symbol "u" and, as a result, rotary elements of the transmission gear mechanism experience great fluctuations of rotational speed which in turn is diverted to a sharp torque draw. This sharp torque draw is ultimately combined with a shock caused during completely supplying the locking hydraulic pressure to the clutch (FWCL) 51 to lock it.

In contrast to this, when the 3–4 clutch (3–4CL) 53 is unlocked first with the 2–4 brake (2–4BR) 54 left locked, the hub 51b does not experience a substantially change in rotational speed as indicated by a symbol "t" nor rotate in the opposite direction relative to the drum 51a. Accordingly, in this embodiment, in order to achieve the 4-1 gear shift, unlocking is performed on the 3–4 clutch (3–4CL) 53 prior to on the 2–4 brake (2–4BR) 54.

This phenomenon on the drum 51a and hub 51b can be explained as follows.

Letting Rs, Ns, Rr, Nr and Nc be, respectively, the pitch radius of a sun gear, the rotational speed of the sun gear, the pitch radius of a ring gear, the rotational speed of the ring gear, and the rotational speed of a pinion gear, the fundamental relationship equation on a planetary gear is given as follows:

$$Rs \cdot (Ns-Nc) + Rr \cdot (Nr-Nc) = 0 \qquad \ldots (10)$$

This fundamental relationship equation (10) is rewritten as follows:

$$Rs \cdot Ns + Rr \cdot Nr - (Rr + Rs) \cdot Nc = 0 \qquad \ldots (11)$$

Applying the fundamental relationship equation (11) to the front and rear planetary gear mechanisms 30 and 40, the following relationship equations (12) and (13) are given:

$$Rfs \cdot Nfs + Rfr \cdot Nfr - (Rfr + Rfs) \cdot Nfc = 0 \qquad \ldots (12)$$

$$Rrs \cdot Nrs + Rrr \cdot Nrr - (Rrr + Rrs) \cdot Nrc = 0 \qquad \ldots (13)$$

where suffixes "f" and "r" just behind the upper cases represents the front planetary gear mechanism 30 and the rear planetary gear mechanism 40, respectively.

Because, as apparent from the skeleton diagram of the transmission gear mechanism, the pinion gear speed (Nfc) of the front planetary gear mechanism 30 is equal to the ring gear speed (Nrr) of the rear planetary gear mechanism 40, and the ring gear speed (Nfr) of the front planetary gear mechanism 30 is equal to the pinion gear speed (Nrc) of the rear planetary gear mechanism 40, the following equations (14), (15) and (16) can be obtained.

$$Rrs \cdot Nrs + Rrr \cdot Nfc - (Rrr + Rrs) \cdot Nfr = 0 \qquad \ldots (14)$$

$$(Rrr+Rrs) \cdot Rfs \cdot Nfs + (Rrr+Rrs) \cdot Rfr \cdot Nfr - (Rfr+Rfs) \cdot (Rrr+Rrs) \cdot Nfc = 0 \qquad \ldots (15)$$

$$Rfr \cdot Rrs \cdot Nrs + Rfr \cdot Rrr \cdot Nfc - Rfr \cdot (Rrr+Rrs) \cdot Nfr = 0 \qquad \ldots (16)$$

Equations (XV) and (XVI) are rearranged and expressed as follows:

$$(Rrr+Rrs) \cdot Rfs \cdot Nfs + Rfr \cdot Rrs \cdot Nfs - \{Rfs \cdot (Rrr+Rrs) + Rfr \cdot Rrs\} \cdot Nfc = 0 \quad (17)$$

Because, in the state where, while the 3–4 clutch (3–4CL) 53 is unlocked, and the 2–4 brake (2–4BR) 54 is locked, the sun gear speed (Nrs) of the rear planetary gear mechanism 40 is 0 (Nrs=0), the following equation (18) is obtained.

$$(Rrr+Rrs) \cdot Rfs \cdot Nfs = \{Rfs \cdot (Rrr+Rrs) + Rfr \cdot Rrs\} \cdot Nfc \qquad \ldots (18)$$

The equation (XIX) is rearranged and expressed as follows:

$$Nfs = 1 + \{(Rfr \cdot Rrs)/(Rrr+Rrs)\} \cdot Nfc \qquad \ldots (19)$$

As apparent from the equation (19), the speed of the hub 51b which is the same as the sun gear speed (Nfs) of the front planetary gear mechanism 30 is unrelated to the turbine speed.

On the other hand, because, in the state where, while the 2–4 brake (2–4BR) 54 is unlocked, the 3–4 clutch (3–4CL) is locked, the ring gear speed (Nfr) of the front planetary gear mechanism 30 is equal to the turbine speed Nt, the following equations (20) and (21) are obtained from the equation (12).

$$Rfr \cdot Nfs + Rfr \cdot Nt - (Rfr+Rfs) \cdot Nfc = 0 \qquad \ldots (20)$$

$$Nfs = \{(Rfr+Rfs) \cdot Nfc - Rfr \cdot Nt\}/Rfs \qquad \ldots (21)$$

In the fourth (4th) gear, the turbine speed (Nt), the pinion gear speed (Nrc) of the rear planetary gear mechanism 40, and the ring gear speed (Nfr) of the front planetary gear mechanism 30 are equal to one another, and hence the equation (13) is rewritten as follows:

$$Nt = Rrr/(Rrr+Rrs) \qquad \ldots (22)$$

In addition, in the first (1st) gear, the ring gear speed (Nfr) of the front planetary gear mechanism 30 is 0 (Nfr=0), and the sun gear speed (Nfs) of the front planetary gear mechanism 30 is equal to the turbine speed (Nt), and hence the equation (12) is rewritten as follows:

$$Nt = \{(Rfr+Rfs)/Rfs\} \cdot Nfc \qquad \ldots (23)$$

FIG. 32 presents graphs of these values obtained from the equations (13), (21), (22) and (23) with respect to time which are denoted by symbols "t," "s", "v" and "w". In this instance, the pitch radii of the gears are set as indicated as a relative ratio in Table III below, and the vehicle speed is treated unchangeable during gear shift.

TABLE III

| | |
|---|---|
| Rrr | 2 |
| Rrs | 1 |
| Rfs | 2 |
| Rfs | 1 |
| Nfc | 1 |

The following description will be directed to the control of each duty solenoid valve (DSV) 121, 122, 123.

(A-4)-I Control of Second Duty Solenoid Valve

Figure 33:
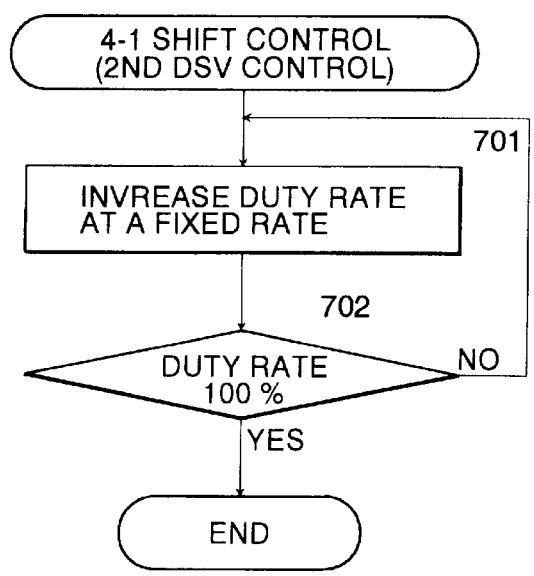
FIG. 33 is a flowchart illustrating the sequence routine of second duty solenoid control during the 4-1 torque demand down shift.
Figure 37:
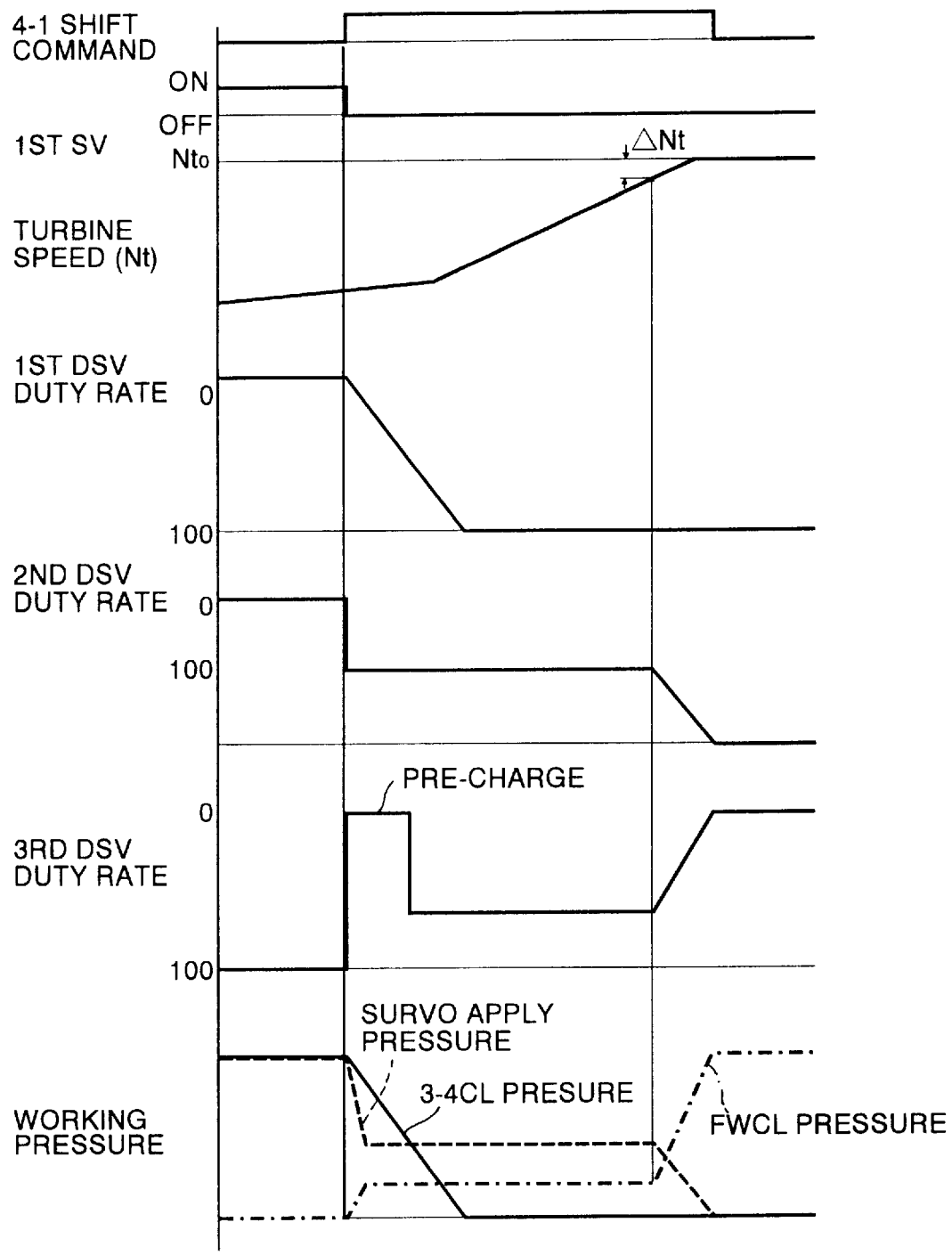
FIG. 37 is a time chart illustrating behaviors of controlling and controlled elements caused during the 4-1 torque demand down shift.

Discharge control of the 3–4 clutch hydraulic pressure and the servo release hydraulic pressure by means of the second duty solenoid valve (DSV) 122 is accomplished following the flowchart illustrating the second duty solenoid valve sequence routine shown in FIG. 33. In this control, when a gear shift command is provided, the duty ratio of the second duty solenoid valve (DSV) 122 is increased at a fixed rate from 0% to 100% through steps S708 and S702. Through this control, the 3–4 clutch hydraulic pressure is discharged relatively quickly with a constant incline, as shown in FIG. 37.

(A-4)-II Control of First Duty Solenoid Valve

Figure 34:
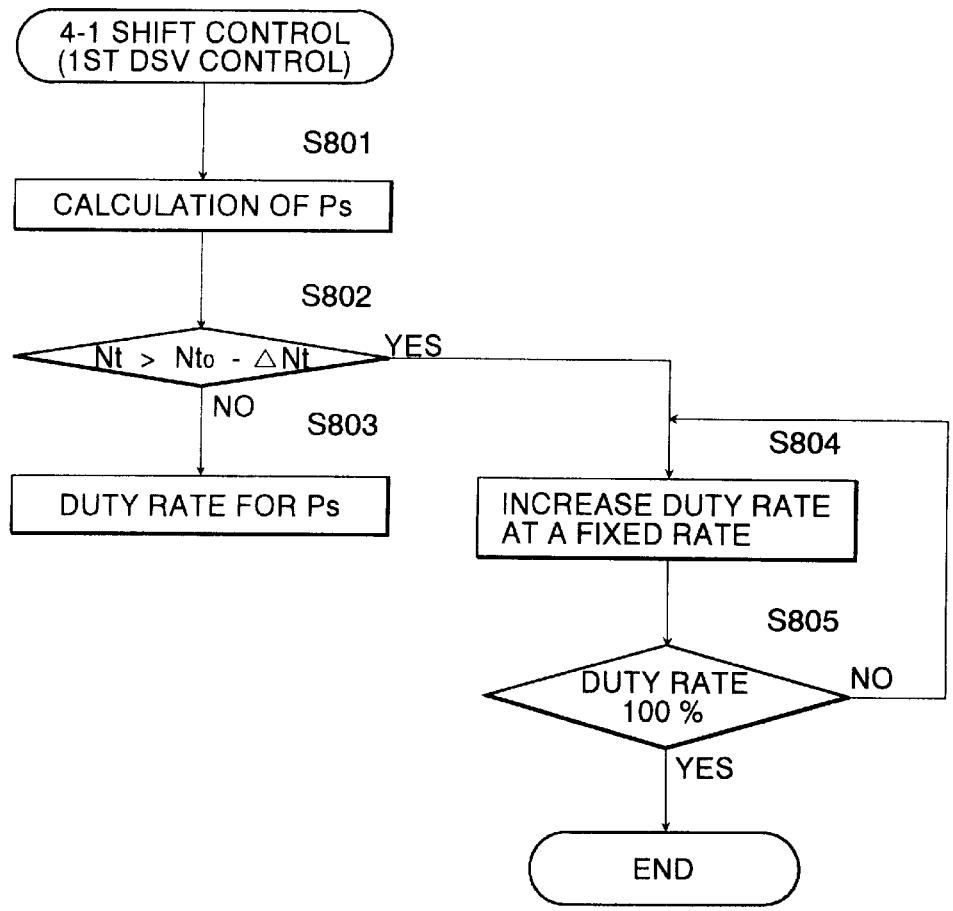
FIG. 34 is a flowchart illustrating the sequence routine of first duty solenoid control during the 4-1 torque demand down shift.
Figure 35:
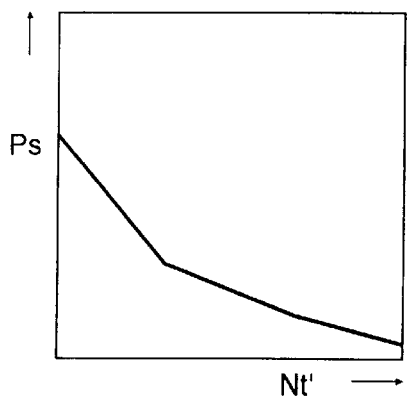
FIG. 35 is a map of base hydraulic pressure with respect to turbine speed before the 4-1 torque demand down shift used in the base hydraulic pressure calculation.

Discharge control of the servo apply hydraulic pressure by means of the first duty solenoid valve (DSV) 121 is accomplished following the flowchart illustrating the first duty solenoid valve sequence routine shown in FIG. 34. As shown, after calculating the hydraulic pressure Ps at step S801, a determination is made at step S802 as to whether or not the turbine speed Nt has exceeded as far as the before shift-end speed ($Nti_0-\Delta Nt$). Until the turbine speed Nt has risen to the before shift-end speed ($Nti_0-\Delta Nt$), the first duty solenoid valve (DSV) 121 is operated at a duty rate corresponding to the calculated hydraulic pressure Ps to control the servo apply hydraulic pressure, as shown in FIG. 37, at step S803. In this instance, the calculated hydraulic pressure Ps is found from a hydraulic pressure map in which it is set to become lower as the turbine speed Nt' prior to the gear shift becomes higher, as shown in FIG. 35. As a result, the 2–4 brake (2–4BR) 54 is held to cause a proper amount of slippage. That is, the turbine speed Nt is caused to rise smoothly by causing slippage of the 2–4 brake (2–4BR) 54 after quickly unlocking the 3–4 clutch (3–4CL) 53.

When the turbine speed reaches as far as the before shift-end speed ($Nti_0-\Delta Nt$), the duty rate of the first duty solenoid valve (DSV) 121 is increases at a fixed rate to 100% through steps S804 and S805 to completely unlock the 2–4 brake (2–4BR) 54.

(A-4)-III Control of Third Duty Solenoid Valve

Figure 36:
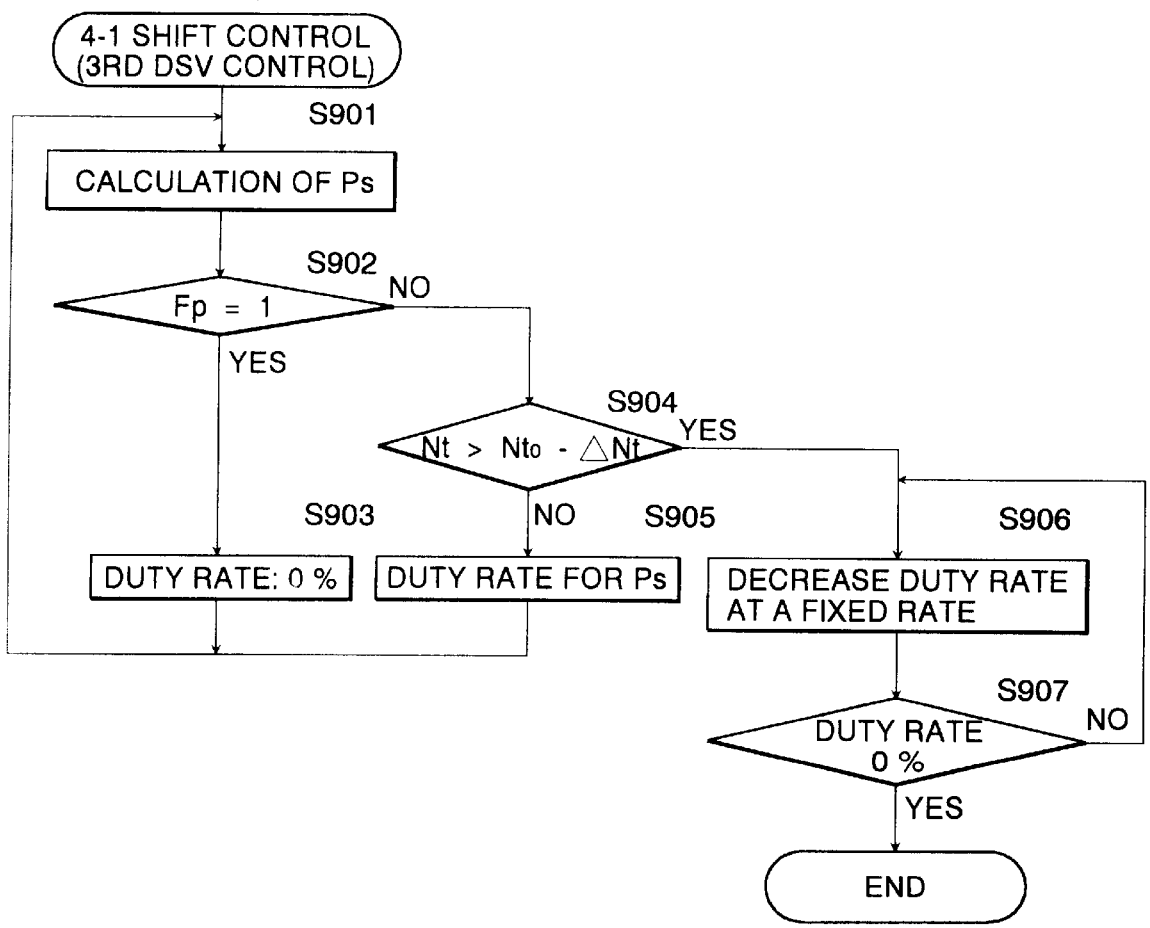
FIG. 36 is a flowchart illustrating the sequence routine of third duty solenoid control during the 4-1 torque demand down shift.

Discharge control of the forward clutch hydraulic pressure by means of the third duty solenoid valve (DSV) 123 is accomplished following the flowchart illustrating the third duty solenoid valve control sequence routine shown in FIG. 36. As shown, after calculating the hydraulic pressure Ps at step S901, when it is determined to be in a precharge interval (Fp=1) at step S902, the third duty solenoid valve (DSV) 123 is operated at a duty rate of 0% at S903 to fill quickly the fluid path leading to the pressure chamber of the forward clutch (FWCL) 51 with the working fluid. On the other hand, it is determined at step S902 that the precharge interval has been over (Fp=0), a determination is made at step S904 as to whether or not the turbine speed Nt has reached as far as the before shift-end speed ($Nti_0-\Delta Nt$). Until the before shift-end speed ($Nti_0-\Delta Nt$) has been exceeded, the third Duty solenoid valve (DSV) 123 is operated at a duty rate corresponding to the calculated hydraulic pressure Ps at step S905. In this instance, the fact that the calculated hydraulic pressure Ps is at a hydraulic pressure level sufficiently high to hold the forward clutch (FWCL) 51 in the state immediately prior to locking is similar to that in the 4-3 gear shift.

When the turbine speed Nt has exceeded the before shift-end speed ($Nti_0-\Delta Nt$), the duty rate of the third duty solenoid valve (DSV) 123 is decrease at a fixed rate to 0% through steps S906 and S907. As a result, the forward clutch hydraulic pressure is held at a hydraulic pressure level necessary to bring the forward clutch in a state immediately prior to locking during the slippage control of the 2–4 brake (2–4BR) 54, and at the moment when the turbine speed Nt reaches the before shift-end speed ($Nti_0-\Delta Nt$), the forward clutch hydraulic pressure is raised quickly to completely lock the forward clutch (FWCL) 51. In place of the determination concerning the before shift-end speed ($Nti_0-\Delta Nt$) made at step S904, it may be employed to lock the forward clutch (FWCL) 51 at a time "tc" shown in FIG. 32, namely at the moment when the speeds of the hub 51b and drum 51a of the forward clutch (FWCL) 51 coincide. This enables the forward clutch (FWCL) 51 to lock smoothly, providing further suppression of a shift shock.

(B) Coast Down Shift

A coast down 4-3 gear shift will be described as an example of down shifts caused with the engine throttle approximately fully closed. There are, in general, down shifts of a type different from torque demand down shifts, namely coast down shifts caused due to a declining in vehicle speed or by driver's manual operation. Among the coast down shifts, a 4-3 gear shift wherein the forward clutch (FWCL) 51 is locked particularly requires special control.

In contrast with a torque demand down shift in which an increase in the turbine speed Nt toward the after shift-end speed $Nt_0$ is smoothly caused in conformity with the speed of the engine under acceleration by means of the control of the locking hydraulic pressure for the friction coupling element to be unlocked (i.e. the 2–4 brake (2–4BR) 54 for the 4-3 gear shift), during the coast down gear shifts, rotation of the wheels leads the turbine speed Nt to increase resulting from the control of locking the friction coupling element to be locked, namely the forward clutch (FWCL) 51 for the 4-3 gear shift.

(B-1) General 4-3 Coast Down Shift

Figure 38:
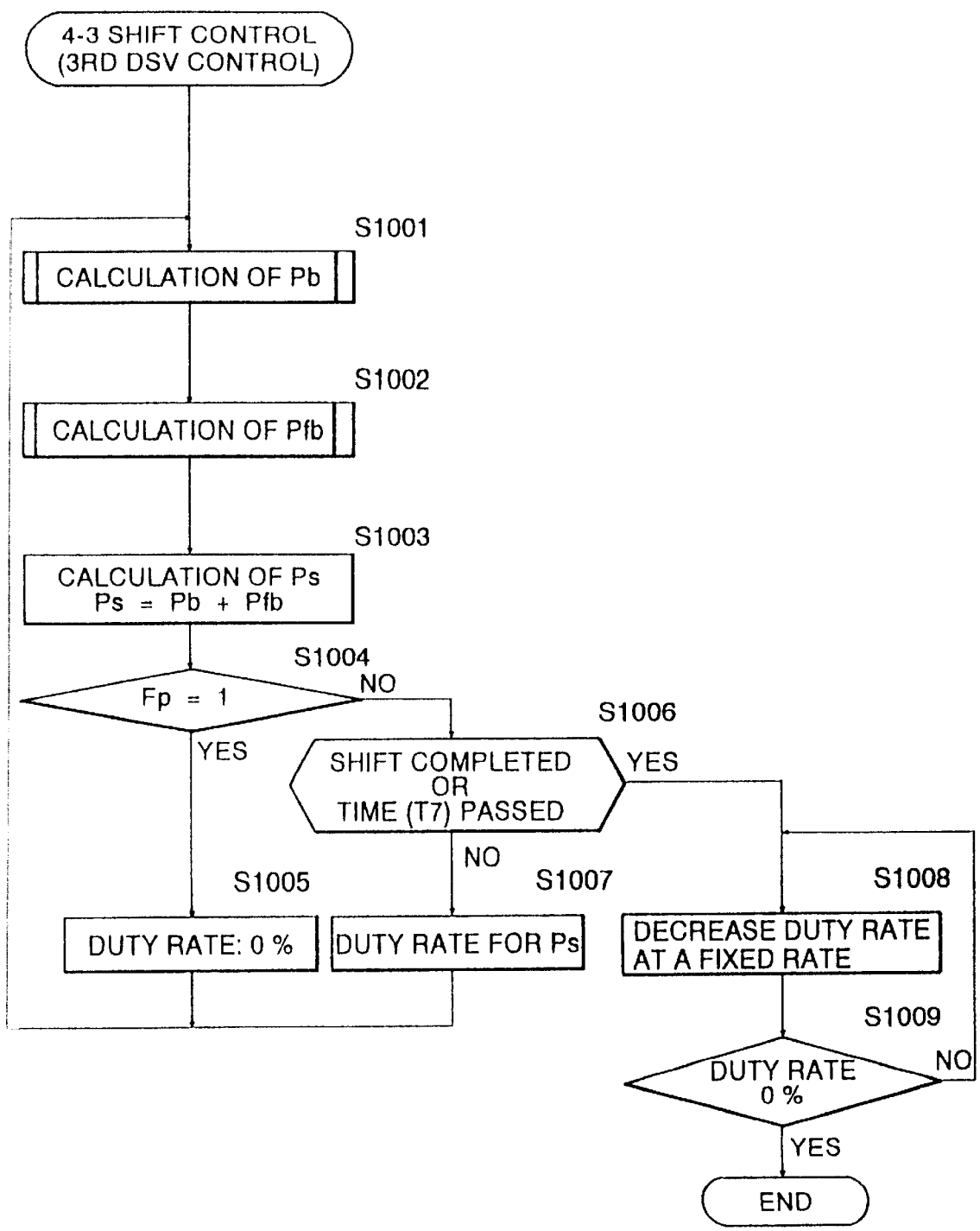
FIG. 38 is a flowchart illustrating the sequence routine of third duty solenoid control during a 4-3 coast down shift.

Control of supplying the forward clutch hydraulic pressure through the third duty solenoid valve (DSV) 123 for a coast down shift is accomplished following the flowchart illustrating the general 4-3 coast down shift sequence routine shown in FIG. 38. When the flowchart logic commences, the base hydraulic pressure Pb and the feedback hydraulic pressure Pfb are calculated in order at steps S1101 and S1102, respectively. Subsequently, at step S1103, these hydraulic pressures Pb and Pfb are added together to find the calculated hydraulic pressure Ps.

Thereafter, the precharge control is accomplished by operating the third duty solenoid valve (DSV) 123 at step S1105 while the precharge flag Fp is up or set to the state of "1" at step S1104. On the other hand, when the precharge flag Fp is down or reset to the state of "0" at step S1104, then, a determination is made at step S1106 as to whether or not the general 4-3 down shift has concluded or a specified backup time T7 on the backup timer has passed. Until a conclusion of the general 4-3 down shift or a lapse of the backup time T7, the third duty solenoid valve (DSV) 123 is operated at a duty rate corresponding to the calculated hydraulic pressure Ps at step S1107. After a conclusion of the general 4-3 down shift or a lapse of the backup time T7, the duty rate for the third duty solenoid valve (DSV) 123 is reduced at a constant rate to 0% through steps S1108 and S1109.

The calculations of the base hydraulic pressure Pb and the feedback hydraulic pressure Pfb made at steps S1101 and S1102, respectively are accomplished following a flowchart logic similar to that for the feedback control of servo apply hydraulic pressure through the first duty solenoid valve (DSV) 121 during a 4-3 torque demand down shift (see FIGS. 15 and 18).

Figure 39:
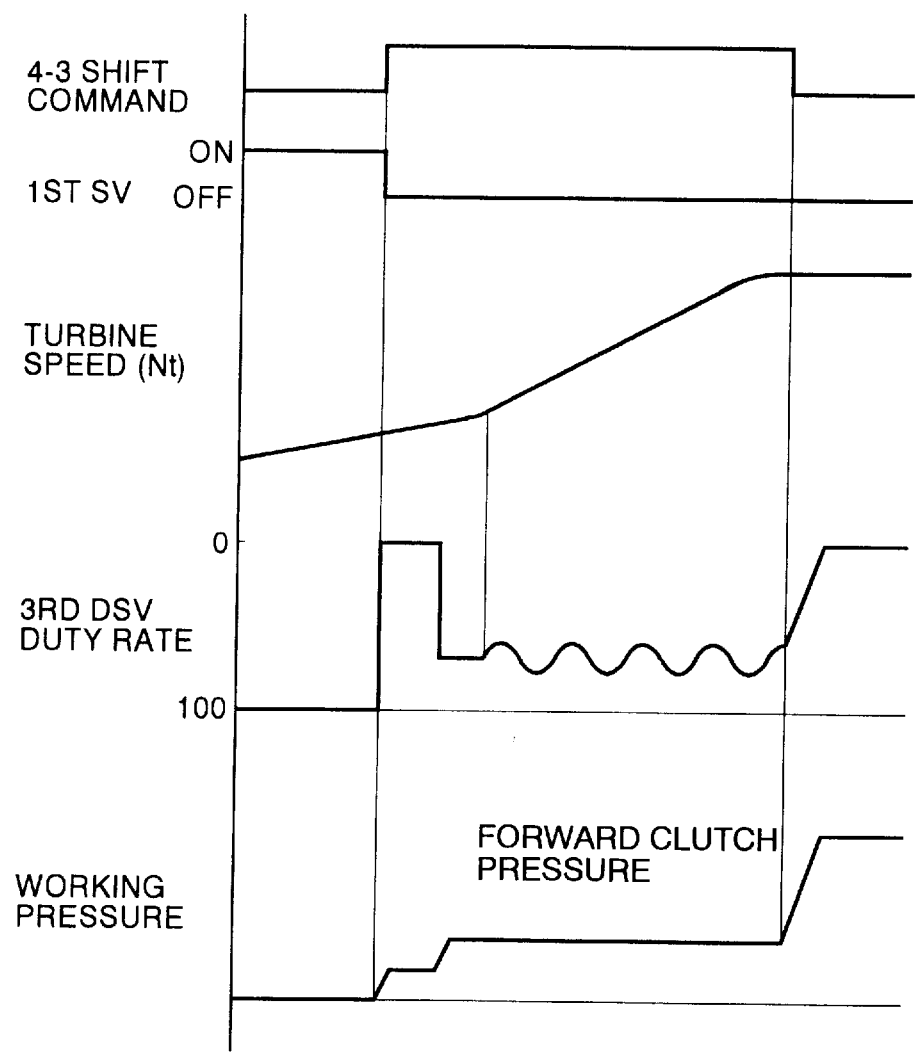
FIG. 39 is a time chart illustrating behaviors of controlling and controlled elements caused during the 4-3 coast down shift.

Through this control, the turbine is instigated through rotation of the wheels to increase its speed Nt during the control of the forward clutch hydraulic pressure as shown in FIG. 39.

(B-2) 4-3 Coast Down Shift at Low Vehicle Speeds

As was previously described, during the general 4-3 coast down shift, the after shift-end turbine speed $Nt_0$ to which the turbine speed Nt is increased through the control locking hydraulic pressure either for the friction coupling element to be locked or for the friction coupling element to be unlocked is lower while the vehicle is traveling at low speeds than while traveling at high speeds.

Incidentally, the transmission control system is adapted and designed to cooperate with an engine control system in which idle speed of the engine is controlled to increasingly or decreasingly change in accordance with engine loads. As is well known to those skilled in the art, this is called idle speed control (ISC) and is performed to control the engine speed Ne during idling by automatically adjusting a regulator valve which is installed in an air intake system so as to bypass an engine throttle valve operative in cooperation with an accelerator pedal. By means of the idle speed control (ISC), the engine speed Ne during idling is increased following an increase in electric load resulting from, for example, activation of an air conditioner or the like of the vehicle.

When the 4-3 coast down shift takes place while the vehicle is traveling at low speeds with execution of the idle speed control (ISC), there are possibly cases where the after shift-end turbine speed $Nt_0$ is lower than the idle speed having been increased through the idle speed control (ISC). Furthermore, because, while the vehicle is traveling at low speeds, a speed by which the turbine is instigated through rotation of the wheels to increase its speed Nt becomes lower, it is more logical to increase the turbine speed Nt in accordance in conformity with the engine speed Ne similarly to torque demand gear shifts than to cause an increase in the turbine speed at the instigation of rotation of the wheel. for improvement of fuel efficiency.

Figure 40:
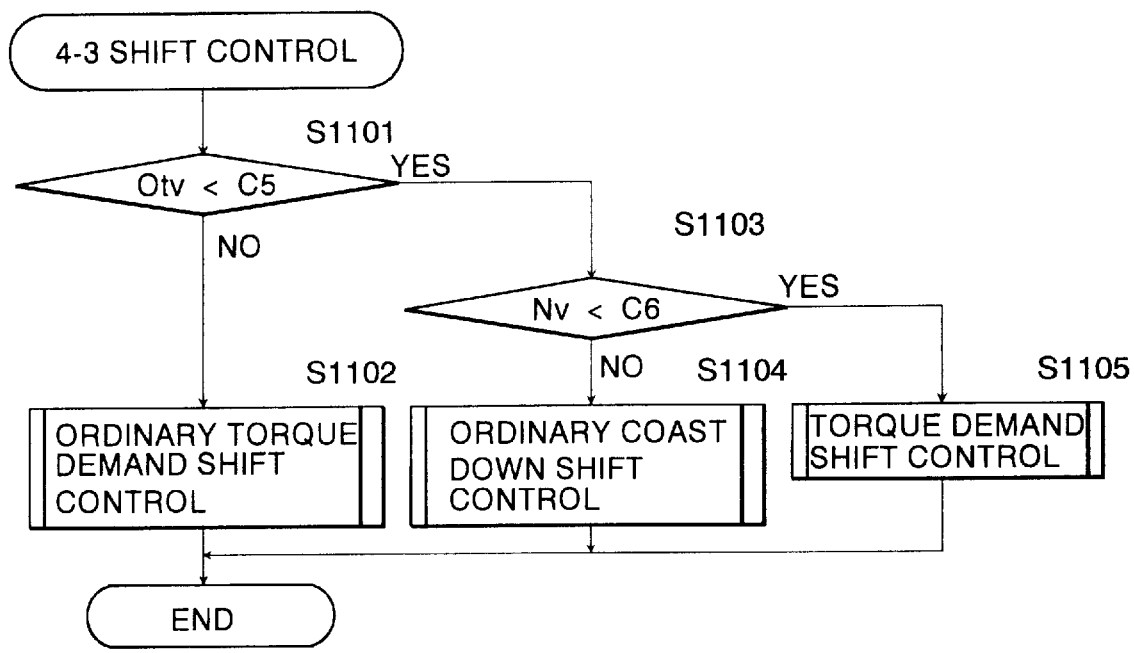
FIG. 40 is a flowchart illustrating the sequence routine of control mode selection at an appearance of a 4-3 gear shift command.

In view of the above, in this embodiment, upon an appearance of a 4-3 gear shift command, the flowchart logic shown in FIG. 40 is performed. The flowchart logic commences and control proceeds to a determination at step S1201 as to whether or not the engine throttle opening is less equal to or less than a specified opening C5. When the answer to the decision is "NO," this indicates that the accelerator pedal is depressed, then, the flowchart logic proceeds to a function block at step S1202 to perform the torque demand 4-3 gear shift control. On the other hand, when the answer to the decision is "YES," this indicates that the accelerator pedal is approximately fully closed, then, another determination is made at step S1203 as to whether or not the vehicle speed V is equal to or less than a specific speed C6. When the vehicle speed is high as far as the specific speed C6, the flowchart logic performs the general 4-3 coast down shift control described in the previous paragraph (B-1) at step S1204. To the contrary, when the vehicle speed is equal to or lower than the specific speed C6, in this event, the after shift-end turbine speed $Nt_0$ is lower than a target idle speed to be attained through the idle speed control (ISC), then, the low speed 4-3 coast down shift control resembling the 4-3 torque demand down shift control is performed. The low speed 4-3 coast down shift control will be specifically explained below.

(B-2)-I First Duty Solenoid Calve Control

Figure 41:
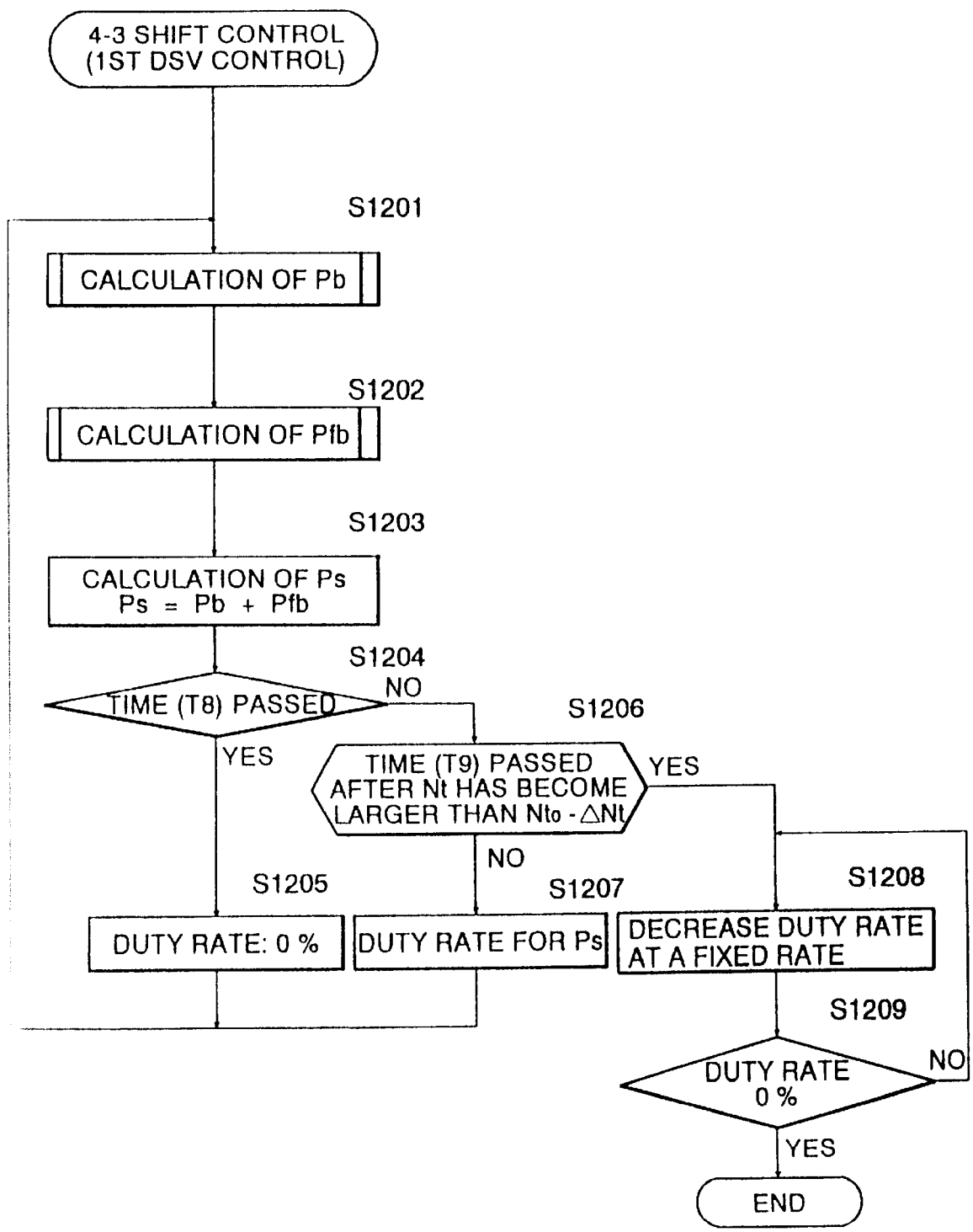
FIG. 41 is a flowchart illustrating the sequence routine of first duty solenoid control during a low speed 4-3 coast down shift.
Figure 42:
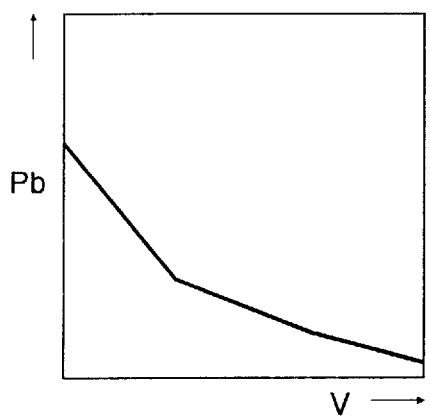
FIG. 42 is a map of base hydraulic pressure with respect to vehicle speed used in the base hydraulic pressure calculation during the low speed 4-3 coast down shift.

While the vehicle is traveling at a low speed, the control of servo apply hydraulic pressure to the 2–4 brake (2–4BR) 54 to unlock it is performed through the first duty solenoid valve (DSV) 121 even during idling, causing an increase in the turbine speed Nt not at the instigation of rotation of the wheel but in conformity with the idle speed. This first duty solenoid valve (DSV) control is performed following the flowchart shown in FIG. 41 which is basically similar to that for the 4-3 torque demand down shift shown in FIG. 13. When the flowchart logic commences, the base hydraulic pressure Pb and the feedback hydraulic pressure Pfb are calculated in order at steps S1301 and S1302, respectively. Subsequently, at step S1303, these hydraulic pressures Pb and Pfb are added together to find the calculated hydraulic pressure Ps. In this instance, the base hydraulic pressure Pb is found not based on the turbine torque as in the torque demand down shifts, but based on the vehicle speed V as shown in FIG. 42, the relationship is set so as to make the base hydraulic pressure Pb higher as the vehicle speed V becomes lower. This is because the 2–4 brake (2–4BR) 54 starts to cause appropriate slippage against the force which tends to increase the turbine speed Nt and made larger due to an increase in the difference between the turbine speed and the engine speed Ne as the vehicle speed becomes lower. While the calculation of the substantial feedback hydraulic pressure Pfb is made after the feedback flag Ff has been up, the determination of commencement of the feedback control of the turbine speed during the 4-3 coast down shift, in other words the examination of the state of the feedback flag Ff, is accomplished following the flowchart illustrating the sequence routine thereof shown in FIG. 43 which is different from the sequence routine for the torque demand down shifts shown by the flowchart in FIG. 22. Specifically, because, an apparent increase in the turbine speed Nt due to rolling of the engine and the transmission is relatively small during the 4-3 coast down shift with the engine throttle completely closed, as indicated by a symbol "S" in FIG. 44, when it is determined at step S1401 that the turbine change rate dNt has exceeded a specified rate C1 as indicated by a symbol "T" in FIG. 44, or when it is determined at step S1403 that a specified backup time T4 on the backup timer set at an appearance of a gear shift command has passed, the feedback flag Ff is set to the state of "1" at step S1402. On the other hand, until the specified backup time T4 has passed, the feedback flag Ff is set to the state of "1" at step S1404.

Referring back to FIG. 41, when the feedback flag Ff has been up once, the first duty solenoid valve (DSV) 121 is operated at a duty rate of 0% until a specified time T8 passes following the appearance of the gear shift command through steps S1304 and S1305, or at a duty rate corresponding to the calculated hydraulic pressure Ps through steps S1306 and S1307 until the a specified time T9 passes following attainment of the turbine speed Nt to the before shift-end speed ($Nt_0 - \Delta Nt$) since the specified time T8 has passed. After a lapse of the specified T9, the duty rate of the first duty solenoid valve (DSV) 121 is reduced at a constant rate to return to 0% again through steps S1308 and S1309.

(B-2-II) Third Duty Solenoid Valve Control

During the low speed 4-3 coast down shift, the forward clutch hydraulic pressure control through the third duty solenoid valve (DSV) 123 is not applied to the feedback control of the turbine speed. The control for the third duty solenoid valve (DSV) 123 is performed basically similar to the control during the torque demand down shift illustrated by the flowchart shown in FIG. 20.

Figure 45:
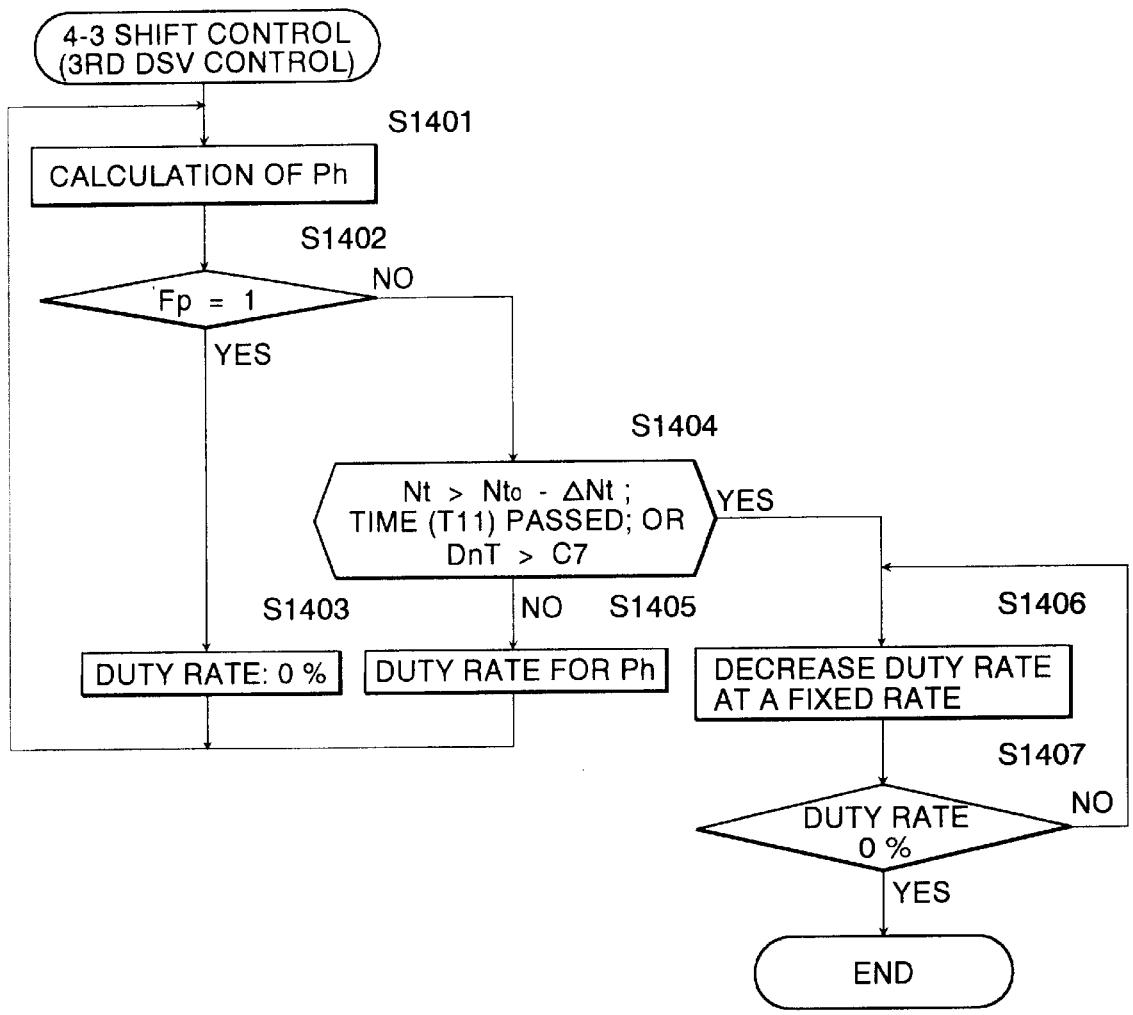
FIG. 45 is a flowchart illustrating the sequence routine of third duty solenoid control during the low speed 4-3 coast down shift.

The third duty solenoid valve control during the low speed 4-3 coast down shift is accomplished following the flowchart illustrating the sequence routine shown in FIG. 45. In the control, a calculation is made at step S1501 to find a holding hydraulic pressure Ph necessary for the forward clutch 51 to hold its piston in a state immediately prior locking. Subsequently, through steps S1502 and S1503, the working fluid is precharged in the fluid path to the servo release hydraulic pressure chamber 54$b$ of the 2–4 brake (2–4BR) 54 and the pressure chamber of the forward clutch (FWCL) 51 by operating the third duty solenoid valve (DSV) 123 at a duty rate of 0% until the precharge flag Fp is up or set to the state of "1." In this instance, the holding hydraulic Ph is similar to the calculated hydraulic pressure Ps in the 4-3 torque demand down shift and is equivalent to the force of a spring in the forward clutch (FWCL) 51.

Figure 43:
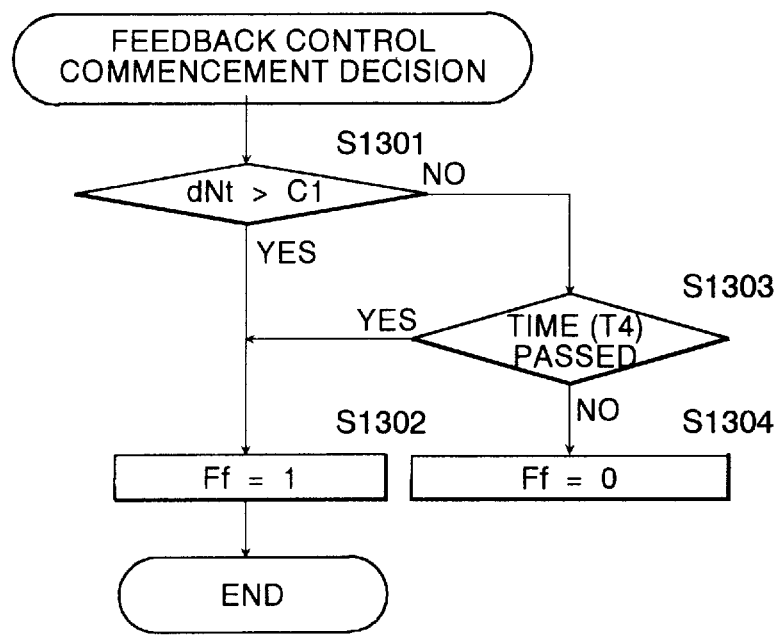
FIG. 43 is a flowchart illustrating the sequence routine of the determination of commencement of hydraulic pressure feedback control during the low speed 4-3 coast down shift.
Figure 44:
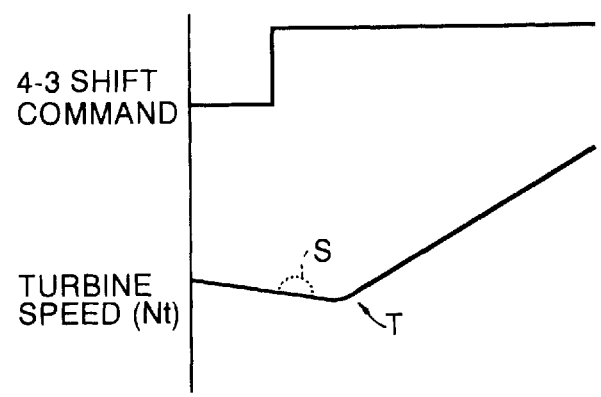
FIG. 44 is an explanatory diagram for the determination of commencement of hydraulic pressure feedback control.

When the precharge flag is reset down, a determination is made at step S1504 as to whether or not at least one of the three conditions i.e. a first condition that number turbine speed Nt has increased as far as the before shift-end speed (Nt$_0$–ΔNt); a second condition that whether or not a specified backup time T11 on the backup timer set following setting the feedback flag Ff to the state of "1" at step S1402 in the flowchart shown FIG. 43 has passed; and a third condition that whether or not the turbine speed change rate dNt has exceeded a specified rate C7. Until at least one of these three conditions is satisfied, the third duty solenoid valve (DSV) 123 is operated at a duty rate corresponding to the holding hydraulic Ph at step S1505. On the other hand, when at least one of the three conditions is satisfied, the duty rate of the third duty solenoid valve (DSV) 123 is reduced to 0% at a fixed rate through steps S1506 and S1507.

Figure 46:
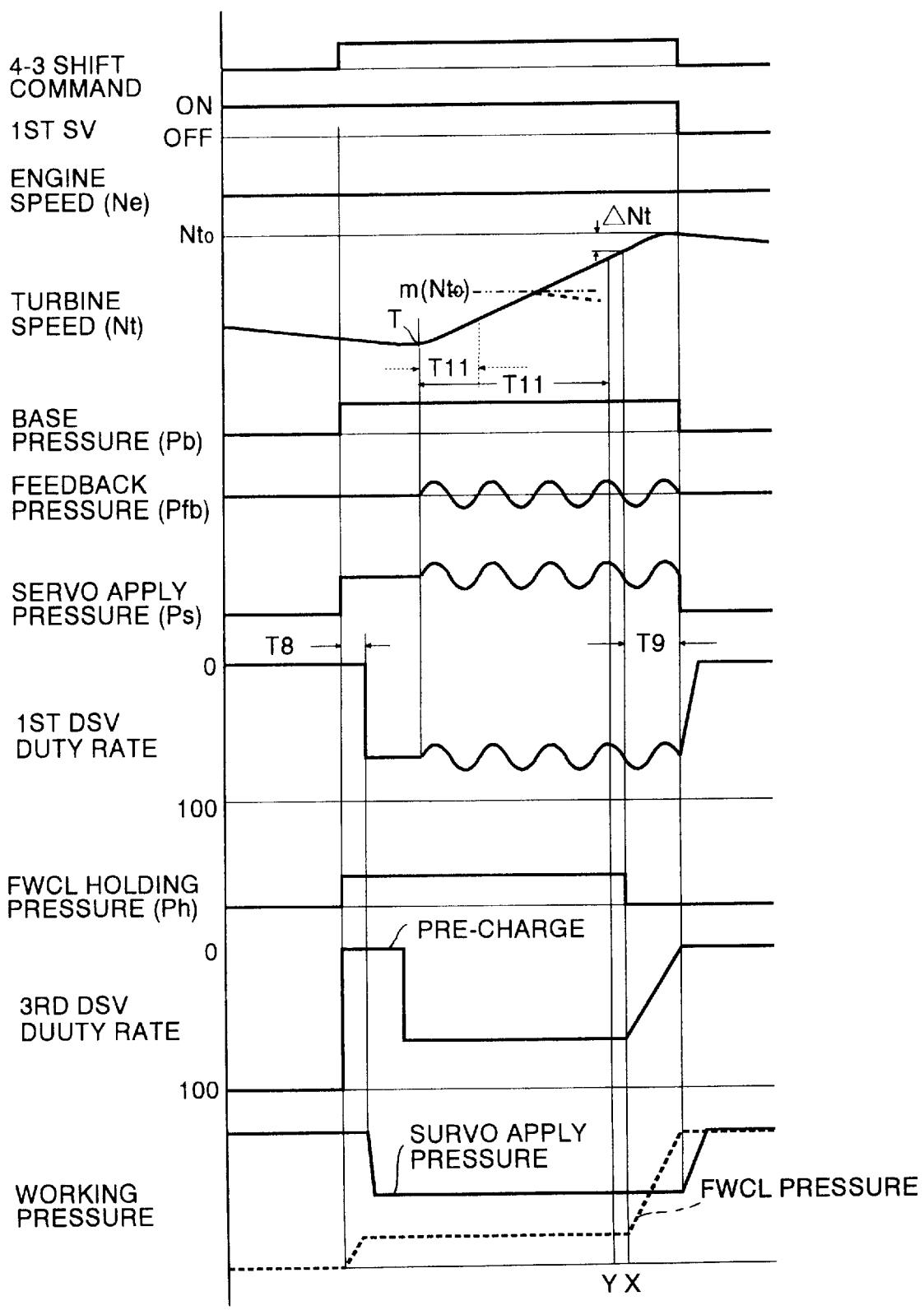
FIG. 46 is a time chart illustrating behaviors of controlling and controlled elements caused during the low speed 4-3 coast down shift.

The significance of employing the three conditions in the determination made at step S1504 will be explained with reference to the timing chart shown in FIG. 46 below.

The first condition must be satisfied to achieve the locking of the forward clutch (FWCL) 51 when the turbine speed Nt has approached closely the after shift-end turbine speed Nt$_0$, similarly to the determination made at step 104 in the flowchart of the third duty solenoid valve control performed during torque demand down shifts. In the time chart in FIG. 46, the forward clutch hydraulic pressure Fw starts to rise at a time X in FIG. 46. The second condition must be satisfied to cause the forward clutch (FWCL) 51 to start to lock without fail after a lapse of the specified time T1 from when the turbine speed Nt has started to increase. In the time chart in FIG. 46, the forward clutch hydraulic pressure Fw start to increase at, for example, a time Y. Because the lower the vehicle speed V is or the larger the vehicle speed change rate, namely the acceleration, is as a result of more sudden application of brake, the lower the after shift-end turbine speed Nt$_0$ becomes to make a gear shift period shorter as indicated by a slanted line "m" in FIG. 46, the specified time T11 is set to be shorter as indicated by a broken line as the vehicle speed V upon an appearance of a down shift command becomes lower or as the vehicle speed change rate is larger. By means of thus setting the specified time T11, a delay in locking the forward clutch (FWCL) 51 is avoided. The third condition must be satisfied to start the locking of the forward clutch (FWCL) 51 almost simultaneously with a start of an increase in the turbine speed Nt at indicated by a symbol "T" in FIG. 46 in order to deal appropriately with the case where the gear shift period is extremely shortened as a result of sudden brake application and the before shift-end turbine speed and/or the backup time consequently fail effectively function and deprive significance as control parameters. Accordingly, it may performed to cause the forward clutch hydraulic pressure Fw to raise whenever any one of these three conditions is satisfied as in the flowchart shown in FIG. 45, or otherwise to use conditions selected among the three in accordance with the vehicle speed V or the deceleration.

In addition, from the main point of the coast down shift control, the specific speed C6 used at step S1203 of the flowchart shown in FIG. 40 is set to a vehicle speed V which makes the after shift-end turbine speed Nt$_0$ lower than the engine speed Ne immediately prior to the gear shift, during the gear shift, or after the gear shift. However, because, when employing the engine speed Ne immediately prior to the gear shift as the specific speed C6, in particular, in cases of large deceleration, the engine speed drops relatively greatly in the interval from when the engine throttle completely closes to an appearance of the gear shift command, it is preferable to correct the engine speed Ne immediately prior to the gear shift in accordance with deceleration. Through this correction, the coast down gear shift control is accomplished even more satisfactorily.

As was described at the beginning in phrase (B-2), during down shifts, the control is in general performed to cause an increase in the turbine speed Nt to the after shift-end speed Nt$_0$. However, in cases accompanying the replacement of the locked and unlocked friction coupling elements, the determination whether to accomplish the turbine speed control through the unlocking of one friction coupling element or through the locking of another friction coupling element may be made through a direct comparison between the engine speed Ne and the after shift-end turbine speed Nt$_0$, besides through the determinations based on the engine throttle opening and the vehicle speed at steps S1201 and 1203, respectively, in the flowchart shown in FIG. 40.

Figure 47:
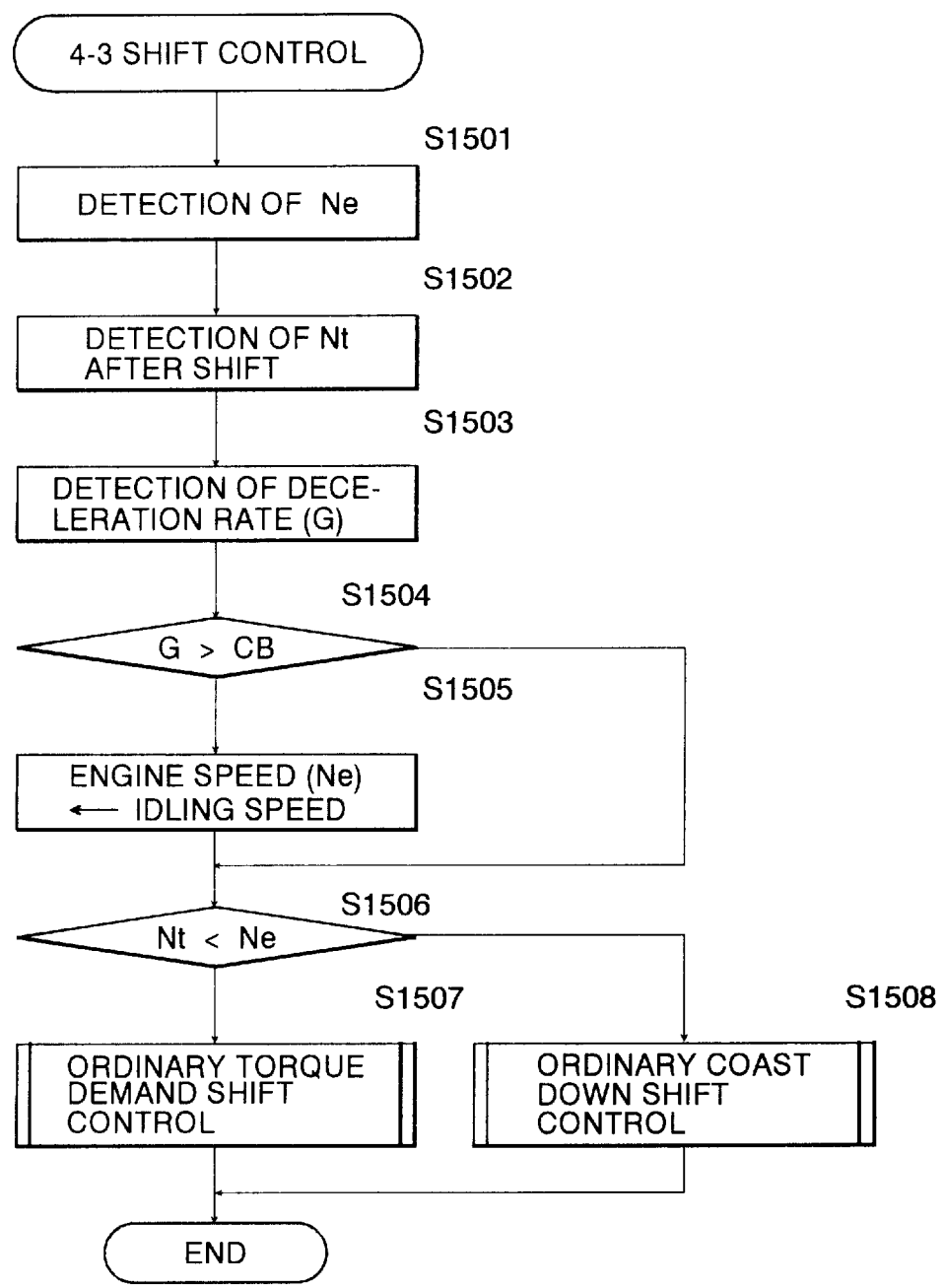
FIG. 47 is a flowchart illustrating the sequence routine of control mode selection at an appearance of a 4-3 gear shift command.

The low speed 4-3 coast down gear shift control in which the determination concerning the turbine speed control is made through a direct comparison between the engine speed Ne and the after shift-end turbine speed Nt$_0$ is accomplished following the flowchart illustrating the sequence routine thereof shown in FIG. 47. When the flowchart logic commences, an engine speed Ne, an after shift-end turbine speed Nt and a deceleration G are respectively detected at steps S1601 through S1603 in order immediately following an appearance of a 4-3 gear shift command. Subsequently, a determination is made at step S1604 as to whether or not the deceleration G is larger than a specified rate C8 as a result of, for example, sudden brake application or the like. When the deceleration G is larger than the specified rate C8, after taking an idle speed of the engine as the engine speed Ne at step S1605, a determination is made at step S1606 as to whether or not the after shift-end turbine speed Nt$_0$ is smaller than the engine speed Ne. On the other hand, when the deceleration G is equal to or less than the specified rate C8, the engine speed Ne practically detected at step S1601 is employed as the parameter to be compared with after shift-end turbine speed Nt$_0$. When the after shift-end turbine speed Nt$_0$ is at least as large as the engine speed Ne, the torque demand gear shift control is performed at step S1607. On the other hand, when the after shift-end turbine speed Nt$_0$ is less than the engine speed Ne, the general coast down gear shift control is performed at step S1608.

(C) After Shift-End Turbine Speed Correction

As described above, during the down shift control, the time to shift from an inertia phase immediately prior to the conclusion of a gear shift to a torque phase is set to the point of time at which the turbine speed Nt has reached the speed smaller by a certain value ΔNt than a shift-end speed $Nt_0$, i.e. a before shift-end speed. A problem of how to establish the shift-end speed $Nt_0$ is encountered in this instance. In other words, if the vehicle speed, i.e. the transmission output speed, is constant during a down shift, while the turbine speed after a conclusion of the gear shift Ntf (=$Nt_0$) can be found from equation (24) below, however, in the case of down shifts caused during acceleration, such as torque demand down shifts, it is necessary to correct the turbine speed after the conclusion of the gear shift taking into consideration an increase in the vehicle speed during the gear shift.

$$Ntf = Nti \cdot (Gf/Gi) \quad \ldots (24)$$

where Nti is the turbine speed before the gear shift, Gi is the gear ratio before the gear shift and Gf is the gear ratio after the gear shift.

This correction of the turbine speed after the gear shift Ntf due to acceleration can be dealt with as two component increases, namely an increase Ntf1 in accordance with a change rate $dNT_0$ of the before shift-end turbine speed and an increase Ntf2 in accordance with an increase in the turbine torque Tt during the down shift, which are given by the following equations (25) and (26), respectively.

$$Ntf1 = dNt_0 \cdot t \cdot (Gf/Gi) \quad \ldots (25)$$

$$Ntf2 = [\int \{(Tt-Tti) - I \cdot (dNt - dNti)\} dt] \cdot C \quad \ldots (26)$$

where t in equation (25) is the duration of time from the point of time at which the turbine speed change rate dNt has exceeded a specified rate dNtx (the point of time at which the gear shift starts) to the present point of time, Tti in equation (26) is the turbine torque immediately before the gear shift, dNti is the turbine speed change rate before the gear shift, I is a coefficient relating to inertial mass of the turbine, and C is a coefficient for converting the turbine torque Tt into the turbine speed change rate dNt and given by the equation (27) in which GF is the reduction gear ratio of the vehicle, R is the effective tire radius, and M is the mass of the vehicle.

$$C = (60 \cdot Gi \cdot Gf \cdot GF^2)/(2\pi R^2 \cdot M) \quad \ldots (27)$$

The above equation (27) is used in the case where a change in gear ratio does not occur to a gear shift to convert an increase in the turbine speed ($dNt_0 \cdot t$) increasing from the start of the gear shift to the present point of time on the basis of the turbine speed change rate $dNt_0$ immediately before the gear shift into an increase in the turbine speed after the gear shift using gear ratios Gi and Gf before and after the gear shift. Further, equation (26) is used to find an increase in the turbine speed on the basis of an increase in the vehicle speed. The increase in the turbine speed is obtained by subtracting a torque expense [I·(dNt−dNti)] on the change in turbine speed from an increase [Tt−Tti] in the turbine torque at the present point of time with respect to the turbine torque Tti at the start of the gear shift on condition that the remaining torque is considered to have done for the increase in the vehicle speed.

As given by equation (28) below, the turbine speed after a gear shift Ntf is obtained by correcting a turbine speed after a gear shift Ntf, which is found as a base turbine speed $Ntf_0$ by calculating the equation (1), with use of the component increases Ntf1 and Ntf2 in the turbine speed.

$$Ntf = Ntf_0 + Ntf1 + Ntf2 \quad \ldots (28)$$

Figure 48:
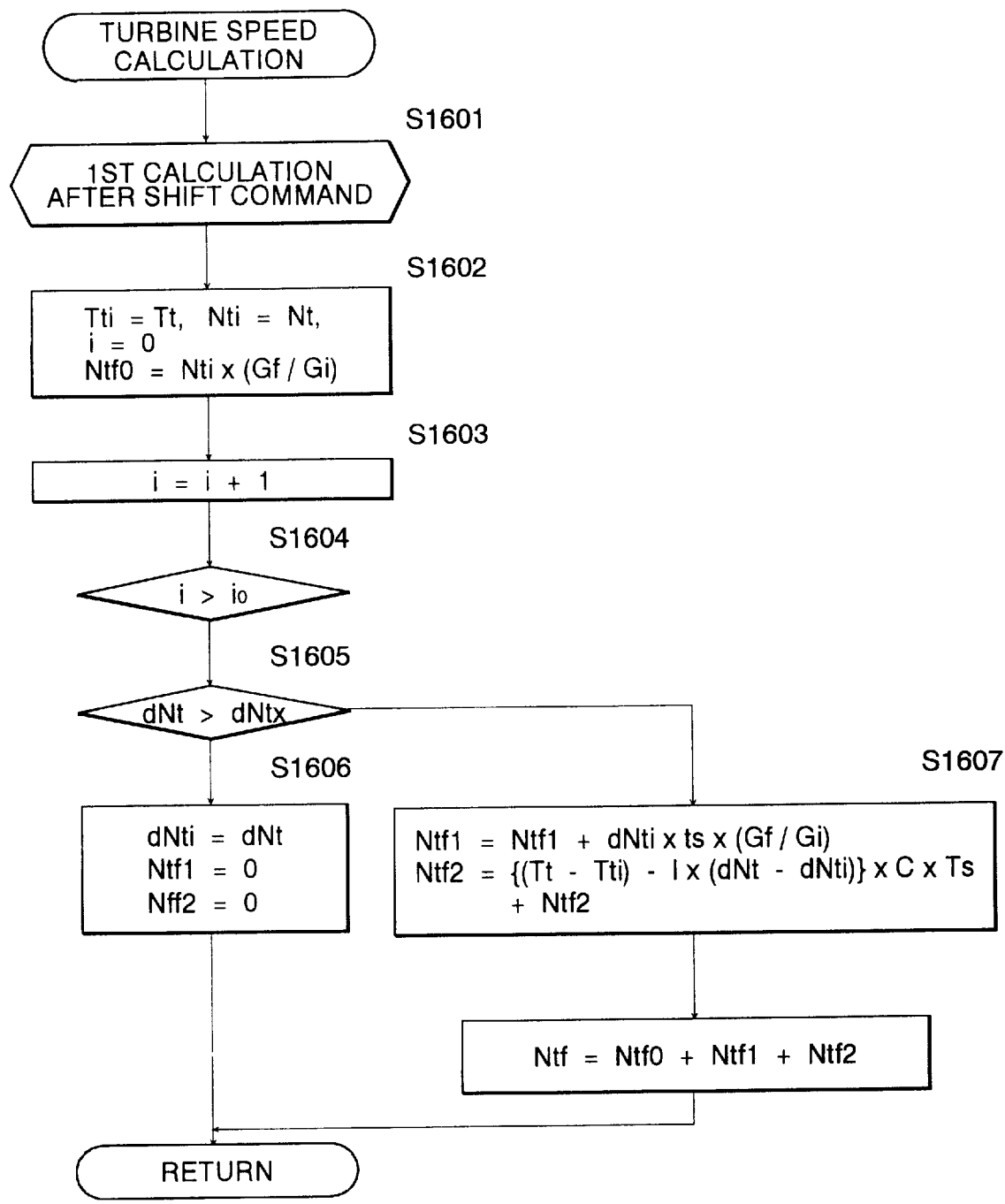
FIG. 48 a flowchart illustrating the sequence routine of the calculation of turbine speed after a down shift.

The correction of the turbine speed after the gear shift is accomplished following the flowchart illustrating correction sequence routine shown in FIG. 48. The flowchart logic commences upon an appearance of a gear shift command and control proceeds directly to a function block at step S1701 where a determination is made as to whether or not it is the first gear shift command. When it is the first gear shift command, a base turbine speed $Ntf_0$ is calculated based on the turbine speed before the gear shift Nti after resetting the count i of a counter to zero (0), the turbine speed Nt and The turbine torque Tt at the appearance of the gear shift command to the turbine speed Nti and the turbine torque Tti before the gear shift, respectively, at step S1702.

Subsequently, after changing the count i by an increment of 1 (one) at step S1703, a determination is made at step S1704 as to whether or not the count i has exceeded a specified number $i_0$, in other words whether or not a specified duration of time has been over. Until the specified duration of time is over, another determination is made at step S1705 as to whether or not the turbine speed change rate dNt is greater than a specified rate dNtx, in other words whether or not the turbine speed Nt has started to increase following the appearance of the gear shift command. When the turbine speed change rate dNt has not yet reached the specified rate dNtx, at step S1706, after altering the present turbine speed change rate dNt to the turbine speed change rate before the gear shift dNti, both component turbine speed increases Ntf1 and Ntf2 are unconditionally substituted by 0 (zero) at step S1707. On the other hand, when the specified duration of time has been over or when the turbine speed change rate dNt has increased greater than the specified rate dNtx, then, present component turbine speed increases Ntf1 and Ntf2 are calculated at step S1707. Finally, the turbine speed after a conclusion of the gear shift Ntf is obtained by adding the component turbine speed increases Ntf1 and Ntf2 to the base turbine speed $Ntf_0$ at step S1708. The after shift-end turbine speed Ntf is used as the after shift-end turbine speed Nt to be detected, for instance, at step S1602 in the flowchart illustrating the low speed 4-3 coast down gear shift control routine shown in FIG. 47.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for an automatic transmission, installed between a driving torque generator and drive wheels of an automotive vehicle, which comprises a torque converter and a transmission gear mechanism equipped with a plurality of friction coupling elements including at least first and second friction coupling elements, said control system having a hydraulic pressure control system with a fluid source for supplying of working fluid pressure to and discharge of working fluid pressure from said pressure chambers of said friction coupling elements to selectively lock and unlocked said friction coupling elements so as to change a torque transmission path in the transmission gear mechanism and thereby to provide available gears, said available gears including a specific gear which is achieved by locking said first friction coupling elements and unlocking said second friction coupling element during a specific down shift to the specific gear, said control system comprising:

vehicle speed detection means for detecting a vehicle speed of the automotive vehicle;

generator load detection means for detecting a generator load acting on the driving torque generator;

output speed detection means for detecting an output speed of rotation output from the driving torque generator;

input speed detection means for detecting an input speed of rotation input to the automatic transmission;

first working fluid pressure control means installed in a fluid path between said first friction coupling element and said fluid source for controlling supply of working fluid pressure to and discharge of working fluid pressure from said first friction coupling element;

second working fluid pressure control means installed in a fluid path between said second friction coupling element and said fluid pressure source for controlling supply of working pressure to and discharge of working pressure from said second friction coupling element;

control means for providing a gear shift command signal indicating one of scheduled gear shifts which is selected according to said vehicle speed and said load, controlling said first and second working fluid pressure control means according to said gear shift command signal, making a determination based on said input and said output speed of rotation whether an input speed of rotation attained after a conclusion of said specific down shift becomes lower than said output speed of rotation, controlling supply and discharge operation of said first working pressure control means so as to make said output speed of rotation during said specific down shift approach a speed attained after a conclusion of said specific down shift when it is determined that said input speed of rotation after a conclusion of said specific down shift becomes lower than said output speed of rotation, and controlling supply and discharge operation of said second working pressure control means so as to make said output speed of rotation during said specific down shift approach a speed of rotation attained after a conclusion of said specific down shift when it is determined that said input speed of rotation after a conclusion of said specific down shift does not become lower than said output speed of rotation.

2. An automatic transmission control system as defined in claims 1, wherein said driving torque generator comprises an internal combustion engine.

3. An automatic transmission control system as defined in claims 1, wherein, when said gear shift command signal is provided for said specific down shift while said generator load takes a lower extreme value, said control means makes a correction of said output speed of rotation having been attained before said specific down shift according to a time from when said generator load reaches said lower extreme value to an appearance of said gear shift command signal, and performs said determination based said corrected output speed of rotation.

4. An automatic transmission control system as defined in claims 3, wherein said driving torque generator comprises an internal combustion engine, and, when said gear shift command signal is provided for said specific down shift while an engine throttle is fully closed, said control means makes a correction of said output speed of rotation of said internal combustion engine having been attained before said specific down shift according to a time from when said engine throttle is made to be fully closed to an appearance of said gear shift command signal, and performs said determination based said corrected output speed of rotation of said internal combustion engine.

5. An automatic transmission control system as defined in claims 1, wherein said control means estimates an input speed of rotation to said automatic transmission attained after a conclusion of said specific down shift, and performs said determination on the basis of said estimated input speed of rotation.

6. An automatic transmission control system as defined in claims 1, wherein said control means estimates said output speed of rotation from said generator load and said vehicle speed, and performs said determination on the basis of said estimated output speed of rotation.

7. An automatic transmission control system as defined in claims 6, wherein, when said generator load is greater than a lower extreme value, said control means determines that said input speed of rotation after a conclusion of said specific down shift becomes smaller than said output speed of rotation.

8. An automatic transmission control system as defined in claims 6, wherein, when said generator load takes a lower extreme value and said vehicle speed takes less than a specified value, said control means determines that said input speed of rotation after a conclusion of said specific down shift becomes smaller than said output speed of rotation.

9. A control system for an automatic transmission, installed between a driving torque generator and drive wheels of an automotive vehicle, which comprises a torque converter and a transmission gear mechanism equipped with a plurality of friction coupling elements including at least first friction coupling element, which is provided with a locking pressure chamber and an unlocking pressure chamber divided by a piston and which is locked when only said locking pressure chamber is supplied with working fluid pressure and is unlocked when at least said unlocking pressure chamber is supplied with working fluid pressure and when neither said locking pressure chamber nor said unlocking pressure chamber is supplied with working fluid pressure, and a second friction coupling element having a pressure chamber in communication with said first friction coupling element's unlocking pressure chamber which is locked when said second friction coupling element's pressure chamber is supplied with working fluid pressure, said control system having a hydraulic pressure control system with a working fluid source for controlling supply of working fluid pressure to and discharge of working fluid pressure from said pressure chambers of said friction coupling elements to selectively lock and unlocked said friction coupling elements so as to change a torque transmission path in the transmission gear mechanism and thereby to provide available gears, said control system comprising:

vehicle speed detection means for detecting a vehicle speed of the automotive vehicle;

generator load detection means for detecting a generator load acting on the driving torque generator;

output speed detection means for detecting an output speed of rotation output from the driving torque generator;

input speed detection means for detecting an input speed of rotation input to the automatic transmission;

first working fluid pressure control means installed in a fluid path between said first friction coupling element's locking pressure chamber and said fluid source for controlling supply of working fluid pressure to and discharge of working fluid pressure from said first friction coupling element's locking pressure chamber;

second working fluid pressure control means installed in a fluid path between said first friction coupling element's unlocking pressure chamber and said fluid pressure source for controlling supply of working pressure to and discharge of working pressure from said first friction coupling element's unlocking pressure chamber;

control means for providing a gear shift command signal indicating one of scheduled gear shifts which is selected according to said vehicle speed and said generator load, controlling said first and second working fluid pressure control means according to said gear shift command signal, making a determination based on said input and said output speed of rotation whether an input speed of rotation attained after a conclusion of a specific down shift becomes lower than said output speed of rotation, said specific down shift being achieved through a shift from a state where, while said first friction coupling element's locking pressure chamber is supplied with working fluid pressure, neither said first friction coupling element's unlocking pressure chamber nor said second friction coupling element's pressure chamber is supplied with working fluid pressure to a state where said first friction coupling element's locking pressure chamber and unlocking pressure chamber are supplied with working fluid pressure, and, during said specific down shift, controlling supply and discharge operation of said first working pressure control means so as to make said output speed of rotation during said specific down shift approach a speed attained after a conclusion of said specific down shift when it is determined that said input speed of rotation after a conclusion of said specific down shift becomes lower than said output speed of rotation, and controlling supply and discharge operation of said second working pressure control means so as to make said output speed of rotation during said specific down shift approach a speed of rotation attained after a conclusion of said specific down shift when it is determined that said input speed of rotation after a conclusion of said specific down shift does not become lower than said output speed of rotation.

10. An automatic transmission control system as defined in claims 9, wherein said driving torque generator comprises an internal combustion engine.

11. An automatic transmission control system as defined in claims 9, wherein, when said gear shift command signal is provided for said specific down shift while said generator load takes a lower extreme value, said control means makes a correction of said output speed of rotation having been attained before said specific down shift according to a time from when said generator load reaches said lower extreme value to an appearance of said gear shift command signal, and performs said determination based said corrected output speed of rotation.

12. An automatic transmission control system as defined in claims 11, wherein said driving torque generator comprises an internal combustion engine, and, when said gear shift command signal is provided for said specific down shift while an engine throttle is fully closed, said control means makes a correction of said output speed of rotation of said internal combustion engine having been attained before said specific down shift according to a time from when said engine throttle is made to be fully closed to an appearance of said gear shift command signal, and performs said determination based said corrected output speed of rotation of said internal combustion engine.

13. An automatic transmission control system as defined in claims 9, wherein said control means estimates an input speed of rotation to said automatic transmission attained after a conclusion of said specific down shift, and performs said determination on the basis of said estimated input speed of rotation.

14. An automatic transmission control system as defined in claims 9, wherein said control means estimates said output speed of rotation from said generator load and said vehicle speed, and performs said determination on the basis of said estimated output speed of rotation.

15. An automatic transmission control system as defined in claims 14, wherein, when said generator load is greater than a lower extreme value, said control means determines that said input speed of rotation after a conclusion of said specific down shift becomes smaller than said output speed of rotation.

16. An automatic transmission control system as defined in claims 14, wherein, when said generator load takes a lower extreme value and said vehicle speed takes less than a specified value, said control means determines that said input speed of rotation after a conclusion of said specific down shift becomes smaller than said output speed of rotation.

* * * * *